US012657459B2

(12) United States Patent
Hyuga et al.

(10) Patent No.: US 12,657,459 B2
(45) Date of Patent: Jun. 16, 2026

(54) MODEL GENERATION DEVICE, SORTING DEVICE, DATA GENERATION DEVICE, MODEL GENERATION METHOD, AND NON-TRANSITORY COMPUTER STORAGE MEDIA

(71) Applicant: OMRON Corporation, Kyoto (JP)

(72) Inventors: Tadashi Hyuga, Kyoto (JP); Mei Tanaka, Kyoto (JP)

(73) Assignee: OMRON Corporation, Kyoto (JP)

( * ) Notice: Subject to any disclaimer, the term of this patent is extended or adjusted under 35 U.S.C. 154(b) by 535 days.

(21) Appl. No.: 18/277,227

(22) PCT Filed: Mar. 8, 2022

(86) PCT No.: PCT/JP2022/009969
§ 371 (c)(1),
(2) Date: Aug. 15, 2023

(87) PCT Pub. No.: WO2022/196433
PCT Pub. Date: Sep. 22, 2022

(65) Prior Publication Data
US 2024/0135172 A1    Apr. 25, 2024
US 2024/0232615 A9    Jul. 11, 2024

(30) Foreign Application Priority Data

Mar. 15, 2021    (JP) ................................. 2021-041133

(51) Int. Cl.
    *G06N 3/08*    (2023.01)
(52) U.S. Cl.
    CPC ..................................... *G06N 3/08* (2013.01)

(58) Field of Classification Search
    CPC ...... G06N 3/08; G06N 3/0455; G06N 3/0464; G06N 3/0475; G06N 3/084; G06N 3/094;
    (Continued)

(56) References Cited

U.S. PATENT DOCUMENTS 9,704,054 B1 *    7/2017    Tappen ................... G06F 18/23
10,592,779 B2 *    3/2020    Madani .................. G06V 10/82
(Continued)

FOREIGN PATENT DOCUMENTS

CN    106789912 A    *    5/2017    ......... H04L 63/1425
CN    109583376 A    *    4/2019    .......... G06F 18/253
(Continued)

OTHER PUBLICATIONS

"Office Action of China Counterpart Application", issued on Sep. 15, 2025, with English translation thereof, pp. 1-19.
(Continued)

*Primary Examiner* — Shahriar Zarrineh
(74) *Attorney, Agent, or Firm* — JCIPRNET

(57)    ABSTRACT

A data generation device according to the above-described aspect of the present invention: uses a trained encoder to acquire, in a feature space, two or more sample points corresponding to two or more training samples from among a plurality of training samples, and to derive the linear sum at which the total distance becomes the maximum, said distance being calculated from respective sample points that have been acquired in accordance with a prescribed index; and uses a trained decoder to generate, as a new training sample, a decoding sample corresponding to a feature amount of the derived linear sum.

20 Claims, 16 Drawing Sheets

(58) Field of Classification Search

CPC . G06T 2207/20081; G06T 2207/30164; G06T
7/0004

See application file for complete search history.

(56) References Cited

U.S. PATENT DOCUMENTS

| | | | | |
|---|---|---|---|---|
| 10,679,129 | B2 * | 6/2020 | Baker | G06N 3/088 |
| 11,205,103 | B2 * | 12/2021 | Zhang | G06N 20/10 |
| 2019/0273510 | A1 * | 9/2019 | Elkind | G06F 21/562 |
| 2019/0295302 | A1 * | 9/2019 | Fu | G06V 10/82 |
| 2020/0167966 | A1 * | 5/2020 | Kim | G06V 10/774 |
| 2020/0210808 | A1 | 7/2020 | Dong | |
| 2020/0311575 | A1 * | 10/2020 | Kong | G06V 10/776 |
| 2020/0320439 | A1 * | 10/2020 | Lee | G06F 18/2155 |
| 2021/0357695 | A1 * | 11/2021 | Kuruma | G06N 3/09 |
| 2021/0397945 | A1 * | 12/2021 | Vahdat | G06N 3/0455 |
| 2022/0036066 | A1 * | 2/2022 | Cho | G06T 11/10 |
| 2022/0121991 | A1 * | 4/2022 | Kakizaki | G06F 18/2413 |
| 2022/0174328 | A1 * | 6/2022 | Toderici | G06N 3/0495 |

FOREIGN PATENT DOCUMENTS

| | | | | |
|---|---|---|---|---|
| CN | 110324728 | | 10/2019 | |
| CN | 110379225 | | 10/2019 | |
| CN | 110929772 | | 3/2020 | |
| CN | 111832698 | | 10/2020 | |
| CN | 112464172 | | 3/2021 | |
| JP | 2012026982 | | 2/2012 | |
| JP | 2019074945 | | 5/2019 | |
| JP | 2019097425 | A * | 6/2019 | |
| JP | 2020046984 | | 3/2020 | |
| JP | 2021179858 | | 11/2021 | |
| WO | WO-2020188120 | A1 * | 9/2020 | G06V 20/56 |

OTHER PUBLICATIONS

Quan Kong et al., "Active Generative Adversarial Network for Image Classiication", arXiv:1906.07133v1 [cs.LG], Jun. 17, 2019,p. 1-p. 8.

Makoto Satoh., "Shape Learning Set Generation Using Interpolated Shape Generated with Deep Autoencoder", IPSJ SIG Technical Report, Computer Vision and Image Media (CVIM), Mar. 7, 2015,,p. 1-p. 11.

"International Search Report (Form PCT/ISA/210) of PCT/JP2022/ 009969", mailed on May 31, 2022, with English translation thereof, pp. 1-4.

"Written Opinion of the International Searching Authority (Form PCT/ISA/237) of PCT/ JP2022/009969", mailed on May 31, 2022, with English translation thereof, pp. 1-8.

"Office Action of Japan Counterpart Application", issued on Aug. 27, 2024, with English translation thereof, pp. 1-6.

Shaojie Yang, "A Data Augmentation Methodology for Class-imbalanced Image Processing in Prognostic and Health Management", Master degree dissertation in Mechanical Engineering, University of Cincinnati, Nov. 2020, pp. 1-77.

Terrance Devries et al., "Dataset augmentation in feature space", Workshop track—ICLR 2017, Feb. 2017, pp. 1-12.

Xiaofeng Liu et al., "Data Augmentation via Latent Space Interpolation for Image Classification", 2018 24th International Conference On Pattern Recognition (ICPR), Aug. 2018, pp. 728-733.

"Search Report of Europe Counterpart Application", issued on Jan. 28, 2025, pp. 1-12.

* cited by examiner

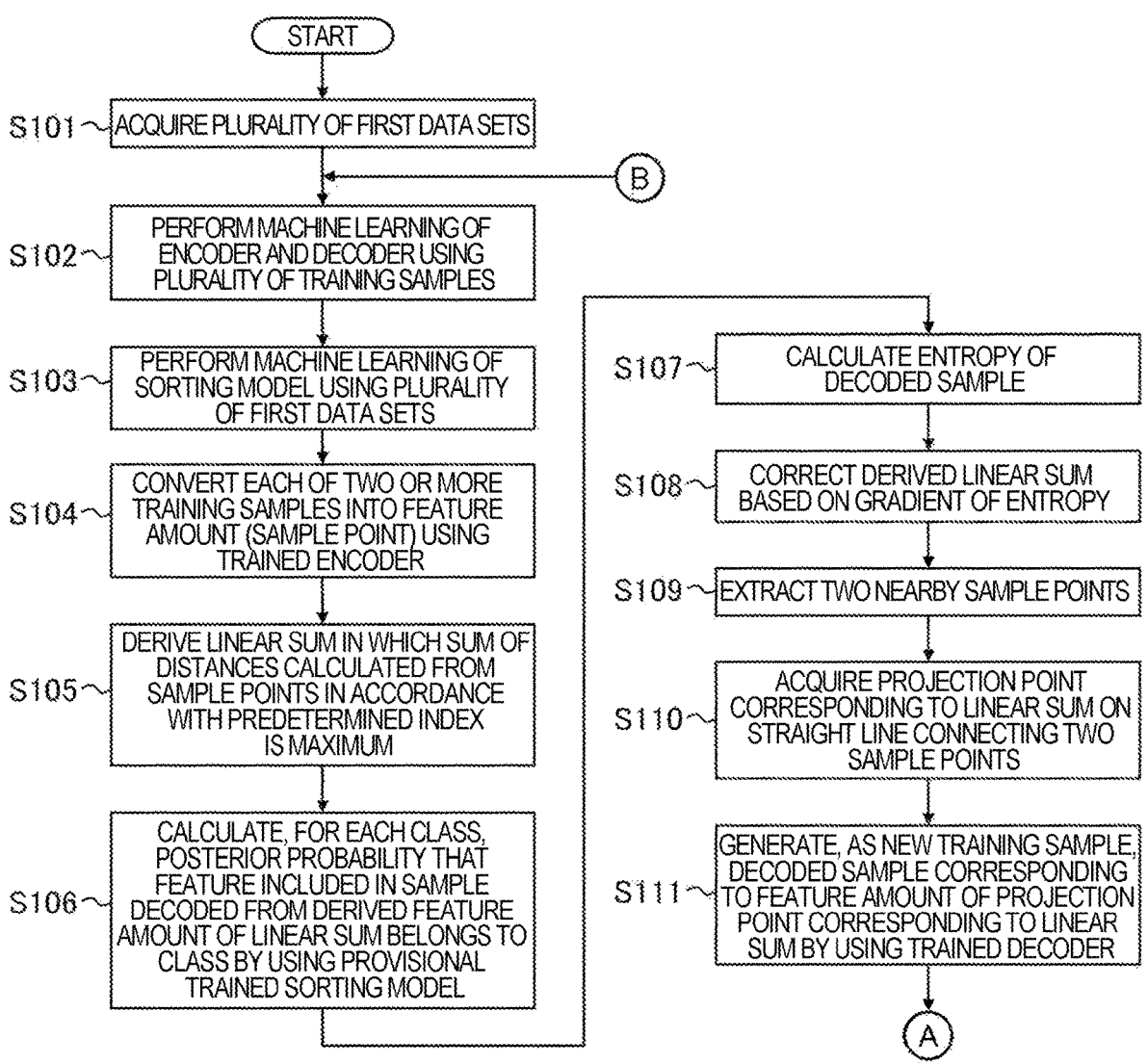

START

S101 — ACQUIRE PLURALITY OF FIRST DATA SETS

Ⓑ

S102 — PERFORM MACHINE LEARNING OF ENCODER AND DECODER USING PLURALITY OF TRAINING SAMPLES

S103 — PERFORM MACHINE LEARNING OF SORTING MODEL USING PLURALITY OF FIRST DATA SETS

S104 — CONVERT EACH OF TWO OR MORE TRAINING SAMPLES INTO FEATURE AMOUNT (SAMPLE POINT) USING TRAINED ENCODER

S105 — DERIVE LINEAR SUM IN WHICH SUM OF DISTANCES CALCULATED FROM SAMPLE POINTS IN ACCORDANCE WITH PREDETERMINED INDEX IS MAXIMUM

S106 — CALCULATE, FOR EACH CLASS, POSTERIOR PROBABILITY THAT FEATURE INCLUDED IN SAMPLE DECODED FROM DERIVED FEATURE AMOUNT OF LINEAR SUM BELONGS TO CLASS BY USING PROVISIONAL TRAINED SORTING MODEL

S107 — CALCULATE ENTROPY OF DECODED SAMPLE

S108 — CORRECT DERIVED LINEAR SUM BASED ON GRADIENT OF ENTROPY

S109 — EXTRACT TWO NEARBY SAMPLE POINTS

S110 — ACQUIRE PROJECTION POINT CORRESPONDING TO LINEAR SUM ON STRAIGHT LINE CONNECTING TWO SAMPLE POINTS

S111 — GENERATE, AS NEW TRAINING SAMPLE, DECODED SAMPLE CORRESPONDING TO FEATURE AMOUNT OF PROJECTION POINT CORRESPONDING TO LINEAR SUM BY USING TRAINED DECODER

MODEL GENERATION DEVICE, SORTING DEVICE, DATA GENERATION DEVICE, MODEL GENERATION METHOD, AND NON-TRANSITORY COMPUTER STORAGE MEDIA

CROSS-REFERENCE TO RELATED APPLICATION

This application is a 371 application of the international PCT application serial no. PCT/2022/009969, filed on Mar. 8, 2022, which claims the priority benefits of Japan Patent Application JP2021/041133, filed on Mar. 15, 2021. The entirety of the above-mentioned patent application is hereby incorporated by reference herein and made a part of this specification.

TECHNICAL FIELD

The present invention relates to a model generation device, a sorting device, a data generation device, a model generation method, and a model generation program.

Background Art

In the related art, technology for inspecting the quality of products by imaging products to be manufactured by an imaging device and analyzing obtained image data in a scene in which products are manufactured such as a production line has been developed. For example, Patent Literature 1 proposes an inspection device that determines whether an object shown in an image is normal or abnormal by using a trained first neural network and classifies the type of abnormality by using a trained second neural network when it is determined that the object is abnormal.

According to a method using a machine learning model such as a neural network, appearance inspection of products can be performed based on computation results of a trained machine learning model without specifying details of image processing for obtained images manually. For this reason, it is possible to simplify information processing of the appearance inspection and reduce the effort of creating an inspection program. On the other hand, in order to generate a trained machine learning model (that is, perform machine learning), it is required to prepare a training sample corresponding to an ability to train a machine learning model (in the example described above, an ability to inspect the appearance of a product). It can be expected that a trained machine learning model having an ability to perform an inference task with high accuracy is generated as long as it is possible to comprehensively cover all events that may occur in the field of applying the trained machine learning model and to prepare a sufficient number of training samples. However, preparing such comprehensive and sufficient number of training samples is costly.

Consequently, in recent years, technology for increasing the number of training samples by generating new training samples by using obtained training samples by various methods using data augmentation and a generation model has been examined. For example, Non-Patent Literature 1 and Patent Literature 2 propose a method of generating a training sample of a target class using a trained conditional generation model (AC-GAN in Non-Patent Literature 1). According to these methods, it is possible to generate new training samples in which events different from the original training samples appear, and thus it is possible to achieve a reduction in the cost of preparing a sufficient number of training samples. By using a sufficient number of obtained training samples for machine learning, it is possible to expect an improvement in the performance of a trained machine learning model.

CITATION LIST

Patent Literature

[Patent Literature 1]
    Japanese Patent Laid-Open No. 2012-026982
[Patent Literature 2]
    Japanese Patent Laid-Open No. 2019-074945

Non-Patent Literature

[Non-Patent Literature 1]
    Quan Kong, Bin Tong, Martin Klinkigt, Yuki Watanabe, Naoto Akira, Tomokazu Murakami, "Active Generative Adversarial Network for Image Classification", arXiv:1906.07133v1 [cs.LG], 17 Jun. 2019.

SUMMARY OF INVENTION

Technical Problem

The inventor of the present invention has found that the method of generating training samples of the related art has the following problems. That is, in a method based on data augmentation, new training images (training samples) are, for example, generated by applying image processing such as translation, scaling, rotation, and noise addition to the original training images. For this reason, although it is possible to generate training samples in which events near the original training samples appear, it is difficult to generate training samples in which other events (for example, intermediate events) appear. Thus, it is difficult to obtain comprehensive training samples by the method based on data augmentation. In the method based on a generation model, new training samples are basically generated based on random numbers, and thus it is difficult to control the generated training samples. For this reason, it is difficult to efficiently obtain comprehensive training samples.

This problem is not unique to generating a trained model that can be used for appearance inspection. This problem is not unique to the case of treating image data as training samples. For example, the same problem may occur in any situation where training samples are collected to generate a trained sorting model that has acquired an ability to perform a sorting task for sorting features included in data such as sorting the types of objects shown in an image and sorting the states of objects shown in sensing data. The training samples may be constituted by, for example, sound data, numerical data, text data, measurement data obtained by other sensors, and the like, in addition to image data.

In one aspect, the present invention has been made in view of such circumstances, and an objective thereof is to achieve a reduction in the cost of comprehensively collecting training samples or to improve the performance of a trained sorting model to be generated by using the obtained training samples for machine learning.

Solution to Problem

The present invention adopts the following configurations in order to solve the above-described problems.

That is, a model generation device according to one aspect of the present invention includes a data acquisition section, a first training processing unit, a conversion unit, a point designation unit, a sample generation unit, a label giving unit, and a second training processing unit. The data acquisition unit is configured to acquire a plurality of first data sets each constituted by a combination of a training sample and a correct answer label. The training sample include a feature, and the correct answer label is configured to indicate a class to which the feature included in the training sample belongs. The first training processing unit is configured to perform machine learning of an encoder and a decoder by using a plurality of training samples included in the plurality of first data sets acquired. The encoder is configured to convert a sample into a feature amount. The decoder is configured to decode the sample from the feature amount. The machine learning of the encoder and the decoder including converting each of the training samples into a feature amount by the encoder, and training the encoder and the decoder so that a sample decoded by the decoder from the obtained each feature amount matches the training samples. The conversion unit is configured to acquire two or more sample points respectively corresponding to the train-ing samples in a feature space by converting each of two or more training samples among the plurality of training samples into a feature amount by using the trained encoder. The point designation unit is configured to derive a linear sum in which the sum of distances calculated from the sample points in accordance with a predetermined index is maximum, the linear sum being a linear sum of the acquired two or more sample points in the feature space. The sample generation unit is configured to generate a decoded sample corresponding to a feature amount of the linear sum as a new training sample by using the trained decoder. The label giving unit is configured to generate a second data set by giving the new training sample a new correct answer label, which is configured to indicate a class to which a feature included in the generated new training sample belongs. The second training processing unit is configured to perform machine learning of a sorting model by using the plurality of first data sets and the generated one or more second data sets. The machine learning of the sorting model includes training the sorting model so that a result of sorting the class to which the feature included in the training sample belongs by using the sorting model matches the correct answer label for each data set.

In this configuration, the machine learning of the encoder and the decoder are performed by using a plurality of original data sets (first data sets). As a result of the machine learning, a trained encoder and decoder can be generated. According to the trained encoder, each training sample can be mapped into a feature space (latent space) while preserv-ing information on the feature included therein. According to the trained decoder, a sample can be decoded from the value (feature amount) of the feature space. In this configuration, each of two or more training samples among the plurality of training samples is converted into a feature amount, and thus two or more sample points corresponding to the training samples are acquired in a feature space. A linear sum in which the sum of distances calculated from the sample points is maximum is derived in accordance with a predetermined criterion. Then, decoded samples corre-sponding to the feature amount of the linear sum are generated as new training samples by using the trained decoder. That is, according to this configuration, a state in which sample points exist evenly can be formed by obtain-ing a point of the linear sum in which the sum of distances from the sample points is maximum as a new sample point. Thus, a new data set (second data set) including a sample decoded from the feature amount of the linear sum is added to learning data by using the trained decoder, and thus it is possible to obtain learning data that can be evaluated in a feature space when it has high comprehensiveness. In this configuration, at least a portion of the process of generating (a data set including) such a new training sample can be automated using the trained encoder and decoder. Thus, according to this configuration, it is possible to achieve a reduction in the cost of comprehensively collecting training samples. Additionally, in this configuration, in addition to the original data set (first data set), a new data set (second data set) generated as described above is used for machine learning of the sorting model. Thereby, according to this configuration, an improvement in the performance of a trained sorting model to be generated can be achieved by using the comprehensively obtained training samples for machine learning.

In the model generation device according to the above-described aspect, the sorting model may be configured to output, for each class, a posterior probability that the feature included in the sample belongs to the class. The machine learning of the sorting model may be performed by being divided into first machine learning using the plurality of first data sets and second machine learning using the one or more second data sets. A provisional trained sorting model may be generated by performing the first machine learning. The point designation unit may be further configured to calcu-late, for each class, a posterior probability that a feature included in a sample decoded by the trained decoder belongs to the class from the feature amount of the derived linear sum by using the provisional trained sorting model, to calculate an entropy of the decoded sample from the calcu-lated posterior probability for each class, and to correct the derived linear sum so that the entropy increases based on a gradient of the calculated entropy. The sample generation unit may be configured to generate, as the new training sample, a decoded sample corresponding to a feature amount of the corrected linear sum by using the trained decoder.

In this configuration, the entropy of a sample decoded from a feature amount of a linear sum is evaluated by a provisional trained sorting model. Entropy indicates the degree to which a feature included in a decoded sample can be sorted (in other words, uncertainty). Higher uncertainty indicates that it is difficult to sort a feature included in the sample, that is, machine learning of the sample is insufficient in a provisionally trained sorting model. In this configura-tion, the derived linear sum is corrected such that the entropy increases, and a sample decoded from a feature amount of the corrected linear sum is used as a new training sample by using a trained decoder. Thereby, a training sample with insufficient machine learning in the provisional trained sort-ing model can be obtained, and the expectation of an improvement in the performance of a trained sorting model to be generated can be increased by using the obtained training sample for machine learning of the sorting model.

In the model generation device according to the above-described aspect, the first training processing unit may be configured to further perform machine learning of an iden-tifier by using a plurality of training samples included in the plurality of first data sets. The machine learning of the identifier may be configured by training the identifier to evaluate the degree to which an input sample belongs to a distribution of the plurality of training samples. The point designation unit may be further configured to evaluate the degree to which a sample decoded by the trained decoder belongs to a distribution of the plurality of training samples from a feature amount of the derived linear sum by using the trained identifier, to calculate a reliability of the sample decoded by the trained decoder based on a result of evaluating the degree, and to correct the derived linear sum to improve the reliability based on a gradient of the calculated reliability. The sample generation unit may be configured to generate, as the new training sample, a decoded sample corresponding to a feature amount of the corrected linear sum by using the trained decoder.

In a feature space, a sample decoded by the trained decoder 6 from feature amounts of points other than points corresponding to the training samples are pseudo data imitating so-called true data (training samples). In some cases, this pseudo data can significantly deviate from the true data. Consequently, in this arrangement, the reliability of a sample decoded by the trained decoder is evaluated by using the trained identifier. In one example, the more a sample to be decoded belongs to a distribution of training samples, the higher the reliability of the sample is evaluated, and the less a sample to be decoded belongs to the distribution of the training samples, the lower the reliability of the sample is evaluated. Then, a linear sum is corrected to improve reliability based on the evaluation results, and a sample decoded from a feature amount of the corrected linear sum is generated as a new training sample. Thereby, it is possible to suppress the addition of a training sample, which significantly deviates from true data, to learning data. As a result, the expectation of an improvement in the performance of a trained sorting model to be generated can be increased by using the obtained training sample for machine learning of the sorting model.

In the model generation device according to the above-described aspect, training the identifier may be configured by performing adversarial learning between the encoder, the decoder, and the identifier. The adversarial learning may include a step of training an identifier to identify origins of input samples by using a plurality of samples decoded by the decoder and the plurality of training samples as the input samples, and a step of training the encoder and the decoder so that identification performance of the identifier is degraded when the samples decoded by the decoder are input to the identifier. Evaluating the degree to which the decoded samples belong to the distribution of the plurality of training samples may be configured by identifying the origins of the decoded samples by using the trained identifier.

The identifier trained by adversarial learning acquires an ability to discriminate between the training sample and a decoded sample (pseudo sample) derived from the decoder, depending on the degree of adversarial learning. Thus, according to this trained identifier, the reliability of an input sample can be evaluated in accordance with a result of identifying the origin of the input sample. It can be evaluated that the reliability is so high that the identifier mistakes the origin of the input sample for a training sample, and the reliability is so low that the identifier correctly identifies that the origin of the input sample is the decoder. Thus, according to this configuration, the reliability of a sample to be decoded can be appropriately evaluated by a trained identifier generated by adversarial learning. Thereby, it is possible to suppress the addition of a training sample, which significantly deviates from true data, to learning data, and to increase the expectation of an improvement in the performance of a trained sorting model to be generated.

In the model generation device according to the above-described aspect, the point designation unit may be further configured to evaluate the degree of differences between the samples decoded by the trained decoder and the training samples included in the plurality of first data sets from the feature amount of the derived linear sum, to calculate the reliability of the samples decoded by the trained decoder based on a result of evaluating the degree, and to correct the derived linear sum so as to improve the reliability based on a gradient of the calculated reliability. Evaluating the degree of the differences may be configured by converting the decoded samples into feature amounts by the trained encoder and calculating differences between the obtained feature amounts of the decoded samples and the feature amounts of the linear sum, or is configured by generating re-decoded samples from the feature amounts of the decoded samples by further using the trained decoder and calculating reconfiguration errors between the decoded samples and the generated re-decoded samples.

The reliability of the decoded sample can also be evaluated by a difference between the decoded sample and the training sample in the feature space or the original space (sample dimensional space). In this configuration, as the difference between the decoded sample and the training sample, a sample decoded by the trained decoder from the derived linear sum is converted into a feature amount by the trained encoder, and a difference between the obtained feature amount and the linear sum is calculated. Alternatively, a re-decoded sample is generated from a feature amount of a decoded sample by further using the trained decoder, and a reconfiguration error between the decoded sample and the generated re-decoded sample is calculated. The trained encoder and decoder are generated by machine learning using training samples included in the first data set. For this reason, the more similar the sample decoded by the trained decoder from the derived linear sum to the training sample, the smaller each of the above-described differences (difference between feature amounts/reconfiguration error), and the more the decoded sample deviates from the training sample, the larger each of the above-described differences becomes. For this reason, it is possible to appropriately evaluate the degree of a difference between the sample decoded from the linear sum and the training sample using the above-described differences. In this configuration, a linear sum is corrected to improve reliability based on the evaluation results, and a sample decoded from a feature amount of the corrected linear sum is generated as a new training sample. Thereby, it is possible to suppress the addition of a training sample, which significantly deviates from true data, to learning data. As a result, the expectation of an improvement in the performance of a trained sorting model to be generated can be increased by using the obtained training sample for machine learning of the sorting model.

In the model generation device according to the above-described aspect, the machine learning of the encoder and the decoder may further include acquiring two feature amounts corresponding to two training samples constituting each pair by using the encoder for pairs of training samples obtained from the plurality of first data sets, calculating a synthesized feature amount for each pair by synthesizing the two feature amounts acquired for each pair at a predetermined internal division ratio, generating a decoded sample for each pair from the calculated synthesized feature amount by using the decoder, training an estimator for each pair so that a result of estimating the internal division ratio from the generated decoded sample by the estimator matches the predetermined internal division ratio, and training the encoder and the decoder for each pair to generate a decoded sample for degrading the performance of the estimator that estimates the interior division ratio.

In this configuration, adversarial learning is performed between the encoder, the decoder, and the estimator. Through adversarial learning, as the ability of the estimator to discriminate an internal division ratio is improved, the ability of the encoder and the decoder to generate a sample for which it is difficult to estimate an internal division ratio is improved. That is, it is possible to suppress the decoding (generation) of a sample deviating from true data such that an internal division ratio can be easily specified for points between the sample points (in other words, a sample whose internal division ratio is difficult to specify and indistinguishable from true data can be decoded by a decoder). Thus, according to this configuration, it is possible to generate a trained encoder and decoder that have acquired an ability to generate a decoded sample, which is similar to true data (training sample), from a feature amount of a linear sum. Thereby, when a new training sample is generated using the trained encoder and decoder, it is possible to suppress the addition of a training sample, which significantly deviates from true data, to learning data. As a result, the expectation of an improvement in the performance of a trained sorting model to be generated can be increased by using the obtained training sample for machine learning of the sorting model.

In the model generation device according to the above-described aspect, the point designation unit may be configured to extract two sample points near the derived linear sum from the acquired two or more sample points, and to acquire a projection point corresponding to the linear sum by projecting the derived linear sum onto a straight line connecting the extracted two sample points in the feature space, and the sample generation unit may be configured to generate, as the new training sample, a decoded sample corresponding to a feature amount of the projection point corresponding to the linear sums by using the trained decoder. According to this configuration, by converting the linear sum into an internal division ratio (projection point) of two sample points, the value of the linear sum can be corrected to a value in a training range of the adversarial learning or a value that is approximate thereto. Thereby, it is possible to increase the certainty of suppressing the addition of the training sample, which is extremely deviated from true data, to learning data. As a result, the expectation of an improvement in the performance of a trained sorting model to be generated can be increased by using the obtained new training sample in the machine learning of the sorting model.

In the model generation device according to the above-described aspect, extracting the two sample points may be configured by extracting two sample points of different classes to which features included in the corresponding training samples belong. According to this configuration, it is possible to suppress the generation of a new training sample, which deviates from true data, among training samples of different classes. That is, a decoded sample similar to true data can be generated as a new training sample in a range closer to a class identification boundary than each sample point by the trained decoder. As a result, the expectation of an improvement in the performance of a trained sorting model to be generated can be further increased by using the obtained new training sample.

The model generation device according to the above-described aspect may further include an output unit configured to dispose and output the two or more training samples and the new training sample in accordance with a positional relationship in the feature space after the new training sample is generated. According to this configuration, it is possible to confirm whether a sample to be decoded (new training sample) may be added to learning data based on an output result. Thereby, it is possible to prevent a training sample, which significantly deviates from true data, from being added to the learning data. As a result, the expectation of an improvement in the performance of a trained sorting model to be generated can be increased by using the obtained training sample for machine learning of the sorting model. In addition, based on an output result, it is possible to confirm a class to which a feature included in a sample to be decoded (new training sample) belongs in accordance with a positional relationship in a feature space with the original training sample.

In the model generation device according to the above-described aspect, the label giving unit may be configured to output the two or more training samples and the new training sample by the output unit and then receive designation of a class to which a feature included in the new training sample belongs, and is configured to give the new training sample the new correct answer label configured to indicate the designated class. According to this configuration, based on the output result, the designation of the class is received while confirming the class to which the feature included in the decoded sample (new training sample) in accordance with a positional relationship with the original training sample in the feature space, and thus a new correct answer label indicating an appropriate class can be given to the new training sample. Thereby, it is possible to prevent an incorrect correct answer label from being given to the new training sample. As a result, the obtained new training sample can be appropriately used in the machine learning of the sorting model, and the expectation of an improvement in the performance of a trained sorting model to be generated can be increased.

The model generation device according to the above-described aspect may further include a thinning unit configured to determine whether a density of sample points corresponding to the training samples exceeds a threshold value in the feature space when the training samples included in the plurality of first data sets and the one or more second data sets are converted into feature amounts by the trained encoder, and to select an object to be thinned out from the one or more second data sets when the density exceeds the threshold value. The second training processing unit may be configured to perform machine learning of the sorting model except for the second data set selected as the object to be thinned out. When there are excessive training samples in a nearby range in a space, there is a possibility that some of the training samples will not contribute much to improving the performance of the sorting model. According to this configuration, it is possible to find the state of excessive training samples by the density in a feature space and to thin out some of the excessive training samples. Thereby, the number of data sets used for machine learning of the sorting model is reduced, and thus it is possible to reduce the amount of calculation of machine learning while suppressing degradation of the performance of a trained sorting model to be generated and to achieve the efficiency of calculational resources (a processor, a memory) required for machine learning.

In the model generation device according to the above-described aspect, the sorting model may be configured to receive an input of the feature amount and output, from the input feature amount, a result of sorting a class to which the feature belongs. According to this configuration, it is possible to achieve an improvement in the performance of the generated trained sorting model in a configuration in which the computation of the sorting task is shared with the processing of the encoder. In this configuration, the training of the sorting model can be performed together with the training of the encoder, and thus the efficiency of the machine learning processing of the sorting model may be improved.

In the model generation device according to the above-described aspect, the sorting model may be configured to receive an input of the sample and output, from the input sample, a result of sorting a class to which the feature belongs. According to this configuration, the performance of the generated trained sorting model can be improved in a configuration in which the sorting model is configured separately from the encoder and the decoder. In this configuration, the construction of the sorting model does not depend on the encoder, and thus the structure of the sorting model may be optimized for the sorting task. Thereby, the efficiency of the amount of calculation of the sorting model may be improved.

The model generation device according to the above-described aspect may be configured to repeatedly execute updating the trained encoder and decoder by performing the machine learning of the encoder and the decoder again by using the generated one or more second data sets by the first training processing unit, acquiring two or more sample points corresponding to two or more training samples among the plurality of training samples included in the plurality of first data sets and the one or more second data sets by using the updated trained encoder by the conversion unit, deriving a linear sum of the acquired two or more sample points by the point designation unit, generating a decoded sample corresponding to a feature amount of the linear sum as a new training sample by using the updated trained decoder by the sample generation unit, and generating a new second data set by giving a new correct answer label to the generated new training sample by the label giving unit. When a new training sample is added and the machine learning of the encoder and the decoder is performed further using the added new training sample, a feature space mapped by the encoder may be changed. According to this configuration, it is possible to form a state in which sample points exist evenly while adding a new training sample by repeating the machine learning of the encoder and the decoder and the generation of a new training sample. Thereby, it is possible to more appropriately collect comprehensive training samples.

In the model generation device according to the above-described aspect, the predetermined index may be configured by either Equation 1 or Equation 2 below.

[Math. 1]

$$X = \operatorname*{argmin}_{x} \sum \|x - x_i\|^2 \qquad \text{(Equation 1)}$$

[Math. 2]

$$X = \operatorname*{argmax}_{x} \operatorname*{min}_{i} \sum \|x - x_i\| \qquad \text{(Equation 2)}$$

X indicates the derived linear sum, and $x_i$ indicates each sample point. According to this configuration, the center of gravity can be obtained according to Equation 1. According to Equation 2, a Voronoi point can be obtained. According to these, it is possible to derive a linear sum in which the sum of distances from the sample points is maximum in a region on the inner side of each sample point. Thereby, an appropriate linear sum can be obtained, and sample points can be added to a region in which sample points are sparse in a feature space. By repeating this operation, it is possible to form a state in which sample points exist evenly. Thus, according to this configuration, comprehensive training samples can be appropriately collected. By using the comprehensively obtained training samples for machine learning, it is possible to improve the performance of the generated trained sorting model.

In the model generation device according to each of the above-described aspects, the data type of the training sample may not be particularly limited as long as it can be a target for the sorting task, and may be appropriately selected in accordance with an embodiment. The training sample may be, for example, image data, sound data, numerical data, text data, or other sensing data obtained by a sensor. The same applies to target samples obtained when a sorting task is performed by using a trained sorting model.

For example, in the model generation device according to the above-described aspect, the training sample may be an image sample in which an object is shown, and the class of a feature may relate to the type of object shown in the image sample. According to this configuration, it is possible to achieve a reduction in the cost of comprehensively collecting training samples in a scene in which a trained sorting model for performing object recognition is generated. Thereby, an improvement in the performance of a trained sorting model to be generated can be achieved by using the obtained training samples for machine learning.

Further, in the model generation device according to the above-described aspect, the object may be a product, and the class of the feature may relate to the type of defect included in the product. According to this configuration, it is possible to achieve a reduction in the cost of comprehensively collecting training samples in a scene in which a trained sorting model for performing appearance inspection is generated as one configuration of object recognition. Thereby, an improvement in the performance of a trained sorting model to be generated can be achieved by using the obtained training samples for machine learning.

The configuration of the present invention may not be limited to a model generation device configured to execute all of the series of processing described above. A device according to an aspect of the present invention may be configured by extracting, from the model generation devices according to the above-described configurations, portions such as a portion that generates a trained encoder and decoder, a portion that generates a new training sample (second data set) by the trained encoder and decoder, and a portion that executes machine learning of a sorting model by using learning data including the new training sample. In one example, a device corresponding to the portion that generates the trained encoder and decoder may be referred to as a first model generation device. The portion that generates the new training sample by the trained encoder and decoder may be referred to as a data generation device. The portion that executes machine learning of the sorting model by using learning data including the new training sample may be referred to as a second model generation device. An aspect of the present invention may be a sorting device that uses a trained sorting model generated by the model generation device according to any one configuration described above. The sorting device may be appropriately read in accordance with the type of sorting task (for example, an inspection device or the like).

For example, a sorting device according to an aspect of the present invention includes an acquisition unit configured to acquire a target sample, a sorting unit including the trained sorting model generated by the model generation device according to any one configuration described above, the sorting unit being configured to sort a class to which a feature included in the acquired target sample belongs, by using the trained sorting model, and an output unit configured to output information on a result of sorting the class. According to this configuration, it can be expected that a highly accurate sorting task is performed by using the trained sorting model generated as described above.

For example, a data generation device according to an aspect of the present invention includes a data acquisition unit configured to acquire two or more training samples, a conversion unit configured to acquire two or more sample points corresponding to the training samples in a feature space by converting each of the two or more training samples into a feature amount by using a trained encoder, a point designation unit configured to derive a linear sum in which the sum of distances calculated from the sample points in accordance with a predetermined index is maximum, the linear sum being a linear sum of the acquired two or more sample points in the feature space, and a sample generation unit configured to generate a decoded sample corresponding to a feature amount of the linear sum as a new training sample by using a trained decoder. The trained encoder and decoder are generated by machine learning using a plurality of training samples including the two or more training samples. The machine learning includes converting each of the training samples into a feature amount by the encoder, and training the encoder and the decoder so that samples decoded by the decoder from the obtained feature amounts match the training samples. According to this configuration, it is possible to achieve a reduction in the cost of comprehensively collecting training samples.

As another aspect of each device according to the above-described configurations, one aspect of the present invention may be an information processing method that realizes all or some of the above-described configurations, may be a program, or a storage medium that stores such a program and is readable by a computer, other devices, machines, or the like. Here, a computer-readable storage medium is a medium that stores information such as programs by an electrical, magnetic, optical, mechanical, or chemical action. One aspect of the present invention may be a sorting system constituted by the model generation device (the first model generation device, the data generation device, and the second model generation device) and the sorting device according to any one of the above-described configurations.

For example, a model generation method according to an aspect of the present invention is a model generation method of causing a computer to execute the following steps including acquiring a plurality of first data sets each constituted by a combination of a training sample and a correct answer label, performing machine learning of an encoder and a decoder by using a plurality of training samples included in the plurality of first data sets acquired, acquiring two or more sample points respectively corresponding to the training samples in a feature space by converting each of two or more training samples among the plurality of training samples into a feature amount by using the trained encoder, deriving a linear sum in which the sum of distances calculated from the sample points in accordance with a predetermined index is maximum, the linear sum being a linear sum of the acquired two or more sample points in the feature space, generating a decoded sample corresponding to a feature amount of the linear sum as a new training sample by using the trained decoder, generating a second data set by giving the new training sample a new correct answer label, which is configured to indicate a class to which a feature included in the generated new training sample belongs, and performing machine learning of a sorting model by using the plurality of first data sets and the generated one or more second data sets.

For example, a model generation program according to an aspect of the present invention is a model generation program causing a computer to execute the following steps including acquiring a plurality of first data sets each constituted by a combination of a training sample and a correct answer label, performing machine learning of an encoder and a decoder by using a plurality of training samples included in the plurality of first data sets acquired, acquiring two or more sample points respectively corresponding to the training samples in a feature space by converting each of two or more training samples among the plurality of training samples into a feature amount by using the trained encoder, deriving a linear sum in which the sum of distances calculated from the sample points in accordance with a predetermined index is maximum, the linear sum being a linear sum of the acquired two or more sample points in the feature space, generating a decoded sample corresponding to a feature amount of the linear sum as a new training sample by using the trained decoder, generating a second data set by giving the new training sample a new correct answer label, which is configured to indicate a class to which a feature included in the generated new training sample belongs, and performing machine learning of a sorting model by using the plurality of first data sets and the generated one or more second data sets.

Advantageous Effects of Invention

According to the present invention, it is possible to reduce the cost of collecting training samples comprehensively. By using the obtained training samples for machine learning, it is possible to improve the performance of a trained sorting model to be generated.

BRIEF DESCRIPTION OF DRAWINGS

FIG. 7A is a flowchart showing an example of a processing procedure of the model generation device according to the embodiment.

DESCRIPTION OF EMBODIMENTS

Hereinafter, an embodiment according to the above-described aspect of the present invention (hereinafter also referred to as "the present embodiment") will be described based on the drawings. However, the present embodiment to be described below is merely an example of the present invention in every respect. It is needless to say that various modifications and variations can be made without departing from the scope of the invention. That is, a specific configuration according to the embodiment may be appropriately adopted in implementing the present invention. Although data shown in the present embodiment is described by natural language, more specifically, it is designated in computer-recognizable pseudo-language, commands, parameters, machine language, and the like.

§ 1 Application Example

Figure 1:
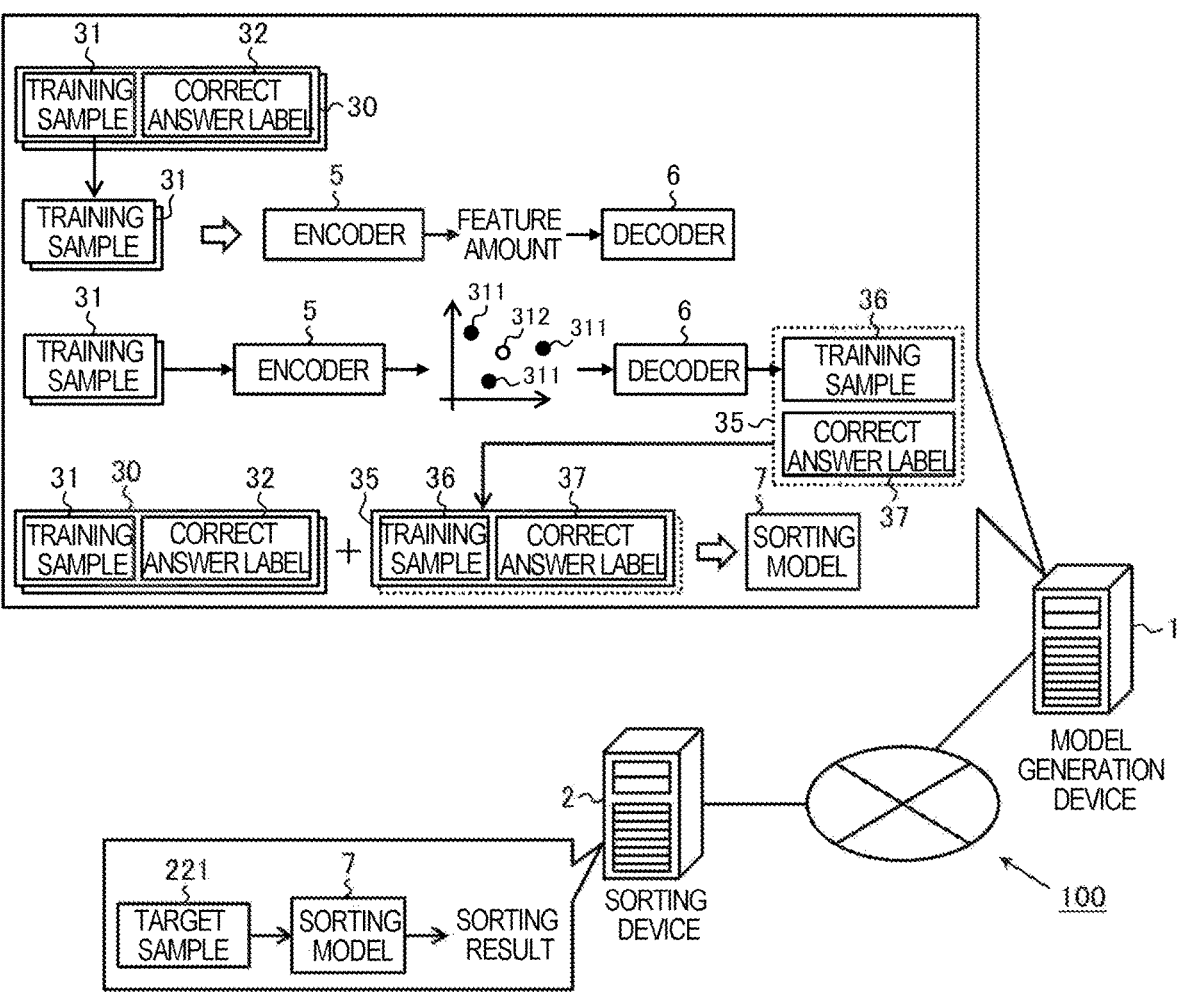
FIG. 1 schematically illustrates an example of a scene to which the present invention is applied.

FIG. 1 schematically illustrates an example of a scene to which the present invention is applied. As illustrated in FIG. 1, a sorting system 100 according to the present embodiment includes a model generation device 1 and a sorting device 2.

The model generation device 1 according to the present embodiment is a computer configured to perform machine learning of an encoder 5 and a decoder 6, generate a new training sample 36 using the trained encoder 5 and decoder 6, and execute machine learning of a sorting model 7. Specifically, the model generation device 1 according to the present embodiment acquires a plurality of first data sets 30. Each first data set 30 is constituted by a combination of a training sample 31 and a correct answer label 32. The training sample 31 includes a feature. The correct answer label 32 is configured to indicate a class to which the feature included in the corresponding training sample 31 belongs (that is, a correct answer of a sorting task for the feature).

The type of data of each training sample 31 is not particularly limited as long as it can be an object of the sorting task, and may be appropriately selected in accordance with an embodiment. Each training sample 31 may be, for example, image data, sound data, numerical data, text data, or other sensing data obtained by a sensor. In one example, each training sample 31 may be sensing data obtained by observing an arbitrary target with a sensor. The sensor may be, for example, an image sensor (camera), an infrared sensor, a sound sensor (microphone), an ultrasonic sensor, an optical sensor, a pressure sensor, an air pressure sensor, a temperature sensor, or the like. The sensor may be, for example, an environmental sensor, a vital sensor, a medical examination device, an in-vehicle sensor, a home security sensor, or the like. The environmental sensor may be, for example, a barometer, a thermometer, a hygrometer, a sound pressure meter, a sound sensor, an ultraviolet sensor, an illuminometer, a rain gauge, a gas sensor, or the like. The vital sensor may be, for example, a sphygmomanometer, a pulse meter, a heart rate meter, an electrocardiograph, an electromyograph, a thermometer, a skin electrometer, a microwave sensor, an electroencephalograph, a magnetoencephalograph, an activity meter, a blood glucose meter, an electrooculography sensor, an eye movement measuring instrument, or the like. The medical examination device may be, for example, a computed tomography (CT) device, a magnetic resonance imaging (MRI) device, or the like. The in-vehicle sensor may be, for example, an image sensor, a light detection and ranging (Lidar) sensor, a millimeter wave radar, an ultrasonic sensor, an acceleration sensor, or the like. The home security sensor may be, for example, an image sensor, an infrared sensor, an activity (voice) sensor, a gas ($CO_2$, or the like) sensor, a current sensor, a smart meter (a sensor that measures power usage for home appliances, lighting, and the like), or the like.

The content of a sorting task may be appropriately determined in according with an embodiment. In one example, each training sample 31 may be an image sample in which an object is shown. In this case, the sorting task may be to identify the type of object. A class of a feature may relate to the type of object shown in the image sample. The correct answer label 32 may be configured to indicate the type of object shown in the corresponding training sample 31. In another example, each training sample 31 may be a sample of sensing data (for example, vital data obtained by a vital sensor, image data obtained by an image sensor, or the like) reflecting the state of a subject (examinee). In this case, the sorting task may be to identify the state of the subject (for example, determine whether the subject is healthy, whether there are signs of illness, whether the subject is normal, or the like). The class of the feature may relate to the type of state of the subject. The correct answer label 32 may be configured to indicate the state of the subject (examinee) shown in the corresponding training sample 31.

In the present embodiment, the model generation device 1 performs machine learning of the encoder 5 and the decoder 6 by using the plurality of training samples 31 included in the plurality of first data sets 30 acquired. The encoder 5 is configured to convert a sample to be input into a feature amount (that is, latent expression). The decoder 6 is configured to decode the sample from the feature amount. The machine learning of the encoder 5 and the decoder 6 includes converting each training sample 31 into a feature amount by the encoder 5 and training the encoder 5 and the decoder 6 so that the sample decoded by the decoder 6 from each feature amount obtained matches each training sample 31. As a result of this machine learning, the trained encoder 5 and decoder 6 are generated. According to the trained encoder 5, each training sample 31 can be mapped into a feature space (latent space) while preserving information on the feature included therein. According to the trained decoder 6, a sample can be decoded from the value (feature amount) of the feature space.

In the present embodiment, the model generation device 1 acquires two or more sample points 311 corresponding to two or more training samples 31 in a feature space by converting each of the two or more training samples 31 among the plurality of training samples 31 into a feature amount by using the trained encoder 5. The model generation device 1 derives a linear sum 312 in which the sum of distances respectively calculated from the two or more sample points 311 in accordance with a predetermined index is maximum in the feature space, the linear sum being the sum of the acquired two or more sample points 311. The model generation device 1 generates a decoded sample (that is, a sample decoded from the linear sum 312) corresponding to the feature amount of the linear sum 312 as a new training sample 36 by using the trained decoder 6.

In the present embodiment, the model generation device 1 gives the new training sample 36 a new correct answer label 37 configured to indicate the class to which the feature included in the generated new training sample 36 belongs. Thereby, the model generation device 1 generates a second data set 35 constituted by a combination of the new training sample 36 and the correct answer label 37. The first data set 30 may be referred to as an original data set, and the second data set 35 may be referred to as a new data set. However, "original" and "new" only indicate a relationship in one cycle of processing for generating the encoder 5 and the decoder 6 trained by the above-described machine learning and generating a new training sample 36 by using the trained encoder 5 and decoder 6. The plurality of first data sets 30 may include previously generated second data sets 35 and at least one of data sets generated in other methods.

The model generation device 1 performs machine learning of the sorting model 7 by using the plurality of first data sets 30 and one or more second data sets 35. The machine learning of the sorting model 7 includes training, for each data set (30, 35), the sorting model 7 so that a result obtained by sorting the class to which the feature included in the training sample (31, 36) belongs by the sorting model 7 matches a correct answer label (32, 37). As a result of the machine learning, it is possible to generate, for a data sample which is the same type as the training sample (32, 37), a trained sorting model 7 that has acquired an ability to perform a task of sorting features included. The generated trained sorting model 7 may be provided to the sorting device 2 at any timing. The sorting device 2 is a computer configured to perform a sorting task using the trained sorting model 7. Specifically, the sorting device 2 according to the present embodiment acquires the target sample 221. The target sample 221 is the same type of data as the training sample (31, 36). The sorting device 2 includes the trained sorting model 7 generated by the model generation device 1, and sorts a class to which a feature included in the acquired target sample 221 belongs, by using the trained sorting model 7. The sorting device 2 outputs information on a result of sorting the class. The sorting device 2 may be appropriately read depending on the type of sorting task (for example, an inspection device or the like).

As described above, according to the model generation device 1 of the present embodiment, the linear sum 312 in which the sum of distances from the sample points 311 is maximum is obtained as a new sample point, and thus a state where sample points (the sample point 311, the linear sum 312) exist uniformly can be formed in a feature space. Thus, a new data set (second data set 35) including a sample (training sample 36) decoded from the feature amount of the linear sum 312 is added to learning data by using the trained decoder 6, and thus it is possible to obtain learning data that can be evaluated in a feature space when it has high comprehensiveness. According to the model generation device 1 of the present embodiment, at least a portion of the process of generating (a data set including) such a new training sample can be automated using the trained encoder 5 and decoder 6. Thus, it is possible to achieve a reduction in the cost of comprehensively collecting training samples. In the model generation device 1 according to the present embodiment, in addition to the original data set (first data set 30), a new data set (second data set 35) generated as described above is used for machine learning of the sorting model 7. Thereby, according to the model generation device 1 of the present embodiment, an improvement in the performance of a trained sorting model 7 to be generated can be achieved by using the comprehensively obtained training samples (31, 36) for machine learning of the sorting model 7. In the sorting device 2 according to the present embodiment, it can be expected that a highly accurate sorting task for the target sample 221 is performed by using the trained sorting model 7 generated in this manner.

In the example of FIG. 1, the model generation device 1 and the sorting device 2 are connected to each other via a network. The type of network may be selected appropriately from among, for example, the Internet, a wireless communication network, a mobile communication network, a telephone network, a dedicated network, and the like. However, a method of exchanging data between the model generation device 1 and the sorting device 2 is not limited to such an example, and may be appropriately selected in accordance with an embodiment. For example, data may be exchanged between the model generation device 1 and the sorting device 2 using a storage medium.

In the example of FIG. 1, the model generation device 1 and the sorting device 2 are constituted by separate computers. However, the configuration of the sorting system 100 according to the present embodiment is not limited to such an example, and may be determined appropriately in accordance with an embodiment. For example, the model generation device 1 and the sorting device 2 may be an integrated computer. For example, at least one of the model generation device 1 and the sorting device 2 may be constituted by a plurality of computers.

§ 2 Configuration Example

Figures 2, 3:
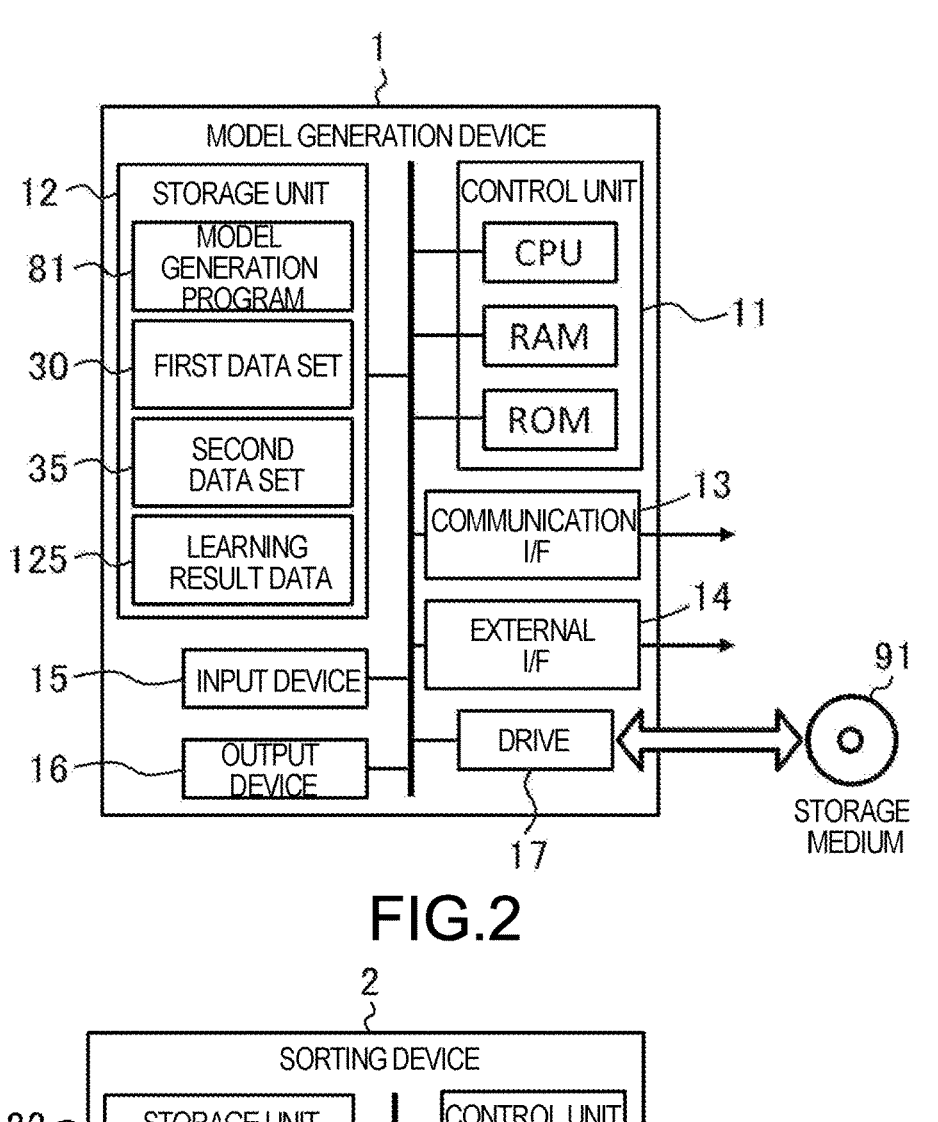
FIG. 2 schematically illustrates an example of a hardware configuration of a model generation device according to an embodiment.
FIG. 3 schematically illustrates an example of a hardware configuration of a sorting device according to the embodiment.

[Hardware Configuration]
<Model Generation Device>
FIG. 2 schematically illustrates an example of a hardware configuration of the model generation device 1 according to the present embodiment. As illustrated in FIG. 2, the model generation device 1 according to the present embodiment is a computer in which a control unit 11, a storage unit 12, a communication interface 13, an external interface 14, an input device 15, an output device 16, and a drive 17 are electrically connected to each other. In FIG. 2, the communication interface and the external interface are described as a "communication I/F" and an "external I/F."

The control unit 11 includes a central processing unit (CPU) which is a hardware processor (processor resource), a random access memory (RAM), a read only memory (ROM), and the like, and is configured to execute information processing based on programs and various data. The storage unit 12 is an example of a memory (memory resource), and is constituted by, for example, a hard disk drive, a solid state drive, or the like. In the present embodiment, the storage unit 12 stores various information such as a model generation program 81, a plurality of first data sets 30, one or more second data sets 35, learning result data 125, and the like.

The model generation program 81 is a program for causing the model generation device 1 to perform machine learning of the encoder 5 and the decoder 6, to generate a new training sample 36 using the trained encoder 5 and decoder 6, and to execute information processing (FIGS. 7A and 7B), which will be described later, related to machine learning of the sorting model 7. The model generation program 81 includes a series of instructions of the information processing. A portion related to at least any one of the information processing described above may be configured as a separate program. In this case, a subprogram related to machine learning of the encoder 5 and the decoder 6 and a subprogram related to machine learning of the sorting model 7 may be referred to as a model generation program and a learning program, respectively. A subprogram related to generation of a new training sample 36 using the trained encoder 5 and decoder 6 may be referred to as a data generation program.

The plurality of first data sets 30 are used for machine learning of the encoder 5, the decoder 6, and the sorting model 7. The plurality of first data sets 30 used for machine learning of the encoder 5 and the decoder 6 and the plurality of first data sets 30 used for machine learning of the sorting model 7 may not necessarily be completely the same. The second data set 35 is generated as a result of performing information processing related to generation of a new training sample 36 using the trained encoder 5 and decoder 6. The second data set 35 is used for machine learning of the sorting model 7. The learning result data 125 indicates information on the trained sorting model 7 generated by machine learning. In the present embodiment, the learning result data 125 is generated as a result of executing the model generation program 81. Details will be described later.

The communication interface 13 is, for example, a wired local area network (LAN) module, a wireless LAN module, or the like, and is an interface for performing wired or wireless communication via a network. The model generation device 1 can perform data communication with other information processing devices via a network by using the communication interface 13. The external interface 14 is, for example, a universal serial bus (USB) port, a dedicated port, or the like, and is an interface for connecting with an external device. The type and number of external interfaces 14 may be arbitrarily selected. In one example, the training sample 31 may be obtained by a sensor. In another example, the training sample 31 may be generated by another computer. In these cases, the model generation device 1 may be connected to the sensors or the other computer via at least one of the communication interface 13 and the external interface 14.

The input device 15 is, for example, a device for performing input such as a mouse and a keyboard. The output device 16 is, for example, a device for performing output such as a display and a speaker. An operator such as a user can operate the model generation device 1 by using the input device 15 and the output device 16.

The drive 17 is, for example, a CD drive, a DVD drive, or the like, and is a drive device for reading various information such as programs stored in a storage medium 91. The storage medium 91 is a medium that stores information such as programs by an electrical, magnetic, optical, mechanical or chemical action so that computers, other devices, machines, or the like can read various stored information such as programs. At least one of the model generation program 81, the first data sets 30, and the second data sets 35 may be stored in the storage medium 91. The model generation device 1 may read at least one of the model generation program 81, the first data sets 30, and the second data sets 35 from the storage medium 91. In FIG. 2, as an example of the storage medium 91, a disk-type storage medium such as a CD or a DVD is illustrated. However, the type of storage medium 91 is not limited to a disk type, and may be a type other than the disk type. As a storage medium other than the disk type, for example, a semiconductor memory such as a flash memory can be cited. The type of drive 17 may be arbitrarily selected in accordance with the type of storage medium 91.

Regarding a specific hardware configuration of the model generation device 1, it is possible to omit, replace, and add components appropriately in accordance with an embodiment. For example, the control unit 11 may include a plurality of hardware processors. The hardware processors may be constituted by a microprocessor, a field-programmable gate array (FPGA), a digital signal processor (DSP), or the like. The storage unit 12 may be constituted by a RAM and a ROM included in the control unit 11. At least one of the communication interface 13, the external interface 14, the input device 15, the output device 16, and the drive 17 may be omitted. The model generation device 1 may be constituted by a plurality of computers. In this case, the hardware configurations of the computers may or may not match each other. The model generation device 1 may be an information processing device designed exclusively for a service provided, or may be a general-purpose server device, a personal computer (PC), or the like.

<Sorting Device>

FIG. 3 schematically illustrates an example of a hardware configuration of the sorting device 2 according to the present embodiment. As illustrated in FIG. 3, the sorting device 2 according to the present embodiment is a computer in which a control unit 21, a storage unit 22, a communication interface 23, an external interface 24, an input device 25, an output device 26, and a drive 27 are electrically connected to each other.

The control unit 21 to the drive 27 and a storage medium 92 of the sorting device 2 may be configured similarly to the control units 11 to the drive 17 and the storage medium 91 of the model generation device 1, respectively. The control unit 21 includes a CPU which is a hardware processor, a RAM, a ROM, and the like and is configured to execute various types of information processing based on programs and data. The storage unit 22 is constituted by, for example, a hard disk drive, a solid state drive, or the like. In the present embodiment, the storage unit 22 stores various information such as a sorting program 82 and learning result data 125.

The sorting program 82 is a program for causing the sorting device 2 to execute information processing (FIG. 8), which is to be described later, for performing a sorting task using a trained sorting model 7. The sorting program 82 includes a series of instructions for the information processing. At least one of the sorting program 82 and the learning result data 125 may be stored in the storage medium 92. The sorting device 2 may read at least one of the sorting program 82 and the learning result data 125 from the storage medium 92.

Similarly to the training sample 31 described above, in one example, the target sample 221 may be obtained by a sensor. In another example, the target sample 221 may be generated by another computer. In these cases, the sorting device 2 may be connected to the sensor or the other computer via at least one of the communication interface 23 and the external interface 24.

Regarding a specific hardware configuration of the sorting device 2, it is possible to omit, replace, or add components appropriately in accordance with an embodiment. For example, the control unit 21 may include a plurality of hardware processors. The hardware processors may be constituted by a microprocessor, an FPGA, a DSP, or the like. The storage unit 22 may be constituted by a RAM and a ROM included in the control unit 21. At least one of the communication interface 23, the external interface 24, the input device 25, the output device 26, and the drive 27 may be omitted. The sorting device 2 may be constituted by a plurality of computers. In this case, the hardware configurations of the computers may or may not match each other. The sorting device 2 may be an information processing device designed exclusively for a service provided, or may be a general-purpose server device, a general-purpose PC, an industrial PC, a tablet PC, a terminal device (for example, a smartphone or the like), a programmable logic controller (PLC), or the like.

[Software Configuration]

<Model Generation Device>

Figure 4:
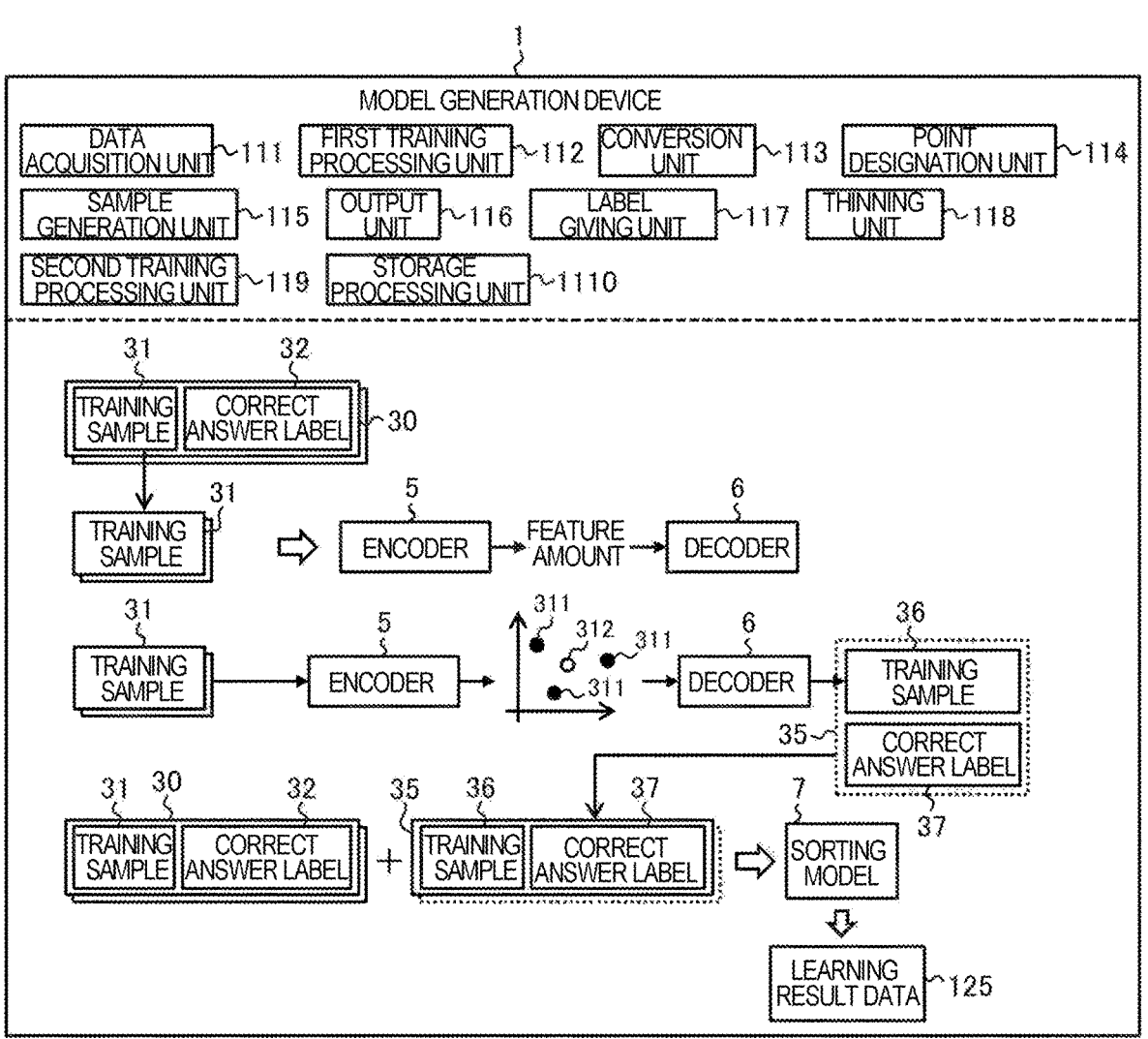
FIG. 4 schematically illustrates an example of a software configuration of the model generation device according to the embodiment.

FIG. 4 schematically illustrates an example of a software configuration of the model generation device 1 according to the present embodiment. The control unit 11 of the model generation device 1 decompresses the model generation program 81 stored in the storage unit 12 in the RAM. Then, the control unit 11 causes the CPU to interpret and execute instructions included in the model generation program 81 decompressed in the RAM to control each component. Thereby, as illustrated in FIG. 4, the model generation device 1 according to the present embodiment operates as a computer including a data acquisition unit 111, a first training processing unit 112, a conversion unit 113, a point designation unit 114, a sample generation unit 115, an output unit 116, a label giving unit 117, a thinning unit 118, a second training processing unit 119, and a storage processing unit 1110 as software modules. That is, in the present embodiment, each software module of the model generation device 1 is implemented by the control unit 11 (CPU).

The data acquisition unit 111 is configured to acquire a plurality of first data sets each constituted by a combination of a training sample 31 and a correct answer label 32. The training sample 31 includes a feature. The correct answer label 32 is configured to indicate the class to which the feature included in the corresponding training sample 31 belongs.

The first training processing unit 112 is configured to perform machine learning of the encoder 5 and the decoder 6 by using a plurality of training samples 31 included in the plurality of first data sets 30 acquired. The encoder 5 is configured to receive an input of a sample and convert the input sample into a feature amount. The decoder 6 is configured to receive an input of a feature amount and decode the sample from the input feature amount. The machine learning of the encoder 5 and the decoder 6 includes converting each training sample 31 into a feature amount by the encoder 5 and training the encoder 5 and the decoder 6 so that the sample decoded by the decoder 6 from each feature amount obtained matches each training sample 31.

The conversion unit 113 is configured to convert each of two or more training samples 31 among the plurality of training samples 31 into a feature amount by using the trained encoder 5 to acquire two or more sample points 311 corresponding to the respective training samples 31 on a feature space. The point designation unit 114 is configured to derive a linear sum 312 in which the sum of distances calculated from the sample points 311 in accordance with a predetermined index is maximum in a feature space, the linear sum 312 being the sum of two or more sample points 311 acquired.

The sample generation unit 115 is configured to generate a decoded sample corresponding to the feature amount of the linear sum 312 as a new training sample 36 by using the trained decoder 6. The output unit 116 is configured to output two or more training samples 31 and the new training sample 36 after generating the new training sample 36 and then disposing the two or more training samples 31 and the new training sample 36 in a feature space in accordance with a positional relationship. The label giving unit 117 is configured to generate the second data set 35 by giving the generated new training sample 36 a new correct answer label 37 which is configured to indicate the class to which a feature included in the generated new training sample 36 belongs.

When the thinning unit 118 is configured to select a thinning target from one or more second data sets 35 in a case where it is determined whether the density of sample points corresponding to the training sample (31 36) exceeds a threshold value in a feature space, and the density of sample points exceeds the threshold value when the training samples (31, 36) included in the plurality of first data sets 30 and the generated one or more second data sets 35 are converted into feature amounts by the trained encoder 5.

The second training processing unit 119 is configured to perform machine learning of the sorting model 7 by using the plurality of first data sets 30 and the generated one or more second data sets 35. When a thinning target is selected by the thinning unit 118, the second training processing unit 119 is configured to perform machine learning of the sorting model 7 except for the second data set 35 selected as the thinning target. The machine learning of the sorting model 7 includes, for each data set (30, 35), training the sorting model 7 so that a result of sorting the class to which a feature included in the training sample (31, 36) belongs by the sorting model 7 matches the correct answer label (32, 37). The storage processing unit 1110 generates information on the trained sorting model 7 generated by machine learning as learning result data 125. Then, the storage processing unit 1110 stores the generated learning result data 125 in a predetermined storage area.

(Example of Machine Learning Process)

Figure 5A:
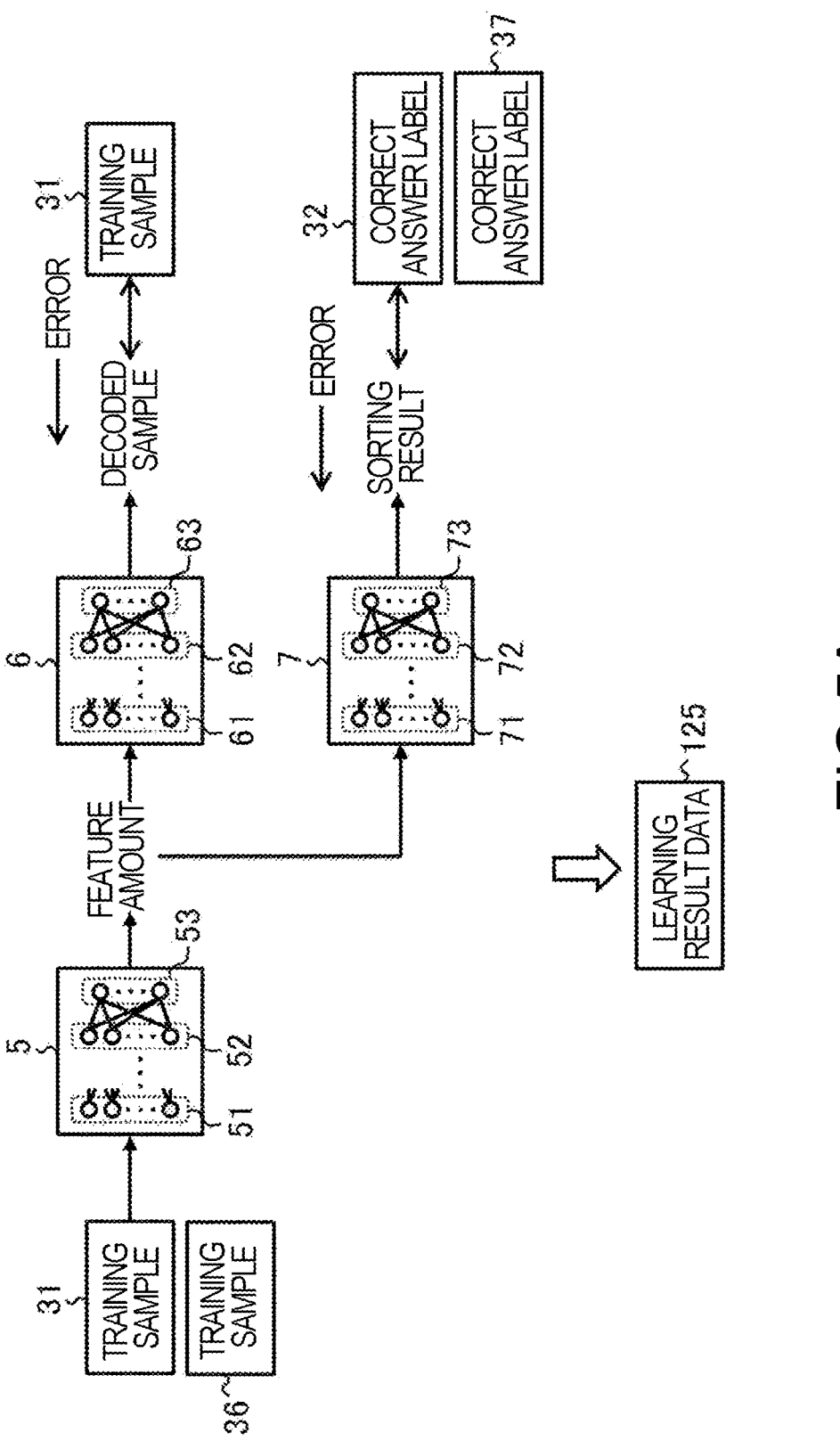
FIG. 5A schematically illustrates an example of a machine learning process of an encoder, a decoder, and a sorting model.
Figure 5B:
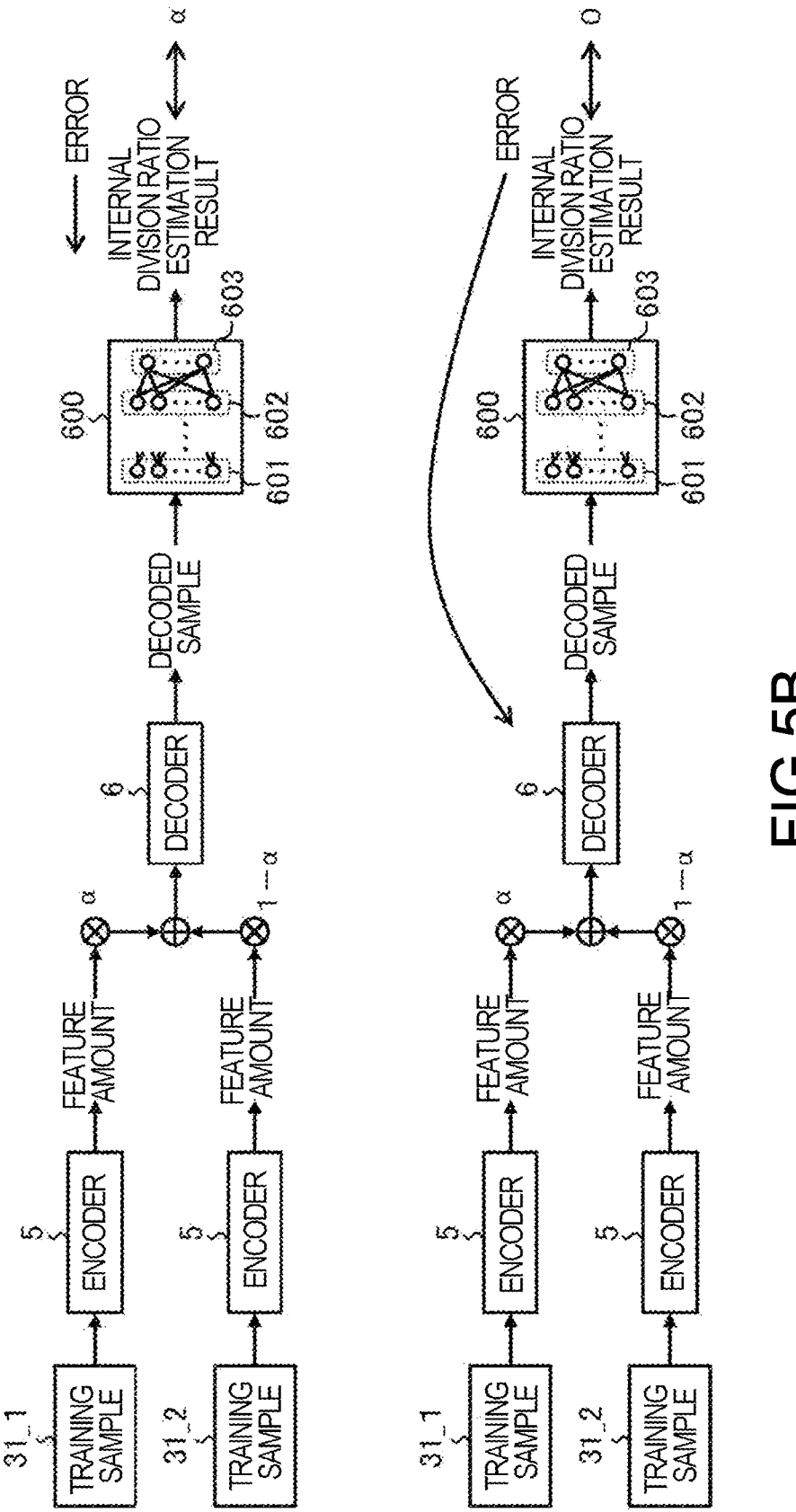
FIG. 5B schematically illustrates an example of a machine learning process of the encoder and the decoder.

FIG. 5A schematically shows an example of a training process of machine learning of the encoder 5 and the decoder 6, and machine learning of the sorting model 7. FIG. 5B schematically illustrates an example of a further training process of machine learning of the encoder 5 and the decoder 6.

As illustrated in FIG. 5A, the training sample 31 is used for training of the encoder 5 and the decoder 6. First, the first training processing unit 112 inputs each training sample 31 to the encoder 5 and executes computation processing of the encoder 5. Based on a computation result of the encoder 5, the first training processing unit 112 acquires a feature amount corresponding to each training sample 31. Subsequently, the first training processing unit 112 inputs each feature amount obtained to the decoder 6 and executes the computation processing of the decoder 6. Based on a computation result of the decoder 6, the first training processing unit 112 acquires a sample decoded from each feature amount. Then, the first training processing unit 112 calculates an error (reconfiguration error) between each decoded sample and each corresponding training sample 31 and adjusts the values of parameters of the encoder 5 and the decoder 6 so that the calculated error becomes small. Thereby, each training sample 31 is converted into a feature amount by the encoder 5, and the encoder 5 and the decoder 6 can be trained so that a sample decoded by the decoder 6 from each feature amount obtained matches each training sample 31.

In the present embodiment, for the machine learning of the encoder 5 and the decoder 6, adversarial learning as illustrated in FIG. 5B may be performed. In this case, an estimator 600 may be provided corresponding to the encoder 5 and the decoder 6. The estimator 600 may be appropriately configured to estimate an arbitrary internal division ratio from a decoded sample in a case where the decoded sample is generated by the decoder 6 from a synthesized feature amount obtained by synthesizing feature amounts corresponding to two samples at the internal division ratio.

As an example of adversarial learning processing, first, the first training processing unit 112 acquires two feature amounts corresponding to two training samples (31_1, 31_2) constituting each pair by using the encoder 5 for pairs (combinations) of the training samples 31 obtained from the plurality of first data sets 30. Next, the first training processing unit 112 calculates a synthesized feature amount for each pair by synthesizing two feature amounts obtained for each pair at a predetermined internal division ratio ($\alpha$:1-$\alpha$). The predetermined internal division ratio (value of $\alpha$) may be appropriately determined or changed for each pair/training repetition. Subsequently, the first training processing unit 112 generates a decoded sample for each pair from the calculated synthesized feature amount by using the decoder 6.

Then, the first training processing unit 112 inputs the decoded sample generated for each pair to the estimator 600 and executes the computation processing of the estimator 600. As a computation result of the estimator 600, the first training processing unit 112 acquires e result of estimating an internal division ratio from the decoded sample for each pair. The first training processing unit 112 calculates an error (estimation error) between the obtained estimation result of the internal division ratio and the corresponding true value ($\alpha$/1-$\alpha$) of the internal division ratio and adjusts the values of the parameters of the estimator 600 so that the calculated error becomes small. Thereby, the first training processing unit 112 trains, for each pair, the estimator 600 so that the result of estimating the internal division ratio from the generated decoded sample by the estimator 600 matches a predetermined internal division ratio.

The first training processing unit 112 inputs a decoded sample generated for each pair to the estimator 600 and executes the computation processing of the estimator 600. As a computation result of the estimator 600, the first training processing unit 112 acquires a result of estimating an internal division ratio from the decoded sample for each pair. The first training processing unit 112 adjusts the values of parameters of the encoder 5 and the decoder 6 so that an error between the obtained estimation result of the internal division ratio and the corresponding true value of the internal division ratio becomes large. In one example, the first training processing unit 112 calculates an error between the obtained estimation result of the internal division ratio and a fixed value (0 in FIG. 5B) and adjusts the values of parameters of the encoder 5 and the decoder 6 so that the calculated error becomes small. Thereby, the first training processing unit 112 trains, for each pair, the encoder 5 and the decoder 6 to generate a decoded sample for degrading the performance of the estimator 600 that estimates an internal division ratio (that is, to degrade the performance of the estimator 600 that estimates an internal division ratio from a generated decoded sample).

On the other hand, as illustrated in FIG. 5A, each dataset (30, 35) is used for the training of the sorting model 7. In the present embodiment, the sorting model 7 is configured to receive an input of a feature amount obtained by the encoder 5 and output a result of sorting the class to which a feature belongs from the input feature amount. That is, a computation process of a sorting task is configured to include the computation of the encoder 5. For this reason, first, the second training processing unit 119 inputs each training sample (31, 36) included in each data set (30, 35) to the encoder 5 and executes computation processing of the encoder 5. Based on a computation result of the encoder 5, the second training processing unit 119 acquires a feature amount corresponding to each training sample (31, 36). Subsequently, the second training processing unit 119 inputs each feature amount obtained to the sorting model 7 and executes the computation result of the sorting model 7. Based on the computation result of the sorting model 7, the second training processing unit 119 acquires a result of sorting the class to which a feature included in each training sample (31, 36) belongs. Then, the second training processing unit 119 calculates an error (sorting error) between the obtained sorting result and a true value (correct answer of sorting) indicated by each corresponding correct answer label (32, 37), and adjusts the values of parameters of the sorting model 7 so that the calculated error becomes small. Thereby, it is possible to train the sorting model 7 for each data set (30, 35) so that a result of sorting the class to which a feature included in the training sample (31, 36) belongs matches a correct answer (32, 37).

The learning result data 125 is configured to include information for executing computation of a sorting task. In the present embodiment, as described above, in response to the sorting model 7 being configured to use a computation results of the encoder 5, the storage processing unit 1110 generates information for reproducing the trained encoder 5 and the trained sorting model 7 as learning result data 125. Information on other trained machine learning models (the decoder 6 and the estimator 600 in the present embodiment) may or may not be included in the learning result data 125.

A portion of the machine learning of the sorting model 7 (specifically, a portion that uses the first data set 30) may be executed simultaneously with the machine learning of the encoder 5 and the decoder 6. In this case, in machine learning processing, the values of parameters of the encoder 5 may be adjusted such that the above-described sorting error becomes small. According to this configuration, since at least a portion of the training of the sorting model 7 can be performed together with the training of the encoder 5, the efficiency of the machine learning processing of the sorting model 7 can be improved.

However, the timing of machine learning of the sorting model 7 may not be limited to such an example. Machine learning of the sorting model 7 may be executed separately from machine learning of the encoder 5 and the decoder 6. The configuration of the sorting model 7 may not be limited to the above-described example. In another example, the computation process of the sorting task may be configured not to include the computation of the encoder 5. As a specific example, the sorting model 7 may be configured to receive an input of a sample and output a result of sorting the class to which a feature belongs from the input sample. In this case, information on the trained encoder 5 may be omitted from the learning result data 125. The output format of the sorting model 7 is not particularly limited as long as a result of sorting the class to which a feature included in a sample belongs can be specified, and may be appropriately determined in according with an embodiment. In one example, the sorting model 7 may be configured to output, for each class, a posterior probability that a feature included in an input sample belongs to the class, as a result of sorting the feature included in the sample.

(Example of Process of Generating New Training Sample)

Figure 5C:
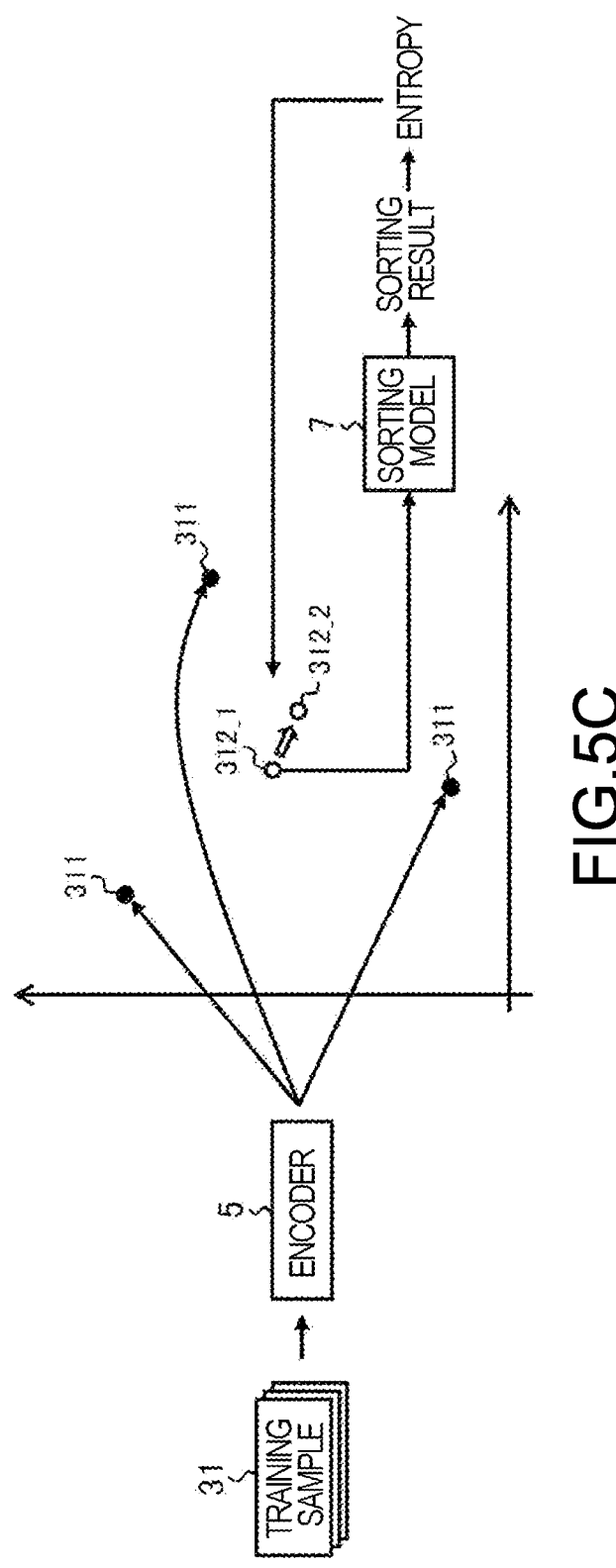
FIG. 5C schematically illustrates an example of a data generation process.
Figures 5D, 5E, 6:
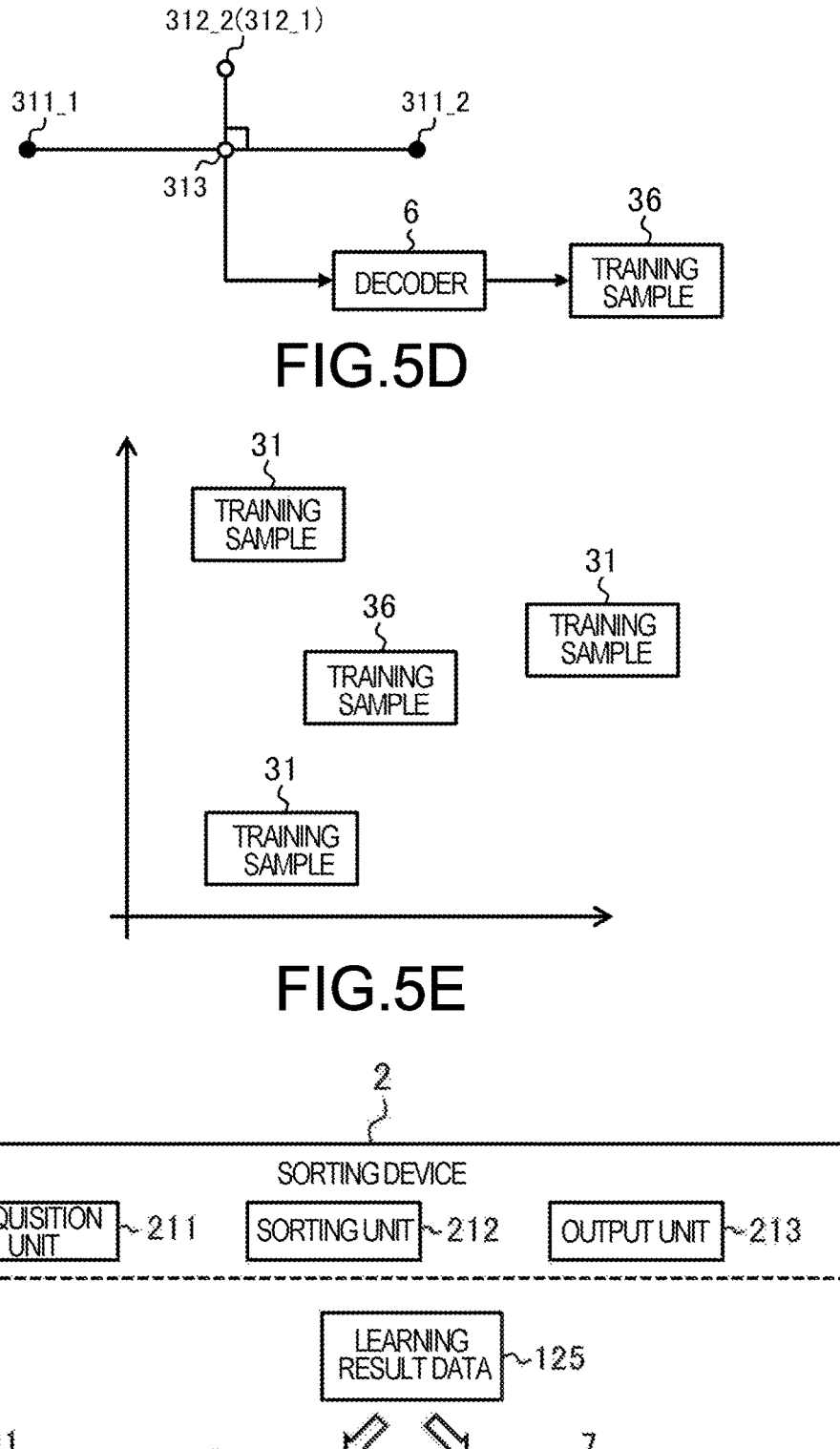
FIG. 5D schematically illustrates an example of a data generation process.
FIG. 5E schematically illustrates an example of an output format of new training samples.
FIG. 6 schematically illustrates an example of a software configuration of the sorting device according to the embodiment.

FIGS. 5C and 5D schematically illustrate an example of a process of generating a new training sample 36. As illustrated in FIG. 5C, first, the conversion unit 113 converts each of two or more training samples 31 among a plurality of training samples 31 into a feature by using the trained encoder 5. Thereby, the conversion unit 113 acquires two or more sample points 311 corresponding to the training samples 31 in a feature space.

Although FIG. 5C illustrates an example in which three sample points 311 are acquired, the number of sample points 311 to be acquired is not limited to three as long as it is two or more, and may be determined appropriately. The two or more training samples 31 from which the sample points 311 are obtained may be appropriately selected from among the plurality of training samples 31. In one example, in order to increase the sorting accuracy of the sorting model 7, it is preferable to generate a new training sample 36 in a range in which there are no samples near identification boundaries of different classes. For this reason, it is preferable that the two or more training samples 31 be selected to include training samples 31 associated with correct answer labels 32 indicating different classes.

Next, the point designation unit 114 derives a linear sum 312_1 in which the sum of distances calculated from the sample points 311 in accordance with a predetermined index is maximum in a feature space, the linear sum 312_1 being the linear sum 312 of the acquired two or more sample points 311. In the present embodiment, this directly derived linear sum 312_1 may be used to generate a new training sample 36. That is, the sample generation unit 115 inputs the derived linear sum 312_1 to the trained decoder 6 and executes the computation processing of the trained decoder 6. Thereby, the sample generation unit 115 may generate a decoded sample corresponding to the linear sum 312_1 as a new training sample 36 by using the trained decoder 6.

Here, in the present embodiment, the sorting model 7 may be configured to output, for each class, a posterior probability that a feature included in an input sample belongs to the class. In this case, the above-described machine learning of the sorting model 7 may be performed to be divided into first machine learning using a plurality of first data sets 30 and second machine learning using one or more second data sets 35. The first machine learning may be referred to as pre-learning for the second machine learning. The second machine learning may be referred to as re-learning or additional learning for the first machine learning. In the second machine learning, at least one of the plurality of first data sets 30 may be used again.

As illustrated in FIG. 5C, in the present embodiment, the point designation unit 114 may evaluate the entropy of a decoded sample by using a generated provisional trained sorting model 7 and may correct the linear sum 312_1 so that the entropy increases. Specifically, the point designation unit 114 calculates, for each class, a posterior probability that a feature included in a sample decoded by the trained decoder 6 belongs to the class from a feature amount of the derived linear sum 312_1 by using the provisional trained sorting model 7. In the present embodiment, the point designation unit 114 inputs the derived linear sum 312_1 to the provisional trained sorting model 7 and executes the computation processing of the provisional trained sorting model 7. Through this computation processing, the point designation unit 114 can obtain, for each class, a result of calculating a posterior probability that a feature included in a decoded sample belongs to the class. Next, the point designation unit 114 calculates the entropy of the decoded sample from the calculated posterior probability for each class.

Entropy indicates the degree to which a feature included in a decoded sample can be sorted (in other words, uncertainty). Higher uncertainty indicates that it is difficult to sort a feature included in the sample, that is, machine learning of the sample is insufficient in a provisionally trained sorting model 7. The point designation unit 114 may correct the derived linear sum 312_1 so that the entropy increases based on a gradient of the calculated entropy. Through this processing, the point designation unit 114 may acquire the corrected linear sum 312_2. In the present embodiment, the corrected linear sum 312_2 may be used to generate a new training sample 36. That is, the sample generation unit 115 may input the corrected linear sum 312_2 to the trained decoder 6 and execute computation processing of the trained decoder 6. Thereby, the sample generation unit 115 may generate a decoded sample corresponding to the corrected linear sum 312_2 as a new training sample 36 by using the trained decoder 6.

As illustrated in FIG. 5D, the point designation unit 114 may extract two sample points (311_1, 311_2) near the linear sum 312_2 derived by the above-described computation among the acquired two or more sample points 311 in response to the execution of the above-described adversarial learning. Then, the point designation unit 114 may acquire a projection point 313 corresponding to the linear sum 312_2 by projecting the derived linear sum 312_2 onto a straight line connecting the extracted two sample points (311_1, 311_2) in a feature space. When correction based on entropy is not executed, the point designation unit 114 may extract two sample points (311_1 and 311_2) near the linear sum 312_1 and acquire a projection point 313 corresponding to the linear sum 312_1.

Extracting the two sample points (311_1, 311_2) may be configured by extracting two sample points of different classes to which features included in the corresponding training samples 31 belong. That is, the point designation unit 114 may extract two sample point (311_1, 311_2) derived from the training samples 31 with different true values of the classes indicated by the associated correct answer labels 32 from the sample points 311 near the linear sum 312_2 (or the linear sum 312_1).

In the present embodiment, the acquired projection point 313 may be used to generate a new training sample 36. That is, the sample generation unit 115 may input the value of the projection point 313 to the trained decoder 6 and execute the computation processing of the trained decoder 6. Thereby, the sample generation unit 115 may generate a decoded sample corresponding to a feature amount of the projection point 313 as a new training sample 36 by using the trained decoder 6.

(Example of Output)

FIG. 5E schematically illustrates an example of an output format of a new training sample 36. After the new training sample 36 is generated by the above-described computation, the output unit 116 holds a positional relationship in a feature space and then outputs two or more training samples 31 and the new training sample 36. In response to this, after the output unit 116 outputs two or more training samples 31 and the new training sample 36, the label giving unit 117 is configured to receive the designation of a class to which a feature included in the new training sample 36 belongs (that is, the new training sample 36) and give a new correct answer label 37 configured to indicate the designated class to the new training sample 36.

In the example of FIG. 5E, three training samples 31 are displayed. In one example, all training samples 31 used to generate a new training sample 36 may be output. However, when the number of training samples 31 used to generate the new training sample 36 is large, the output of the training samples 31 may occupy a large portion of output resources (for example, a display area of the display), resulting in a possibility that a region for outputting the new training sample 36 will be limited. Consequently, in another example, the output unit 116 may select, for each different class, one training sample 31 closest to the new training sample 36 in the feature space from among the training samples 31 used to generate the new training sample 36 and output only the training sample 31 of each selected class along with the new training sample 36. Thereby, it is possible to achieve an improvement in the efficiency of output resources. As a result, when the training sample 31 of each class and the new training sample 36 are compared with each other, each training sample (31, 36) can be easily viewed.

(Example of Configuration of Each Model)

In the present embodiment, the encoder 5, the decoder 6, the sorting model 7, and the estimator 600 are used as machine learning models (models in which the values of parameters are adjusted by machine learning). As long as the computation processing of each of the encoder 5, the decoder 6, the sorting model 7, and the estimator 600 can be executed, the type of machine learning model that constitutes each of them may not be particularly limited, and may be appropriately selected in accordance with an embodiment.

In one example, a neural network may be used in the machine learning model that constitutes each of the encoder 5, the decoder 6, the sorting model 7, and the estimator 600, as illustrated in FIGS. 5A and 5B. In the examples of FIGS. 5A and 5B, each of the encoder 5, the decoder 6, the sorting model 7, and the estimator 600 includes an input layer (51, 61, 71, 601), one or more intermediate (hidden) layers (52, 62, 72, 602), and an output layer (53, 63, 73, 603). The number of intermediate layers (52, 62, 72, 602) may be appropriately selected in accordance with an embodiment. The number of hidden layers (52, 62, 72, 602) may differ between the encoder 5, the decoder 6, the sorting model 7, and the estimator 600, or may be the same between at least some of them. The intermediate layers (52, 62, 72, 602) may be omitted. The number of neural networks that constitute the encoder 5, the decoder 6, the sorting model 7, and the estimator 600 may be appropriately determined in accordance with an embodiment.

Each layer (51 to 53, 61 to 63, 71 to 73, 601 to 603) includes one or a plurality of nodes (neurons). The number of nodes included in each layer (51 to 53, 61 to 63, 71 to 73, 601 to 603) may not be particularly limited and may be appropriately selected in accordance with an embodiment. The nodes included in each layer (51 to 53, 61 to 63, 71 to 73, 601 to 603) may be coupled to all nodes in adjacent layers. Thereby, the encoder 5, the decoder 6, the sorting model 7, and the estimator 600 may be constituted by a fully-connected neural network. However, a coupling relationship between the nodes may not be limited to such an example, and may be appropriately determined in according with an embodiment. For example, each node may be connected to a specific node in an adjacent layer, or may be connected to a node in a layer other than the adjacent layer.

A weight (coupling weight) is set for each coupling of each layer (51 to 53, 61 to 63, 71 to 73, 601 to 603). A threshold value is set for each node, and basically, the output of each node is determined depending on whether the sum of products of inputs and weights exceeds the threshold value. The threshold value may be expressed by an activation function. In this case, the output of each node is determined by inputting the sum of products of inputs and weights to the activation function and executing the computation of the activation function. The type of activation function may be selected arbitrarily. The weight of coupling between nodes and the threshold value of nodes included in each layer (51 to 53, 61 to 63, 71 to 73, 601 to 603) are examples of parameters used for computation processing of each of the encoder 5, the decoder 6, the sorting model 7, and the estimator 600.

When each machine learning model (the encoder 5, the decoder 6, the sorting model 7, and the estimator 600) is constituted by a neural network, the computation processing of each machine learning model is constituted by computation processing of forward propagation. That is, in the computation processing of each machine learning model, data is input to each input layer (51, 61, 71, 601), and computation processing such as firing determination of neurons included in each layer (51 to 53, 61 to 63, 71 to 73, 601 to 603) is executed in order from the input side. As a result of the computation processing of forward propagation, a result of performing a task of each machine learning model is acquired from the output layer (53, 63, 73, 603). In the present embodiment, data input to the encoder 5 and the estimator 600 is a sample, and data input to the decoder 6 and sorting model 7 is a feature amount. A task of the encoder 5 is to convert a sample into a feature amount. A task of the decoder 6 is to decode a sample from a feature amount. The sorting model 7 is to sort the class of a feature included in a sample. The estimator 600 is to estimate an internal division ratio of a decoded sample. In each machine learning processing described above, the values of parameters of each machine learning model are adjusted by an error back propagation method so that each error becomes small.

In the present embodiment, the storage processing unit 1110 generates learning result data 125 for reproducing the trained encoder 5 and sorting model 7 generated by machine learning. A configuration of the learning result data 125 is not particularly limited as long as the trained encoder 5 and sorting model 7 can be reproduced, and may be appropriately determined in accordance with an embodiment. In one example, the learning result data 125 may include information indicating the values of parameters of the encoder 5 and the sorting model 7 which are obtained by the adjustment of the machine learning. In some cases, the learning result data 125 may further include information indicating the structures of the encoder 5 and the sorting model 7. The structures may be specified, for example, by the number of layers from an input layer to an output layer in a neural network, the type of each layer, the number of nodes included in each layer, a coupling relationship between nodes in adjacent layers, and the like. When the structure of each machine learning model is shared between devices, the information indicating the structures of the encoder 5 and the sorting model 7 may be omitted.

<Sorting Device>

FIG. 6 schematically illustrates an example of a software configuration of the sorting device 2 according to the present embodiment. The control unit 21 of the sorting device 2 decompresses a sorting program 82 stored in the storage unit 22 in the RAM. Then, the control unit 21 causes the CPU to interpret and execute instructions included in the sorting program 82 decompressed in the RAM to control each component. Thereby, as illustrated in FIG. 6, the sorting device 2 according to the present embodiment operates as a computer including an acquisition unit 211, a sorting unit 212, and an output unit 213 as software modules. That is, in the present embodiment, each software module of the sorting device 2 is realized by the control unit 21 (CPU) similar to the model generation device 1.

The acquisition unit 211 is configured to acquire a target sample 221. The sorting unit 212 includes a trained sorting model 7 generated by the model generation device 1 by storing learning result data 125. The sorting unit 212 is configured to sort the class to which a feature included in the acquired target sample 221 belongs by using the trained sorting model 7. In the present embodiment, the sorting unit 212 includes the trained encoder 5 and sorting model 7 by storing the learning result data 125. The sorting unit 212 is configured to perform a sorting task on the target sample 221 by using the trained encoder 5 and sorting model 7. The output unit 213 is configured to output information on results of sorting classes (that is, performing a sorting task).

<Others>

The software modules of the model generation device 1 and the sorting device 2 will be described in detail in operation examples to be described later. In the present embodiment, an example in which the software modules of the model generation device 1 and the sorting device 2 are implemented by a general-purpose CPU. However, some or all of the software modules may be implemented by one or more dedicated processors (for example, graphics processing units). Each module described above may be implemented as a hardware module. With respect to the software configurations of the model generation device 1 and the sorting device 2, software modules may be omitted, replaced, or added appropriately in accordance with an embodiment.

§ 3 Operation Example

[Model Generation Device]

Figure 7B:
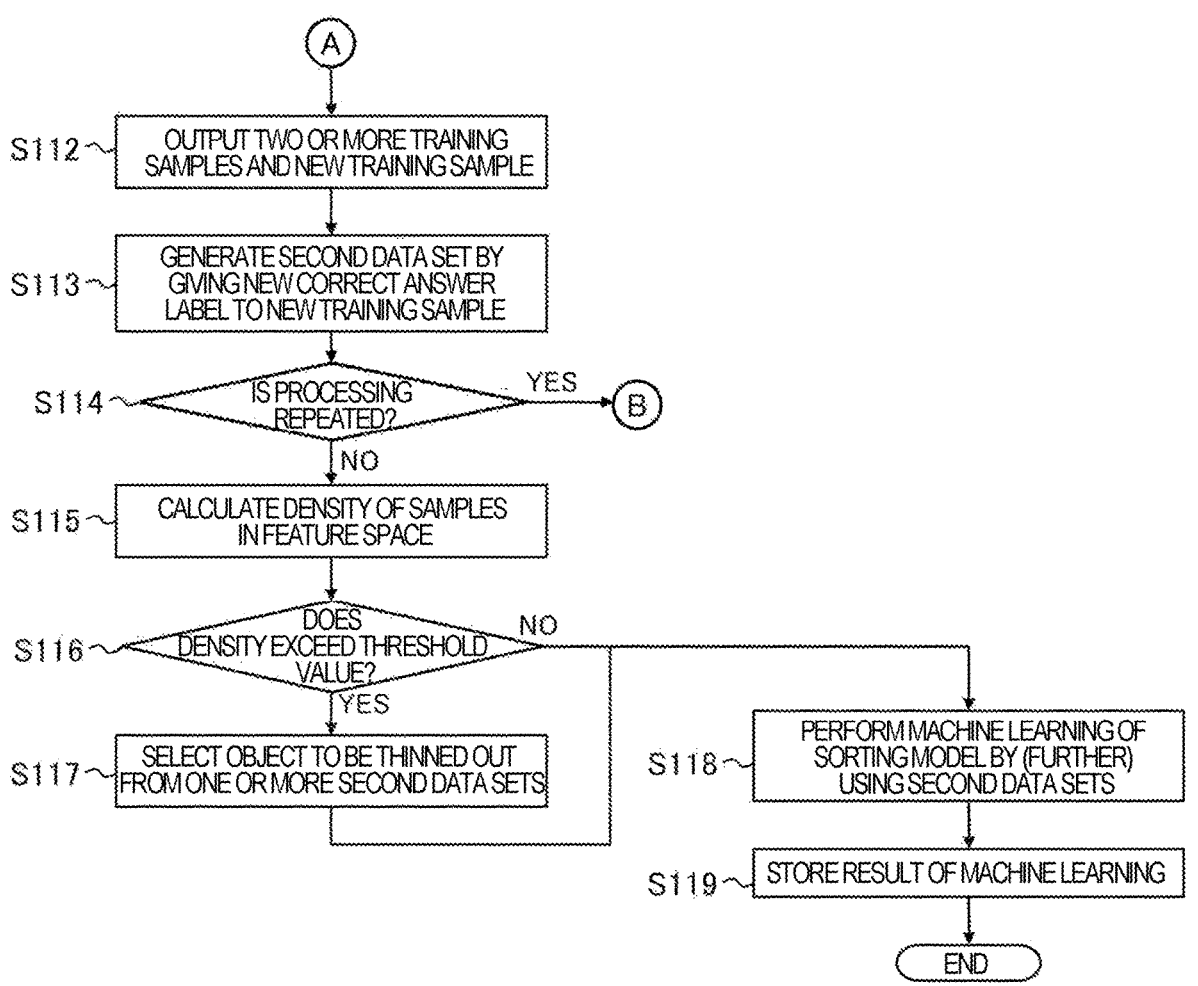
FIG. 7B is a flowchart showing an example of a processing procedure of the model generation device according to the embodiment.

FIGS. 7A and 7B are flowcharts showing an example of a processing procedure regarding machine learning and data generation of the model generation device 1 according to the present embodiment. The processing procedure of the model generation device 1 to be described below is an example of a model generation method. However, the processing procedure of the model generation device 1 to be described below is merely an example, and each step may be changed as far as possible. In the following processing procedure, steps may be omitted, replaced, or added appropriately in accordance with an embodiment.

(Step S101)

In step S101, the control unit 11 operates as the data acquisition unit 111 and acquires a plurality of first data sets 30 each constituted by a combination of the training sample 31 and the correct answer label 32.

Each first data set 30 may be generated appropriately. For example, each training sample 31 can be acquired by assuming an environment in which a sorting task is performed in a real space or a virtual space, and observing any target in the environment. An observation target may be appropriately selected in accordance with a sorting task. Any sensor may be used to acquire each training sample 31. As an example, when a sorting task is to identify the type of object shown in an image, the training sample 31 can be acquired by imaging the object with a camera. Next, a result of performing the sorting task on each acquired training sample 31, that is, information indicating a correct answer (true value) of a class to which a feature included in each training sample 31 belongs is acquired as the correct answer label 32. In this scene, the sorting task may be performed manually by an operator or the like. Then, the obtained correct answer label 32 is associated with the corresponding training sample 31. Thereby, each first data set 30 can be generated.

The first data sets 30 may be generated automatically by the operation of a computer, or may be generated manually by including at least a portion of an operator's operation. The first data sets 30 may be generated by the model generation device 1 or may be generated by a computer other than the model generation device 1. When the model generation device 1 generates the first data sets 30, the control unit 11 executes the above-described series of generation processing automatically or manually by the operator's operation through the input device 15 to acquire the plurality of first data sets 30. On the other hand, when the first data sets 30 are generated by another computer, the control unit 11 acquires the plurality of first data sets 30 generated by the other computer, for example, through a network, the storage medium 91, or the like. Some of the first data sets 30 may be generated by the model generation device 1, and the other first data sets 30 may be generated by one or a plurality of other computers.

The number of first data sets 30 to be acquired may be arbitrarily selected. When the plurality of first data sets 30 are acquired, the control unit 11 causes the processing to proceed to the next step S102.

(Step S102)

In step S102, the control unit 11 operates as the first training processing unit 112 and performs machine learning of the encoder 5 and the decoder 6 by using the plurality of training samples 31 included in the plurality of first data sets 30 acquired. At least some of the training samples 31 acquired in step S101 are used for machine learning of the encoder 5 and the decoder 6.

As an example of machine learning processing, first, the control unit 11 performs initial setting for a machine learning model to be processed in the machine learning. In the present embodiment, the control unit 11 performs initial setting of the encoder 5, the decoder 6, and the estimator 600. The structure of each machine learning model and initial values of parameters may be given by a template or determined by an operator's input. When re-learning or additional learning is performed, the control unit 11 may perform initial setting of each machine learning model based on learning result data obtained by the past machine learning.

Next, the control unit 11 converts each training sample 31 into a feature amount by the encoder 5 and trains the encoder 5 and the decoder 6 so that a sample decoded by the decoder 6 from each feature amount obtained matches each training sample 31. In the present embodiment, as adversarial learning, the control unit 11 trains the estimator 600 so that a result obtained by estimating an internal division ratio in a synthesized feature amount by the estimator 600 from a decoded sample generated by the decoder 6 matches a predetermined internal division ratio. The control unit 11 trains the encoder 5 and the decoder 6 to degrade the performance of the estimator 600 that estimates an internal division ratio from a generated decoded sample. Stochastic gradient descent, mini-batch gradient descent, or the like may be used for each training processing.

As an example of the training processing, first, the control unit 11 inputs each training sample 31 to the input layer 51 of the encoder 5 and executes computation processing of forward propagation of the encoder 5. The control unit 11 acquires an output corresponding to a result obtained by converting each training sample 31 into a feature amount from the output layer 53 through the computation of forward propagation of the encoder 5. Subsequently, the control unit 11 inputs each feature amount obtained to the input layer 61 of the decoder 6 and executes computation processing of forward propagation of the decoder 6. Through the computation processing of forward propagation of the decoder 6, the control unit 11 acquires, from the output layer 63, an output corresponding to a result of decoding a sample from each feature amount. Next, the control unit 11 calculates an error (reconfiguration error) between each decoded sample obtained and each corresponding training sample 31. The control unit 11 further calculates a gradient of the calculated error and backpropagates the gradient of the calculated error by an error backpropagation method, thereby calculating errors of the values of parameters of the encoder 5 and the decoder 6 in order from the output layer 63. Then, the control unit 11 updates the values of the parameters of the encoder 5 and the decoder 6 based on the calculated errors of the parameters so that the sum of the calculated errors is reduced.

As adversarial learning, the control unit 11 inputs two training samples (31_1, 31_2) constituting each pair to the input layer 51 of the encoder 5 and executes computation processing of forward propagation of the encoder 5. Through the computation processing of the forward propagation, the control unit 11 acquires, from the output layer 53, an output corresponding to a result of converting each of the two training samples (31_1, 31_2) constituting each pair into a feature amount. It is preferable that each pair be constituted by two training samples (31_1, 31_2) of different classes to which features included therein belong (that is, different true values indicated by the correct answer label 32). However, the configuration of the pair may not be limited to such an example. Each pair may be constituted by two training samples (31_1, 31_2) having the same class to which features included therein belong. The pairs may be created at the stage of the training sample 31 or may be created at the stage of a feature amount. The pairs may be created at any timing before synthesis at an internal division ratio.

The control unit 11 calculates a synthesized feature amount for each pair by synthesizing two feature amounts acquired for each pair at a predetermined internal division ratio ($\alpha$:1−$\alpha$). The predetermined internal division ratio (the value of $\alpha$) may be appropriately determined or changed for each pair/training repetition. In one example, the predetermined internal division ratio may be determined randomly or in accordance with a predetermined rule. In another example, the predetermined internal division ratio may be determined by an operator's designation. For example, a plurality of internal division ratios may be designated by the operator, and any one of the plurality of internal division ratios designated may be used as a predetermined internal division ratio. The control unit 11 inputs a synthesized feature amount to the input layer 61 of the decoder 6 and executes computation processing of forward propagation of the decoder 6. Through the computation processing of the forward propagation, the control unit 11 acquires, from the output layer 63, an output corresponding to a result of decoding a sample from a synthesized feature amount of each pair.

The control unit 11 inputs a decoded sample generated for each pair to the input layer 601 of the estimator 600 and executes computation processing of forward propagation of the estimator 600. Through the computation processing of the forward propagation, the control unit 11 acquires, from the output layer 603, an output corresponding to a result of estimating an internal division ratio from the decoded sample of each pair. The control unit 11 calculates an error (estimation error) between the obtained estimation result of the internal division ratio and the corresponding true value ($\alpha$/1−$\alpha$) of the predetermined internal division ratio. The control unit 11 further calculates a gradient of the calculated error and backpropagates the gradient of the calculated error by an error backpropagation method, thereby calculating errors of the values of parameters of the estimator 600 in order from the output layer 603. Then, the control unit 11 updates the values of the parameters of the estimator 600 based on the calculated errors of the parameters so that the sum of the calculated errors is reduced.

The control unit 11 inputs a decoded sample generated for each pair to the input layer 601 of the estimator 600 and executes computation processing of forward propagation of the estimator 600. Through the computation processing of the forward propagation, the control unit 11 acquires, from the output layer 603, an output corresponding to a result of estimating an internal division ratio from the decoded sample of each pair. The control unit 11 calculates an error from the obtained estimation result of the internal division ratio so that the accuracy of estimation of the estimator 600 is lowered. In one example, the control unit 11 calculates an error between the obtained estimation result of the internal division ratio and a fixed value (0 in FIG. 5B). The control unit 11 further calculates a gradient of the calculated error and backpropagates the gradient of the calculated error via the estimator 600 to the encoder 5 and the decoder 6 by an error backpropagation method, thereby calculating errors of the values of the encoder 5 and the decoder 6 in order from the output layer 63. Then, the control unit 11 updates the values of the parameters of the encoder 5 and the decoder 6 so that an estimation result of the internal division ratio deviates from a true value (so that the sum of the calculated errors is reduced when an error from a fixed value is calculated) based on the calculated errors of the parameters. In another example, the control unit 11 may calculate an error between the obtained estimation result of the internal division ratio and the corresponding true value of the predetermined internal division ratio. Then, the control unit 11 may update the values of the parameters of the encoder 5 and the decoder 6 by an error backpropagation method so that the sum of the calculated errors increases.

A loss function may be used to calculate each of the reconfiguration error, the estimation error, and the error for reducing the performance of the estimator 600. The loss function may be appropriately set in accordance with each task, the format of a correct answer, and the like. The degree to which the values of the parameters are updated may be adjusted by a learning rate. The learning rate may be designated by an operator or may be given as a specified value within a program. The control unit 11 may repeatedly adjust the value of each parameter by the series of updating processing described above until predetermined conditions, such as the adjustment being executed by a specified number of times and the sum of calculated errors being equal to or less than a threshold value, are satisfied.

By adjusting the parameters based on the reconfiguration error, the encoder 5 and the decoder 6 convert each training sample 31 into a feature amount by the encoder 5 and are trained to acquire an ability to decode a sample matching each training sample 31 by the decoder 6 from each feature amount obtained. By adjusting the parameters of the estimator 600 in adversarial learning, the estimator 600 is trained to acquire an ability to estimate a predetermined internal division ratio from a generated decoded sample in accordance with the abilities of the encoder 5 and the decoder 6 for each pair. By adjusting the parameters of the encoder 5 and the decoder 6 in adversarial learning, the encoder 5 and the decoder 6 are trained to acquire an ability to generate a decoded sample for degrading the performance of the estimator 600 that estimates an internal division ratio (that is, a decoded sample from which it is difficult to estimate an internal division ratio by the estimator 600) for each pair in accordance with the ability of the estimator 600.

The training of the estimator 600 and the training of the encoder 5 and the decoder 6 in adversarial learning may be repeatedly performed alternately. In this case, computation processing for obtaining an estimation result of an internal division ratio by the estimator 600 may be executed for each training. A series of processing for generating a decoded sample from two training samples 31 may be executed separately between trainings, or may be executed in common between trainings. The series of processing for generating a decoded sample may be executed for each repetition of training. The values of parameters of the encoder 5 and the decoder 6 may be fixed in the training of the estimator 600, and the values of parameters of the estimator 600 may be fixed in the training of the encoder 5 and the decoder 6.

Alternatively, a gradient inversion layer (not illustrated) may be provided between the decoder 6 and the estimator 600. The gradient inversion layer may be appropriately configured to transmits values during computation of forward propagation as it is and to invert values during backward propagation. In this case, the training of the estimator 600 and the training of the encoder 5 and the decoder 6 may be executed at once. That is, computation processing until an estimation result of an internal division ratio is obtained from two training samples 31 may be executed in common between trainings. The series of processing for generating a decoded sample may be executed for each repetition of training.

In one example, the training of adversarial learning (FIG. 5B) may be executed simultaneously with the training based on a reconfiguration error (FIG. 5A). In this case, computation processing for calculating a feature amount of each pair may be executed in common with the computation processing of the encoder 5 in training based on a reconfiguration error. In another example, training of adversarial learning may be executed separately from training based on a reconfiguration error.

The machine learning of the encoder 5 and the decoder 6 may not be limited to the training based on the errors described above. In one example, the control unit 11 may calculate an error between a feature amount obtained from the encoder 5 and a value obtained from a predetermined probability distribution (for example, the Gaussian distribution or the like) and may further adjust the values of the parameters of the encoder 5 so that the sum of calculated errors is reduced, in addition to the updating processing based on the errors described above. Thereby, the control unit 11 may normalize an output value of the encoder 5.

As a result of the machine learning, the control unit 11 can generate the trained encoder 5 and decoder 6. When the machine learning processing is completed, the control unit 11 causes the processing to proceed to the next step S103. (Step S103)

In step S103, the control unit 11 operates as the second training processing unit 119 and performs machine learning of the sorting model 7 by using a plurality of first data sets 30. The machine learning in step S103 is an example of the above-described first machine learning of the sorting model 7. The plurality of first data sets 30 used for the machine learning of the sorting model 7 may not be the same as the plurality of first data sets 30 (training samples 31) used for machine learning of the encoder 5 and the decoder 6. A portion of the first data sets 30 used for the machine learning of the sorting model 7 may not be used for the machine learning of the encoder 5 and the decoder 6.

The machine learning of the sorting model 7 may be executed in the same manner as the machine learning of the encoder 5 and the decoder 6, except that error calculation and an adjustment target are different. As an example, first, the control unit 11 performs initial setting of the sorting model 7 to be processed in machine learning. The structure of the sorting model 7 and initial values of parameters may be given by a template or determined by an operator's input. When re-learning or additional learning is performed, the control unit 11 may perform initial setting of the sorting model 7 based on learning result data obtained by the past machine learning.

Next, the control unit 11 converts the training sample 31 into a feature amount by the encoder 5 and trains the sorting model 7 so that a result of sorting the class of a feature included in the training sample 31 by the sorting model 7 from the obtained feature amount, matches a true value indicated by the corresponding correct answer label 32 for each first data set 30. Stochastic gradient descent, mini-batch gradient descent, or the like may be used for each training processing.

As an example of training processing, first, the control unit 11 inputs the training sample 31 included in each first data set 30 to the input layer 51 of the encoder 5 and executes computation processing of forward propagation of the encoder 5. The control unit 11 acquires an output corresponding to a result obtained by converting each training sample 31 into a feature amount from the output layer 53 through the computation of forward propagation of the encoder 5. Subsequently, the control unit 11 inputs each feature amount obtained to the input layer 71 of the sorting model 7 and executes computation processing of forward propagation of the sorting model 7. Through the computation processing of forward propagation of the sorting model 7, the control unit 11 acquires an output corresponding to a result of sorting a feature included in each training sample 31 from the output layer 73. Next, the control unit 11 calculates an error (sorting error) between the obtained sorting result and the true value indicated by the corresponding correct answer label 32. A loss function may be used to calculate the error. The loss function may be set appropriately. The control unit 11 further calculates a gradient of the calculated error and backpropagates the gradient of the calculated error by an error backpropagation method, thereby calculating errors of values of parameters of the sorting model 7 in order from the output layer 73. Then, the control unit 11 updates the values of the parameters of the sorting model 7 based on the calculated errors of the parameters. The degree to which the values of the parameters are updated may be adjusted by a learning rate. The learning rate may be designated by an operator or may be given as a specified value within a program.

The control unit 11 adjusts the values of the parameters of the sorting model 7 so that the sum of calculated errors is reduced for each first data set 30 through the series of updating processing. The control unit 11 may repeatedly adjust the value of each parameter value by the series of updating processing described above until predetermined conditions, such as the adjustment being executed by a specified number of times and the sum of calculated errors being equal to or less than a threshold value, are satisfied. As a result of the machine learning, it is possible to generate a trained sorting model 7 that has acquired an ability to sort the class of a feature included in a sample within the first data set 30 used. That is, the control unit 11 can generate a provisional trained sorting model 7. When the machine learning processing is completed, the control unit 11 causes the processing to proceed to the next step S104.

The machine learning processing of the sorting model 7 in step S103 may be executed simultaneously with the machine learning processing of the encoder 5 and the decoder 6 in step S102. In this case, processing for converting each training sample 31 into a feature amount by the encoder 5 may be executed in common between the machine learning in step S102 and the machine learning in step S103. In the machine learning of step S103, the control unit 11 may backpropagate the gradient of the calculated error to the encoder 5 and calculate errors of the values of the parameters of the encoder 5. Then, the control unit 11 may also update the values of the parameters of the encoder 5 based on the calculated errors of the parameters. Thereby, the control unit 11 may adjust the values of the parameters of the encoder 5 together with the sorting model 7 based on sorting errors.

(Step S104 to Step S105)

In step S104, the control unit 11 operates as the conversion unit 113 and converts two or more training samples 31 among the plurality of training samples 31 into feature amounts by using the encoder 5 trained by the machine learning. In the present embodiment, the control unit 11 inputs each of the two or more training samples 31 to the input layer 51 of the trained encoder 5 and executes computation processing of forward propagation of the trained encoder 5. Thereby, the control unit 11 acquires two or more sample points 311 corresponding to the training sample 31 in a feature space. When the two or more sample points 311 are acquired, the control unit 11 causes the processing to proceed to the next step S105.

Two or more training samples 31 to be used may be appropriately selected from among the plurality of first data sets 30. It is preferable that at least some of the two or more training samples 31 be selected such that classes to which features included therein belong are different from each other. However, a method of selecting the training samples 31 to be used may not be limited to such an example. Two or more training samples 31 may be selected such that classes to which features included therein belong are the same.

In step S105, the control unit 11 operates as the point designation unit 114, and derives a linear sum 312 (312_1) in which the sum of distances calculated from the sample points 311 in accordance with a predetermined index is maximum in a feature space, the linear sum being the linear sum 312 (312_1) of the acquired two or more sample points 311. A linear sum 312_1 (X) may be calculated from each sample point 311 ($x_i$) to satisfy Equations 3 to 5 below.

[Math. 3]

$$x = \sum_i \alpha_i x_i \qquad \text{(Equation 3)}$$

[Math. 4]

$$\sum_i \alpha_i = 1 \qquad \text{(Equation 4)}$$

[Math. 5]

$$\alpha_i \geq 1 \qquad \text{(Equation 5)}$$

$\alpha_i$ indicates a coefficient vector for the value of each sample point 311 ($x_i$).

The predetermined index is appropriately separated from each sample point 311 and may be appropriately set to derive the sample points of the linear sum 312 (312_1) that contributes to forming a state in which the sample points are evenly present in a feature space. In one example, the predetermined index may be configured by either Equation 1 or Equation 2 above. When Equation 1 is adopted as the predetermined index, the control unit 11 calculates the center of gravity of each sample point 311 as the linear sum 312_1. When Equation 2 is adopted as the predetermined index, the control unit 11 calculates a Voronoi point of each sample point 311 as the linear sum 312_1. When the derivation of the linear sum 312 (312_1) is completed, the control unit 11 causes the processing to proceed to the next step S106.

(Step S106 to Step S108)

In step S106, the control unit 11 operates as the point designation unit 114 and calculates, for each class, a posterior probability that a feature included in a sample decoded by the trained decoder 6 from the derived feature amount of the linear sum 312_1 belongs to the class by using the provisional trained sorting model 7. In the present embodiment, the control unit 11 inputs the linear sum 312_1 derived to the input layer 71 of the provisional trained sorting model 7 and executes computation processing of forward propagation of the provisional trained sorting model 7. Through the computation processing of the forward propagation, the control unit 11 acquires an output corresponding to a result (that is, a sorting result), which is obtained by calculating, for each class, the posterior probability that a feature included in a sample decoded by the trained decoder 6 from the derived linear sum 312_1 belongs to the class, from the output layer 73. When the calculation of the posterior probability is completed, the control unit 11 causes the processing to proceed to the next step S107.

In step S107, the control unit 11 operates as the point designation unit 114 and calculates the entropy of the decoded sample from the calculated posterior probability for each class. A method of calculating the entropy is not particularly limited as long as a value indicating the uncertainty of sorting can be derived, and may be appropriately determined in according with an embodiment. In one example, the control unit 11 may calculate an entropy L in accordance with Equation 6 below.

[Math. 6]

$$L = \sum_{i} p_j \log p_j \qquad \text{(Equation 6)}$$

$p_j$ indicates a posterior probability of a class j calculated by the provisional trained sorting model 7. A correspondence relationship between the number of classes and a type may be appropriately set in accordance with an embodiment. When the calculation of the entropy L is completed, the control unit 11 causes the processing to proceed to the next step S108.

In step S108, the control unit 11 operates as the point designation unit 114 and further calculates a gradient of the calculated entropy L ($\partial L/\partial \alpha_i$). The control unit 11 corrects the linear sum 312_1 derived such that the entropy L increases, based on the calculated gradient of the entropy L ($\partial L/\partial \alpha_i$). The amount of correction may be appropriately determined in accordance with an embodiment. In one example, the amount of correction of the linear sum 312_1 may be proportional to the value of the gradient of the entropy L and a correction factor. The correction factor may be designated by an operator or may be given as a specified value within a program. In another example, the control unit 11 may correct the linear sum 312_1 so that the entropy L is maximized. As a result of the correction processing, the control unit 11 can acquire the corrected linear sum 312_2. The control unit 11 may derive the linear sum 312_2 so that a relationship between Equation 4 and Equation 5 described above is established even after the correction. After the corrected linear sum 312_2 is acquired, the control unit 11 causes the processing to proceed to the next step S109.
(Step S109 to Step S110)

In step S109, the control unit 11 operates as the point designation unit 114, and extracts two sample points (311_1, 311_2) near the derived linear sum 312 (312_2) among the two or more sample points 311 acquired.

In one example, when at least some of the two or more training samples 31 are selected such that classes to which features included therein belong are different from each other, the control unit 11 may extract two sample points 311 of different classes to which features included in the corresponding training sample 31 belong, as the two sample points (311_1, 311_2) near the linear sum 312 (312_2). In another example, the control unit 11 may extract two sample points 311 with the same class to which features included in the corresponding training sample 31 belong.

The nearby two sample points (311_1, 311_2) may be constituted by the two sample points 311 closest to the derived linear sum 312 (312_2). Alternatively, the nearby two sample points (311_1, 311_2) may be constituted by any two sample points 311 that are within a proximity range defined by a predetermined distance from the linear sum 312 (312_2). The predetermined distance may be appropriately set in accordance with an embodiment.

When the extraction of the two sample points (311_1, 311_2) is completed, the control unit 11 causes the processing to proceed to the next step S110.

In step S110, the control unit 11 operates as the point designation unit 114, and projects the derived linear sum 312 (312_2) on a straight line connecting the extracted two sample points (311_1, 311_2) on a feature space to acquire a projection point 313 corresponding to the linear sum 312 (312_2). The projection point 313 is a foot of a perpendicular. That is, the projection point 313 can be calculated by extending a perpendicular line from the linear sum 312 (312_2) to the straight line connecting the two sample points (311_1 and 311_2) and finding an intersection between the perpendicular line and the straight line. A known method may be adopted as a method for calculating such a projection point 313. When the calculation of the projection point 313 is completed, the control unit 11 causes the processing to proceed to the next step S111.
(Step S111)

In step S111, the control unit 11 generates a decoded sample corresponding to the linear sum 312 (a feature amount of the projection point 313) as a new training sample 36 by using the trained decoder 6. In the present embodiment, the control unit 11 inputs the value (feature amount) of the projection point 313 to the input layer 61 of the trained decoder 6 and executes computation processing of forward propagation of the trained decoder 6. Through the computation processing of the forward propagation, the control unit 11 acquires an output corresponding to the result of decoding the sample from the feature amount of the projection point 313 from the output layer 63. Thereby, it is possible to generate the decoded sample as a new training sample 36. When the generation of the new training samples 36 is completed, the control unit 11 causes the processing to proceed to the next step S112.
(Step S112)

In step S112, the control unit 11 operates as the output unit 116, disposes two or more training samples 31 and the new training sample 36 in accordance with a positional relationship in a feature space, and then outputs them.

As long as the positional relationship between the samples (31, 36) can be presented, an output form and an output destination may not be particularly limited and may be appropriately selected in accordance with an embodiment. In one example, the output destination may be a display. This display may be at least any one of the output device 16 and/or an output device of another computer. In this case, the control unit 11 may appropriately express the feature space in a coordinate space in a display area of the display, may dispose the samples (31, 36) by reflecting the positional relationship in the feature space on the coordinates, and may perform drawing at the positions of the coordinates of the samples (31, 36). In another example, the output destination may be a print medium (for example, a paper medium or the like). In this case, the control unit 11 may dispose the samples (31, 36) in a printer (not illustrated) by reflecting the positional relationship in the feature space on the coordinates and may output a print instruction for performing drawing at the positions of the coordinates of the samples (31, 36).

The training samples 31 to be output may be selected appropriately. In one example, the control unit 11 may output all training samples 31 used to generate the new training sample 36. In another example, outputting some of the training samples 31 used to generate the new training sample 36 may be omitted. For example, the control unit 11 may select one training sample 31 closest to the new training sample 36 in the feature space from among the training samples 31 used to generate the new training sample 36 for each different class. Then, the control unit 11 may output only the training sample 31 of each selected class together with the new training sample 36. According to this method, the training samples 31 to be output can be narrowed down, and thus it is possible to achieve the efficiency of output resources. As a result, when the training sample 31 of each class is compared with the new training sample 36, each training sample (31, 36) can be easily viewed, and thus it is easy to specify a class to which a feature included in the training sample 36 belongs.

When the output of each sample (31, 36) is completed, the control unit 11 causes the processing to proceed to the next step S113.

(Step S113)

In step S113, the control unit 11 operates as the label giving unit 117 and generates a new correct answer label 37 configured to indicate a class to which a feature included in the generated new training sample 36 belongs. Then, the control unit 11 gives the generated new correct answer label 37 to the new training sample 36. Thereby, the control unit 11 generates a second data set 35.

In the present embodiment, the operator can visually confirm the new training sample 36 and the training sample 31 through the output in step S112 and can specify a class to which a feature included in the new training sample 36 belongs. The control unit 11 may receive the designation of the class to which the feature included in the new training sample 36 belongs, in accordance with the output in step S112. A method of designating a class may be appropriately selected in accordance with an embodiment. In one example, the class may be designated directly by the operator's operation via the input device 15. In another example, the class may be selected from a list. In still another example, a class may be designated by selecting a training sample of the same class as the designated class from among the output training samples 31. Then, the control unit 11 may generate a new correct answer label 37 configured to indicate the designated class, and may give (associate) the generated new correct answer label 37 to the new training sample 36. Thereby, a second data set 35 can be generated.

In the present embodiment, the control unit 11 can generate one or more second data sets 35 through the processing of steps S104 to S113 in one cycle. The number of second data sets 35 generated in one cycle may not be particularly limited, and may be appropriately set in accordance with an embodiment. When the generation of one or more second data sets 35 is completed, the control unit 11 causes the processing to proceed to the next step S114.

(Step S114)

At step S114, the control unit 11 determines whether to repeat the series of processing from step S102 to step S113.

The criterion of repetition may be appropriately set in accordance with an embodiment. As an example, whether to repeat a series of processing may be selected by an operator's designation. In this case, the control unit 11 may determine whether to repeat the series of processing according to the operator's selection. As another example, the number of repetitions may be set. The number of repetitions may be given by any method, such as the operator's designation or a set value within a program. In this case, the control unit 11 may determine whether to repeat the series of processing in accordance with whether the number of times the series of processing has been executed has reached a set number of times. As another example, the number of second data sets to be generated may be set. The set number of second data sets may be given by any method such as the operator's designation or a set value within a program. In this case, the control unit 11 may determine whether to repeat the series of processing in accordance with whether a total number of second data sets generated through the series of processing has reached the set number.

When it is determined that the series of processing is not repeated, the control unit 11 causes the processing to proceed to the next step S115. On the other hand, when it is determined that the series of processing is repeated, the control unit 11 causes the processing to return to step S102 and repeats the series of processing.

When the series of processing is repeated, the control unit 11 performs machine learning of the encoder 5 and the decoder 6 again by using the generated one or more second data sets 35 (training samples 36) to update the trained encoder 5 and decoder 6 in step S102. In step S103, the control unit 11 may execute machine learning of the sorting model 7 again by using the generated one or more second data sets 35 to update the provisional trained sorting model 7. Each machine learning performed again (retraining) may be performed by using only the generated one or more second data sets 35, or at least some of the plurality of first data sets 30 may be used together with the generated one or more second data sets 35.

In step S104, the control unit 11 may acquire two or more sample points 311 corresponding to two or more training samples among the plurality of training samples (31, 36) included in the plurality of first data sets 30 and one or more second data sets 35 by using the updated trained encoder 5. In step S105, the control unit 11 may derive a linear sum 312 (312_1) of the two or more sample points 311 acquired. In step S106, the control unit 11 may calculate, for each class, a posterior probability that a feature included in a sample decoded by the trained decoder 6 from the derived linear sum 312_1 belongs to the class, by using the updated provisional trained sorting model 7. The processing of step S107 to step S110 may be executed in the same manner as described above. In step S111, the control unit 11 may generate a decoded sample corresponding to the linear sum 312 (feature amount of the projection point 313) as a new training sample 36 by using the updated trained decoder 6. In step S112, the control unit 11 may dispose the two or more training samples selected from the plurality of training samples (31, 36) and the new training sample 36 generated in this cycle in accordance with a positional relationship in a feature space and then output them. In step S113, the control unit 11 may generate a new second data set 35 by giving a new correct answer label 37 to the generated new training sample 36.

The form of repetition may not be limited to such an example. When the series of processing is repeated, at least one of the retraining of the encoder 5 and the decoder 6 in step S102 and the retraining of the sorting model 7 in step S103 may be omitted. When both the retrainings are omitted, the control unit 11 may repeatedly execute the processing from step S104. In this case, in the second and subsequent processing, the trained encoder 5, the trained decoder 6, and the provisional trained sorting model 7 generated in the first processing may be used.

(Step S115 to Step S116)

In step S115, the control unit 11 operates as the thinning unit 118 and converts each training sample (31, 36) included in the plurality of first data sets 30 and the generated one or more second data sets 35 into a feature amount by using the trained encoder 5. Processing for converting each training sample (31, 36) into a feature amount may be executed in the same manner as in step S104 described above. The computation results obtained in step S104 described above may be used again as at least some of the feature amount conversion results. The control unit 11 calculates the density of sample points corresponding to each training sample (31, 36) in the feature space based on the conversion results. When the calculation of the density is completed, the control unit 11 causes the processing to proceed to the next step S116.

In step S116, the control unit 11 determines a branch destination of processing in accordance with the result of calculating the density through the processing of step S115. When the density exceeds a threshold value, the control unit 11 causes the processing to proceed to the next step S117. On the other hand, when the density is less than the threshold value, the control unit 11 omits the processing of step S117 and causes the processing to proceed to the next step S118. When the density is equal to the threshold value, the processing may branch to any destination.

A method of calculating the density through the processing of step S115 may not be particularly limited as long as the number of sample points included in an arbitrary range can be evaluated, and may be appropriately determined in according with an embodiment. In one example, in step S115, the control unit 11 may calculate the density by counting the number of sample points within a region of a predetermined size that includes at least one sample point corresponding to the new training sample 36 in a feature space. In step S116, the control unit 11 may determine whether the number of sample points counted exceeds a threshold value.

In another example, in step S115, the control unit 11 may extract any two sample points from the sample points obtained using the trained encoder 5 in the feature space, at least one the any two sample points being a sample point corresponding to the new training sample 36. Then, the control unit 11 may calculate a distance D and an intersection entropy H between the extracted two sample points as a density evaluation index using Equations 7 and 8 below.

[Math. 7]

$$D = \|x_1 - x_2\| < 1\text{st threshold} \qquad \text{(Equation 7)}$$

[Math. 8]

$$H = \sum_i p_{1j} \log p_{2j} < 2\text{nd threshold} \qquad \text{(Equation 8)}$$

$x_1$ and $x_2$ indicate the values (feature amounts) of two sample points. $p_{1j}$ and $p_{2j}$ indicate posterior probabilities that features contained in the samples decoded by the trained decoder 6 from the values of the two sample points respectively belong to a class j. The posterior probabilities ($p_{1j}$, $p_{2j}$) may be calculated using the provisional trained sorting model 7, similar to step S106 described above.

In this case, in step S116, the control unit 11 may determine that the density exceeds the threshold value when the calculated distance D is less than a first threshold value and the intersection entropy H is less than a second threshold value. On the other hand, the control unit 11 may determine that the density is less than the threshold value when the calculated distance D exceeds the first threshold value or the intersection entropy H exceeds the second threshold value. As described above, when each index is equal to each threshold value, the processing may branch to any destination. According to this evaluation method, the second data set 35 can be excluded in a dense region by using the distance D and the intersection entropy H as indices.

(Step S117)

In step S117, the control unit 11 operates as the thinning unit 118 and selects an object to be thinned out from among objects for which it is determined that the density thereof exceeds a threshold value. Here, the training sample 36 of the second data set 35 is a pseudo-sample generated by the trained decoder 6. For this reason, it is preferable that the object to be thinned out be selected from among the second data sets 35. That is, it is preferable that the control unit 11 select an object to be thinned out from among the generated one or more second data sets 35 within a range in which it is determined that the density exceeding the threshold value.

The second data set 35 to be thinned out may be arbitrarily selected. When the density is calculated within the region of the predetermined size, the control unit 11 may arbitrarily select an object to be thinned out from among the second data sets 35 existing within the region. When the distance D and the intersection entropy H between the two sample points are calculated as density evaluation indices, the control unit 11 may select the second data set 35 out of the two data sets corresponding to the two sample points as an object to be thinned out. When the corresponding two data sets are both the second data sets 35, the control unit 11 may select one of the two second data sets 35 as an object to be thinned out.

However, an object to be thinned out may not be limited to the second data set 35. In this step S117, the control unit 11 may select the first data set 30 as an object to be thinned out. In this case, in step S115 described above, the control unit 11 may calculate the density of an object that does not include the new training sample 36. The object to be thinned out may be appropriately selected such that the density thereof is less than a threshold value. When the object to be thinned out is selected, the control unit 11 causes the processing to proceed to the next step S118.

(Step S118)

In step S118, the control unit 11 operates as the second training processing unit 119 and performs machine learning of the sorting model 7 by using the generated one or more second data sets 35. The machine learning in step S118 is an example of the above-described second machine learning of the sorting model 7.

The machine learning in step S118 may be performed by using only the finally generated one or more second data sets 35, or may be performed by using at least some of the plurality of first data sets 30 together with the finally generated one or more second data sets 35. The control unit 11 may execute retraining of the provisional trained sorting model 7 as the machine learning in step S118. Alternatively, the control unit 11 may newly train an initialized sorting model 7 as the machine learning in step S118. When the initialized sorting model 7 is newly trained, the control unit 11 uses at least some of the plurality of first data sets 30 together with the finally generated one or more second data sets 35 for the machine learning in step S118.

When an object to be thinned out has been selected through the processing of step S117, the control unit 11 executes the machine learning of the sorting model 7 except for the second data set 35 selected as the object to be thinned out. The machine learning processing in step S118 may be the same as step S103 described above, except that the finally generated second data set 35 is included as learning data used for the machine learning. As a result of the machine learning, a trained sorting model 7 can be generated. When the generation of the trained sorting model 7 is completed, the control unit 11 causes the processing to proceed to the next step S119.

(Step S119)

In step S119, the control unit 11 operates as the storage processing unit 1110 and generates information on the trained sorting model 7 generated by machine learning as learning result data 125. In the present embodiment, the control unit 11 generates, as the learning result data 125, information on the trained encoder 5 generated in the processing of step S102 and the sorting model 7 generated in the processing up to step S118. Then, the control unit 11 stores the generated learning result data 125 in a predetermined storage area.

The predetermined storage area may be, for example, the RAM in the control unit 11, the storage unit 12, an external storage device, a storage medium, or a combination thereof. The storage medium may be, for example, a CD, a DVD, or the like, and the control unit 11 may store the learning result data 125 in the storage medium via the drive 17. The external storage device may be, for example, a data server such as a network attached storage (NAS). In this case, the control unit 11 may store the learning result data 125 in the data server through a network by using the communication interface 13. The external storage device may be, for example, an external storage device connected to the model generation device 1 via the external interface 14. The information on the trained encoder 5 and the information on the trained sorting model 7 may be stored in separate files. The files may be stored in different storage destinations. When the storage of the learning result data 125 is completed, the control unit 11 terminates the processing procedure of the model generation device 1 according to this operation example.

The generated learning result data 125 may be provided to the sorting device 2 at any timing. For example, the control unit 11 may transfer the learning result data 125 to the sorting device 2 as the processing of step S103 or apart from the processing of step S103. The sorting device 2 may acquire the learning result data 125 by receiving this transfer. For example, the sorting device 2 may acquire the learning result data 125 by accessing the model generation device 1 or the data server through a network by using the communication interface 23. For example, the sorting device 2 may acquire the learning result data 125 through the storage medium 92. For example, the learning result data 125 may be incorporated into the sorting device 2 in advance.

The control unit 11 may update or newly generate the learning result data 125 by repeating the processing of steps S101 to S119 on a regular or irregular basis. During this repetition, at least a portion of the data sets (30, 35) used for machine learning may be changed, added, corrected, deleted, or the like as appropriate. Then, the control unit 11 may update the learning result data 125 stored in the sorting device 2 by providing the updated or newly generated learning result data 125 to the sorting device 2 by any method.

[Sorting Device]

Figure 8:
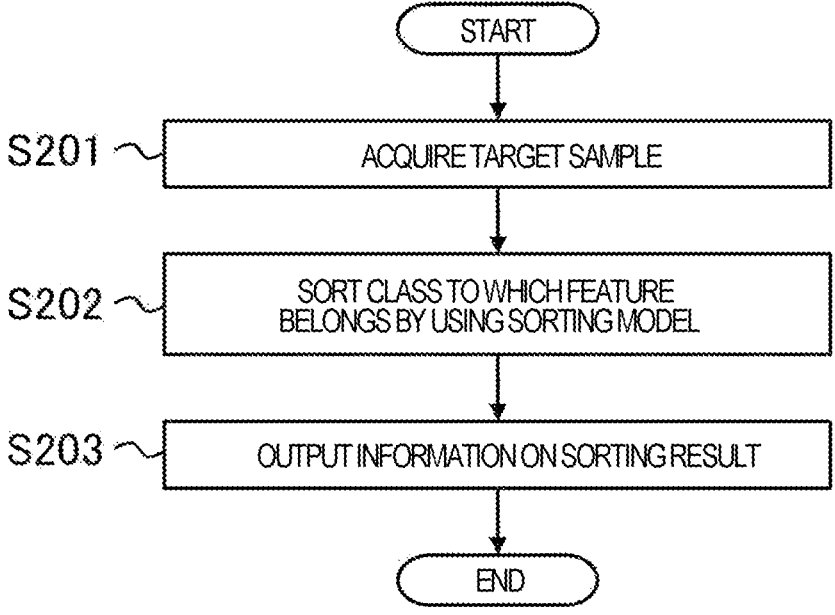
FIG. 8 is a flowchart illustrating an example of a processing procedure of the sorting device according to the embodiment.

FIG. 8 is a flowchart showing an example of a processing procedure regarding the execution of a sorting task by the sorting device 2 according to the present embodiment. The processing procedure of the sorting device 2 to be described below is an example of a sorting method. However, the processing procedure of the sorting device 2 to be described below is merely an example, and each step may be changed as far as possible. With respect to the following processing procedure, steps may be omitted, replaced, or added appropriately in accordance with an embodiment.

(Step S201)

In step S201, the control unit 21 operates as the data acquisition unit 211 and acquires the target sample 221. The target sample 221 is a sample of a predetermined type of data on which a sorting task is performed. A method for acquiring the target sample 221 may be appropriately determined in accordance with the type of data. As an example, the target sample 221 may be generated by observing an object with a sensor (for example, a camera). A route for acquiring the target sample 221 may not be particularly limited, and may be appropriately selected in according with an embodiment. In an example, the control unit 21 may directly acquire the target sample 221 from a device such as a sensor. In another example, the control unit 21 may indirectly acquire the target sample 221 via another computer, the storage medium 92, or the like. Any preprocessing may be applied to the target sample 221. When the target sample 221 is acquired, the control unit 21 causes the processing to proceed to the next step S202.

(Step S202)

In step S202, the control unit 21 operates as the sorting unit 212. In the present embodiment, the control unit 21 sets the trained encoder 5 and sorting model 7 with reference to the learning result data 125. Then, the control unit 21 sorts a class to which a feature included in the target sample 221 belongs, by using the trained encoder 5 and sorting model 7. Specifically, the control unit 21 inputs the target sample 221 to the input layer 51 of the trained encoder 5, and executes computation processing of forward propagation of the trained encoder 5 and sorting model 7. As a result of this computation processing, the control unit 21 acquires, from the output layer 73 of the trained sorting model 7, an output corresponding to a result of sorting the class to which the feature included in the target sample 221 belongs. The result of sorting the class may be appropriately obtained in accordance with the output format of the sorting model 7. In the present embodiment, the control unit 21 can obtain a result of sorting the class of the target sample 221 by extracting a class with the highest posterior probability to be calculated. When the sorting processing is completed, the control unit 21 causes the processing to proceed to the next step S203.

(Step S203)

In step S203, the control unit 21 operates as the output unit 213 and outputs information on a result of sorting the classes.

An output destination and the content of information to be output may be determined appropriately in accordance with an embodiment. For example, the control unit 21 may output the sorting result obtained in step S202 to the output device 26 as it is. The control unit 21 may execute arbitrary information processing based on the obtained sorting result. Then, the control unit 21 may output a result of executing the information processing as information on the sorting result. The output of the result of executing this information processing may include controlling the operation of a device to be controlled in accordance with the sorting result, and the like. The output destination may be, for example, the output device 26, an output device of another computer, a device to be controlled, or the like.

When the output of the information on the sorting result is completed, the control unit 21 terminates a processing procedure of the sorting device 2 according to this operation example. The control unit 21 may continuously and repeatedly execute a series of information processing from step S201 to step S203. The timing of repetition may be determined appropriately in accordance with an embodiment. Thereby, the sorting device 2 may be configured to continuously and repeatedly perform the above-described sorting task.

[Features]

As described above, according to the present embodiment, in the model generation device 1, a linear sum 312 in which the sum of distances from the sample points 311 is maximum is obtained as a new sample point through the processing of step S105, and thus it is possible to form a state in which sample points (the sample points 311 and the linear sum 312) exist evenly in a feature space. Thus, a new data set (second data set 35) including a sample (training sample 36) decoded from the feature amount of the linear sum 312 is added to learning data by using the trained decoder 6 through the processing of steps S111 and S113, and thus it is possible to obtain learning data that can be evaluated in a feature space when it has high comprehensiveness. According to the present embodiment, through a series of processing of the step S104 to step S113, at least a portion of a process of generating (a data set including) such a new training sample can be automated using the trained encoder 5 and decoder 6. Thus, it is possible to achieve a reduction in the cost of comprehensively collecting training samples. In the present embodiment, in the processing of steps S103 and S118, in addition to the original data set (first data set 30), a new data set (second data set 35) generated as described above is used for machine learning of the sorting model 7. Thereby, an improvement in the performance of a trained sorting model 7 to be generated can be achieved by using the comprehensively obtained training samples (31, 36) for machine learning of the sorting model 7.

In the present embodiment, the calculation method of Equation 1 or Equation 2 may be adopted as a method of calculating the linear sum 312 (312_1) in the processing of step S103. According to these calculation methods, it is possible to derive a linear sum 312 (312_1) in which the sum of distances from the sample points 311 is maximum in a region on the inner side of each sample point 311. Thereby, an appropriate linear sum 312 (312_1) can be obtained, and sample points can be added to a region in which sample points are sparse in a feature space. By repeating this operation, it is possible to form a state in which sample points exist evenly. Thus, comprehensive training samples can be appropriately collected. By using the comprehensively obtained training samples (31, 36) for machine learning in the processing of steps S103 and S118, it is possible to improve the performance of the generated trained sorting model.

In the present embodiment, a provisional trained sorting model 7 is generated through the processing of step S103. Through the processing of steps S106 to S108, a derived linear sum 312_1 is corrected such that entropy increases by using the provisional trained sorting model 7. Then, through the processing of step S111, a same decoded from a feature amount derived from the corrected linear sum 312_2 is generated as a new training sample 36 by using the trained decoder 6. Since the entropy is calculated to indicate the uncertainty of whether sorting can be performed, a training sample with insufficient machine learning generated in the provisional trained sorting model 7 by performing correction based on entropy as described above. For this reason, in the processing of step S118 (also in the processing of step S103 when the training sample 36 is used during repetition), the expectation of an improvement in the performance of a trained sorting model 7 to be generated can be increased by using the obtained new training sample 36.

In the present embodiment, adversarial learning is performed between the encoder 5, the decoder 6, and the estimator 600 in the processing of step S102. According to the training of the estimator 600, an ability to discriminate an internal division ratio (that is, the accuracy of finding the internal division ratio increases) is acquired in accordance with the ability of the encoder 5 and decoder 6. On the other hand, according to the training of the encoder 5 and the decoder 6, an ability to generate a decoded sample for which it is difficult to estimate an internal division ratio in accordance with the ability of the estimator 600. Through adversarial learning, as the ability of the estimator 600 to discriminate an internal division ratio is improved, the ability of the encoder 5 and the decoder 6 to generate a sample for which it is difficult to estimate an internal division ratio is improved. That is, it is possible to suppress the decoding of a sample deviating from true data such that an internal division ratio can be easily specified for points between the sample points. Thus, according to the present embodiment, it is possible to generate a trained encoder 5 and decoder 6 that have acquired an ability to generate a decoded sample, which is similar to true data (training sample 31), from the linear sum 312. Thereby, in the processing of step S111, it is possible to suppress the generation of a training sample 36 that is extremely deviated from true data. As a result, the expectation of an improvement in the performance of a trained sorting model 7 to be generated can be increased by using the obtained new training sample 36 in the machine learning of the sorting model 7.

In the present embodiment, the linear sum 312 (312_2) can be corrected to a value in a training range of the adversarial learning or a value that is approximate thereto by converting the linear sum 312 (312_2) into an internal division ratio (projection point 313) between two sample points (311_1, 311_2) through steps S109 and S110. Thereby, in the processing of step S111, it is possible to increase the certainty of suppressing the addition of the training sample 36, which is extremely deviated from true data, to learning data. As a result, the expectation of an improvement in the performance of a trained sorting model 7 to be generated can be further increased by using the obtained new training sample 36 in the machine learning of the sorting model 7.

In the present embodiment, two sample points 311 of different classes may be extracted as two sample points (311_1, 311_2) in the processing of step S109. Thereby, in the processing of step S111, a decoded sample similar to true data can be generated as a new training sample 36 in a range closer to a class identification boundary than each sample point 311. As a result, the expectation of an improvement in the performance of a trained sorting model 7 to be generated can be further increased by using the obtained new training sample 36 in the machine learning of the sorting model 7.

In the present embodiment, it is possible to confirm whether a new training sample 36 may be added to learning data based on an output result obtained through the processing of step S112. Thereby, it is possible to prevent a training sample 36, which is extremely deviated from true data, from being added to the learning data. Based on an output result, it is possible to confirm a class to which a feature included in a new training sample 36 belongs in accordance with a positional relationship in a feature space with a training sample used for generation. In the processing of step S113, the designation of the class of the new training sample 36 is received while confirming the class in accordance with the positional relationship in the feature space, and thus a new correct answer label 37 indicating an appropriate class can be given to the new training sample 36. Thereby, it is possible to prevent an incorrect correct answer label 37 from being given to the new training sample 36. As a result, the obtained new training sample 36 can be appropriately used in the machine learning of the sorting model 7, and the expectation of an improvement in the performance of a trained sorting model 7 to be generated can be increased.

When there are excessive training samples (31, 36) in a nearby range in a space, there is a possibility that some of the training samples (31, 36) will not contribute much to improving the performance of the sorting model 7. In the present embodiment, it is possible to find the state of excessive training samples (31, 36) in a feature space and to thin out some of the excessive training samples through the processing of steps S115 to S117. Thereby, the number of data sets (30, 35) used for machine learning of the sorting model 7 can be reduced, and it is possible to reduce the amount of calculation of machine learning while suppressing degradation of the performance of a trained sorting model 7 to be generated and to achieve the efficiency of calculational resources (a processor, a memory) required for machine learning.

In the present embodiment, the processing of step S102 to step S113 may be repeatedly executed through the processing of step S114. When a new training sample 36 is added and machine learning of the encoder 5 and the decoder 6 is performed by further using the added new training sample 36, a feature space mapped by the trained encoder 5 may be changed. According to the present embodiment, by repeating the machine learning of the encoder 5 and the decoder 6 in step S102 and the generation of a new training sample 36 in steps S104 to S111, a state in which sample points exist evenly can be formed by updating the encoder 5 while adding the new training sample 36. Thereby, it is possible to more appropriately collect comprehensive training samples (31, 36). The expectation of an improvement in the performance of a trained sorting model 7 to be generated can be increased by using comprehensively obtained training samples (31, 36) for machine learning of the sorting model 7.

In the present embodiment, it can be expected that a highly accurate sorting task is performed by using the trained encoder 5 and the sorting model 7 generated as described above in the sorting device 2.

§ 4 Modification Example

Although the embodiment of the present invention has been described above in detail, the above description is merely an example of the present invention in every respect. It is needless to say that various modifications or variations can be made without departing from the scope of the invention. For example, the following changes can be made. Hereinafter, the same components as those in the above-described embodiment will be denoted by the same reference numerals and signs, and descriptions of the same points as in the above-described embodiment are omitted appropriately. The following modification examples can be combined appropriately.

<4.1>

The sorting system 100 according to the above-described embodiment may be applied to any situation where arbitrary sorting tasks are performed on predetermined type of data. The sorting tasks include, for example, identifying the type of object shown in image data, determining whether a product shown in image data has a defect, and sorting the state of an object shown in sensing data. The data types of a training sample 31 and a target sample 221 may be appropriately selected according to a sorting task. Modification examples with limited application scenes will be exemplified below.

(A) Scene of Image Identification

Figures 9, 10, 11:
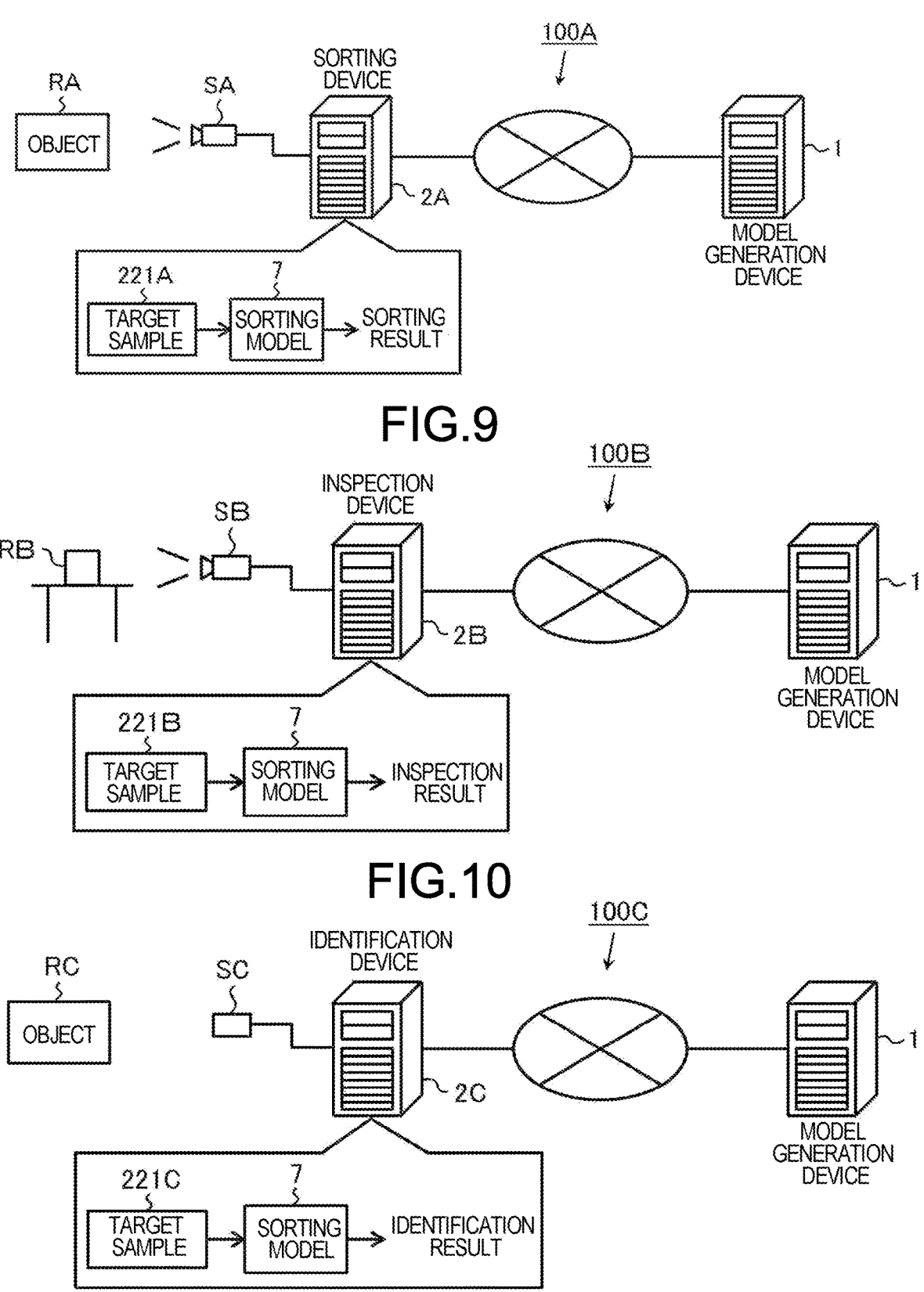
FIG. 9 schematically illustrates an example of another scene to which the present invention is applied.
FIG. 10 schematically illustrates an example of another scene to which the present invention is applied.
FIG. 11 schematically illustrates an example of another scene to which the present invention is applied.

FIG. 9 schematically illustrates an example of a scene to which a sorting system 100A according to a first modification example is applied. The present modification example is an example in which the above-described embodiment is applied to a scene in which an object shown in an image sample is identified. The sorting system 100A according to the present modification example is an example of the sorting system 100 described above, and includes a model generation device 1 and a sorting device 2A. As in the above-described embodiment, the model generation device 1 and the sorting device 2A may be connected to each other via a network.

Predetermined types of data (training sample 31 and target sample 221A) handled in the present modification example are image samples (image data) showing an object RA. The image samples may be obtained by imaging the object RA with a camera SA. A sorting task is to identify the type of object RA that is shown in the image sample. Identifying the type of the object RA may include segmentation (extracting a range in which an object is shown). The object RA may be a person or any object. A range shown in the image sample may be a specific portion (for example, the face) of the object RA, or may be the entire object RA. When the object RA is a person, an identification target may be, for example, a part of the body such as the face. Identifying the type of a person may be, for example, estimating an individual or estimating body parts (face, arms, legs, joints, and the like). The same is true of arbitrary objects. Except for these limitations, the sorting system 100A according to the present modification example may be configured in the same manner as the sorting system 100 according to the above-described embodiment.

(Model Generation Device)

In the present modification example, the model generation device 1 acquires a plurality of first data sets 30 each constituted by a combination of a training sample 31 and a correct answer label 32 in step S101. The training sample 31 is constituted by an image sample showing the object RA. The correct answer label 32 is configured to indicate the type (correct answer) of the object RA shown in the training sample 31. The model generation device 1 performs machine learning of the encoder 5 and the decoder 6 using a plurality of training samples 31 through the processing of step S102. The model generation device 1 performs machine learning of the sorting model 7 by using the plurality of first data sets 30 through the processing of step S103.

The model generation device 1 generates one or more second data sets 35 each constituted by a combination of a new training sample 36 and a new correct answer label 37 through the processing of steps S104 to S113. The new training sample 36 is constituted by an image sample showing the object RA. The new correct answer label 37 is configured to indicate the type (correct answer) of the object RA shown in the corresponding new training sample 36. The model generation device 1 may repeat the processing of steps S102 to S113 through the processing of step S114, as in the above-described embodiment. The model generation device 1 may calculate the density of sample points through the processing of steps S115 to S117 and select objects to be thinned out from among the one or more second data sets 35 when the calculated density exceeds a threshold value.

The model generation device 1 performs machine learning of the sorting model 7 by using the generated one or more second data sets 35 through the processing of step S118. By the processing up to step S118, a trained sorting model 7 that has acquired an ability to identify the type of the object RA shown in an image sample is generated. The model generation device 1 appropriately stores information on the trained encoder 5 and sorting model 7 as learning result data 125 in a predetermined storage area in step S119 described above. The generated learning result data 125 may be provided to the sorting device 2A at any timing.
(Sorting Device)

The sorting device 2A is an example of the sorting device 2 described above. A hardware configuration and a software configuration of the sorting device 2A may be the same as those of the sorting device 2 according to the above-described embodiment. In the present modification example, the sorting device 2A may be connected to the camera SA via a communication interface or an external interface. Alternatively, the camera SA may be connected to another computer, and the sorting device 2A may be connected to the other computer to be able to acquire an image sample from the camera SA. The camera SA may be, for example, a general RGB camera, a depth camera, an infrared camera, or the like. The camera SA may be appropriately disposed at a location where the object RA can be imaged.

The sorting device 2A executes information processing related to a sorting task for the object RA through the same processing procedure as the sorting device 2 described above. That is, in step S201, the sorting device 2A acquires a target sample 221A from the camera SA. The target sample 221A is constituted by an image sample showing the object RA to be identified. In step S202, the sorting device 2A identifies the type of object RA shown in the target sample 221A by using the trained encoder 5 and sorting model 7. Then, in step S203, the sorting device 2A outputs information on a result of identifying the type of object RA. In one example, the sorting device 2A may output the result of identifying the object RA to an output device as it is. In another example, the sorting device 2A may execute arbitrary information processing in accordance with the result of identifying the object RA. For example, the sorting device 2A may execute information processing such as unlocking when an identified target person (object RA) is a specific individual.
(Features)

According to the first modification example, it is possible to achieve a reduction in the cost of comprehensively collecting training samples in a scene in which a trained sorting model 7 that has acquired an ability to identify images is generated. An improvement in the performance of image identification of the generated trained sorting model 7 can be achieved by using the comprehensively obtained training samples (31, 36) for machine learning of the sorting model 7. In the sorting device 2A, it is possible to expect highly accurate image identification by using the generated and trained sorting model 7.
(B) Scene of Appearance Inspection FIG. 10 schematically illustrates an example of a scene to which an inspection system 100B according to a second modification example is applied. The present modification example is an example in which the above-described embodiment is applied to a scene in which the appearance of a product shown in an image sample is inspected. The inspection system 100B according to the present modification example is an example of the sorting system 100 described above, and includes a model generation device 1 and an inspection device 2B. As in the above-described embodiment, the model generation device 1 and the inspection device 2B may be connected to each other via a network.

Predetermined types of data (training sample 31 and target sample 221B) handled in the present modification example are image samples (image data) showing a product RB. The image samples may be obtained by imaging the product RB with a camera SB. A sorting task is to determine whether the product RB shown in the image sample has a defect. The product RB is an example of the object RA, and determining whether the product RB has a defect is an example of identifying the type of object RA. That is, in the present modification example, the class of a feature relates to the type of defect included in the product RB. Determining whether the product has a defect may include identifying the presence or absence of a defect, estimating the probability that the product RB has a defect, identifying the type of defect included in the product RB (a type indicating that "there is no defect" may be included), and extracting the range of a defect included in the product RB, or a combination thereof. Except for these limitations, the inspection system 100B according to the present modification example may be configured in the same manner as the sorting system 100 according to the above-described embodiment.

The product RB may be a product that is conveyed in a manufacturing line, such as electronic equipment, an electronic part, an automobile part, a medicine, and food. The electronic part may be, for example, a substrate, a chip capacitor, a liquid crystal, a relay winding, or the like. The automotive part may be, for example, a connecting rod, a shaft, an engine block, a power window switch, a panel, or the like. The medicine may be, for example, a packaged tablet, an unpackaged tablet, or the like. The product RB may be a final product produced after a manufacturing process is completed, an intermediate product produced during a manufacturing process, or an initial product prepared before a manufacturing process. Defects may be, for example, scratches, stains, cracks, dents, burrs, color unevenness, foreign matter contamination, and the like.
(Model Generation Device)

In the present modification example, the model generation device 1 acquires a plurality of first data sets 30 each constituted by a combination of a training sample 31 and a correct answer label 32 in step S101. The training sample 31 is constituted by an image sample showing a product RB. The correct answer label 32 is configured to indicate whether the product RB shown in the training sample 31 has a defect (correct answer). The model generation device 1 performs machine learning of the encoder 5 and the decoder 6 by using a plurality of training samples 31 through the processing of step S102. The model generation device 1 performs machine learning of the sorting model 7 by using the plurality of first data sets 30 through the processing of step S103.

The model generation device 1 generates one or more second data sets 35 each constituted by a combination of a new training sample 36 and a new correct answer label 37 through the processing of steps S104 to S113. The new training sample 36 is constituted by an image samples showing product RB. The new correct answer label 37 is configured to indicate whether the product RB shown in the corresponding new training sample 36 has a defect (correct answer). The model generation device 1 may repeat the processing of steps S102 to S113 through the processing of step S114, as in the above-described embodiment. The model generation device 1 may calculate the density of sample points through the processing of steps S115 to S117, and select objects to be thinned out from among the one or more second data sets 35 when the calculated density exceeds a threshold value.

The model generation device 1 performs machine learning of the sorting model 7 by using the generated one or more second data sets 35 through the processing of step S118. Through the processing up to step S118, a trained sorting model 7 that has acquired an ability to determine whether the product RB shown in the image sample has a defect is generated. The model generation device 1 appropriately stores information on the trained encoder 5 and sorting model 7 as learning result data 125 in a predetermined storage area in step S119. The generated learning result data 125 may be provided to the inspection device 2B at any timing.

(Inspection Device)

The inspection device 2B is an example of the sorting device 2 described above. A hardware configuration and a software configuration of the inspection device 2B may be the same as those of the sorting device 2 according to the above-described embodiment. In the present modification example, the inspection device 2B may be connected to the camera SB via a communication interface or an external interface. Alternatively, the camera SB may be connected to another computer, and the inspection device 2B may be connected to the other computer to be able to acquire an image sample from the camera SB. The camera SB may be, for example, a general RGB camera, a depth camera, an infrared camera, or the like. The camera SB may be appropriately disposed at a place where the product RB can be imaged. For example, the camera SB may be disposed in the vicinity of a conveyor device that carries the product RB.

The inspection device 2B executes information processing related to appearance inspection of the product RB by the same processing procedure as the sorting device 2 described above. That is, in step S201, the inspection device 2B acquires a target sample 221B from the camera SB. The target sample 221B is constituted by an image sample showing the product RB to be inspected. In step S202, the inspection device 2B determines whether the product RB shown in the target sample 221B has a defect by using the trained encoder 5 and sorting model 7. Then, in step S203, the inspection device 2B outputs information on a result of determining whether the product RB has a defect. In one example, the inspection device 2B may output the result of determining whether the product RB has a defect to an output device as it is. In another example, when the inspection device 2B determines that the product RB has a defect, the inspection device 2B may output a warning to the output device to give a notification that the product has a defect. An output destination of such information is not limited to the output device of the inspection device 2B, and may be an output device of another computer. In still another example, when the inspection device 2B is connected to a conveyor device that conveys the product RB, the inspection device 2B may control the conveyor device based on a determination result so that defective products and non-defective products are conveyed in separate lines.

(Features)

According to a second specific example, it is possible to achieve a reduction in the cost of comprehensively collecting training samples in a scene in which a trained sorting model 7 that has acquired an ability to inspect appearance is generated. An improvement in the performance of appearance inspection of a trained sorting model 7 to be generated can be achieved by using the comprehensively obtained training samples (31, 36) for machine learning of the sorting model 7. In the inspection device 2B, it can be expected that highly accurate appearance inspection is performed by using the generated sorting model 7.

(C) Scene of State Identification

FIG. 11 schematically illustrates an example of a scene to which an identification system 100C according to a third modification example is applied. The present modification example is an example in which the above-described embodiment is applied to a scene in which the state of an object RC shown in sensing data is identified. The identification system 100C according to the present modification example is an example of the sorting system 100 described above, and includes a model generation device 1 and an identification device 2C. As in the above-described embodiment, the model generation device 1 and the identification device 2C may be connected to each other via a network.

Predetermined types of data (a training sample 31 and a target sample 221C) handled in the present modification example are samples of sensing data (hereinafter referred to simply as "data sample") generated by observing the object RC with a sensor SC. The sensor SC may be, for example, a camera, a microphone, an encoder, an environmental sensor, a vital sensor, a medical examination device, an in-vehicle sensor, a home security sensor, or the like. A sorting task may be to sort the state of the object RC shown in the sensing data. Sorting may include predicting (that is, sorting a future state from the time when the sensing data is obtained). Except for these limitations, the identification system 100C according to the present modification example may be configured in the same manner as the sorting system 100 according to the above-described embodiment.

The type of sensor SC may be selected appropriately in accordance with a sorting task. As an example, the object RC is a person, and sorting the state of the object RC may be sorting the state of the target person. In this case, the sensor SC may be constituted by, for example, at least one of a camera, a microphone, a vital sensor, and a medical examination device. Sorting the state of the target person may be, for example, sorting a health condition such as the probability of appearance of a predetermined disease or the probability of occurrence of a change in physical condition. Alternatively, the target person may be, for example, a driver of a vehicle, and sorting the state of the target person may be sorting the state of the driver (for example, the degree of sleepiness, the degree of fatigue, the degree of relaxation, or the like).

As another example, the object RC is an industrial machine, and sorting the state of the object RC may be sorting (detecting or predicting) whether there is an abnormality in the industrial machine. In this case, the sensor SC may be constituted by, for example, at least one of a microphone, an encoder, and an environmental sensor. A data sample may be constituted by an encoder value of a motor, a temperature, an operation sound, and the like.

As another example, the object RC is an object existing outside a vehicle, and sorting the state of the object RC may be sorting a situation outside the vehicle. In this case, the sensor SC may be constituted by, for example, at least one of a camera and an in-vehicle sensor. Sorting the situation outside the vehicle may be, for example, sorting the attributes of objects existing outside the vehicle, sorting a congestion situation, sorting the risk of an accident, or the like. The objects existing outside the vehicle may be, for example, roads, traffic lights, obstacles (persons, objects), and the like. Sorting the attributes of objects existing outside the vehicle may include, for example, sorting the occurrence of an event such as jumping-out of a person or a vehicle, abrupt start, abrupt stopping, lane changing, or the like.

As another example, the object RC is an object that exists in a specific location such as outdoors or a predetermined indoor space (for example, inside a vinyl house), and sorting the state of the object RC may be sorting a situation in a specific place. In this case, the sensor SC may be constituted by at least one of a camera, a microphone, and an environment sensor, for example. As a specific example, the object RC may be a plant, and sorting the situation of a specific place may be sorting a plant cultivation situation.

As another example, the object RC is, for example, an object that exists inside a house, and sorting the state of the object RC may be sorting the situation inside the house. In this case, the sensor SC may be constituted by, for example, at least one of a camera, a microphone, an environmental sensor, and a home security sensor.

(Model Generation Device)

In the present modification example, the model generation device 1 acquires a plurality of first data sets 30 each constituted by a combination of a training sample 31 and a correct answer label 32 in step S101. The training sample 31 is constituted by a data sample obtained by a sensor SC. The correct answer label 32 is configured to indicate the type (correct answer) of the state of the object RC that is shown in the training sample 31. The model generation device 1 performs machine learning of the encoder 5 and the decoder 6 by using a plurality of training samples 31 through the processing of step S102. The model generation device 1 performs machine learning of the sorting model 7 by using the plurality of first data sets 30 through the processing of step S103.

The model generation device 1 generates one or more second data sets 35 each constituted by a combination of a new training sample 36 and a new correct answer label 37 through the processing of steps S104 to S113. The new training sample 36 is constituted by a sample of sensing data. The new correct answer label 37 is configured to indicate the type (correct) of the state of the object RC that is shown in the corresponding new training sample 36. The model generation device 1 may repeat the processing of steps S102 to S113 through the processing of step S114, as in the above-described embodiment. The model generation device 1 may calculate the density of sample points through the processing of steps S115 to S117 and may select objects to be thinned out from among the one or more second data sets 35 when the calculated density exceeds a threshold value.

The model generation device 1 performs machine learning of the sorting model 7 by using the generated one or more second data sets 35 through the processing of step S118. Through the processing up to step S118, a trained sorting model 7 that has acquired an ability to identify the state of the object RC shown in the sensing data is generated. The model generation device 1 appropriately stores information on the trained encoder 5 and sorting model 7 as learning result data 125 in a predetermined storage area in step S119. The generated learning result data 125 may be provided to the identification device 2C at any timing.

(Identification Device)

The identification device 2C is an example of the sorting device 2 described above. A hardware configuration and a software configuration of the identification device 2C may be the same as those of the sorting device 2 according to the above-described embodiment. In the present modification example, the identification device 2C may be connected to the sensor SC via a communication interface or an external interface. Alternatively, the sensor SC may be connected to another computer, and the identification device 2C may be connected to the other computer to be able to acquire a sample of sensing data from the sensor SC.

The identification device 2C executes a series of information processing related to state identification of the object RC by the same processing procedure as that for the sorting device 2 described above. That is, in step S201, the identification device 2C acquires the target sample 221C from the sensor SC. The target sample 221C is constituted by sensing data generated by observing the object RC, which is a state identification target, by the sensor SC. In step S202, the identification device 2C sorts the state of the object RC shown in the target sample 221C by using the trained encoder 5 and sorting model 7.

Then, in step S203, the identification device 2C outputs information on a result of sorting the state of the object RC. In one example, the identification device 2C may output the result of sorting the state of the object RC to an output device as it is. As another example, the identification device 2C may execute arbitrary information processing in accordance with the result of sorting the state of the object RC. As a specific example, when sorting the state of the object RC is to sort a health condition of a target person, the identification device 2C may output a warning to give a notification that the target person's health condition is abnormal when it is determined that the target person's health condition is abnormal (for example, the probability of appearance of a predetermined disease is classified into a high class). As another specific example, when sorting the state of the object RC is to sort the state of a driver, the identification device 2C may perform an output, such as giving a notice of a message for prompting the driver to take a break or prohibiting switching from automatic driving to manual driving, when the degree of sleepiness or the degree of fatigue is classified into a high class. As another specific example, when sorting the state of the object RC is to sort whether there is an abnormality in an industrial machine, the identification device 2C may output a warning to give a notification that there is an abnormality in the industrial machine or there is a sign of it when it is determined that there is an abnormality in the industrial machine or there is a sign of it. As another specific example, when sorting the state of the object RC is to sort a situation outside the vehicle, the identification device 2C may determine an operation command for the vehicle in accordance with the sorted situation outside the vehicle and may control the vehicle in response to the determined operation command (for example, the vehicle may be temporarily stopped when a person's jumping-out is detected).

(Features)

According to a third specific example, it is possible to achieve a reduction in the cost of comprehensively collecting training samples in a scene in which a trained sorting model 7 that has acquired an ability to identify the state of the object RC shown in sensing data is generated. An improvement in the performance of state identification of the trained sorting model 7 to be generated can be achieved by using the comprehensively obtained training samples (31, 36) for machine learning of the sorting model 7. In the identification device 2C, it can be expected that highly accurate state identification is performed by using the generated sorting model 7.

<4.2>

In the above-described embodiment, the model generation device 1 is configured to execute all of machine learning of the encoder 5 and the decoder 6, generation of new learning data (second data set 35), and machine learning processing of the sorting model 7. However, a device configuration for executing each processing may not be limited to such an example. In another example, each processing may be executed by one or a plurality of separate and independent computers.

Figure 12:
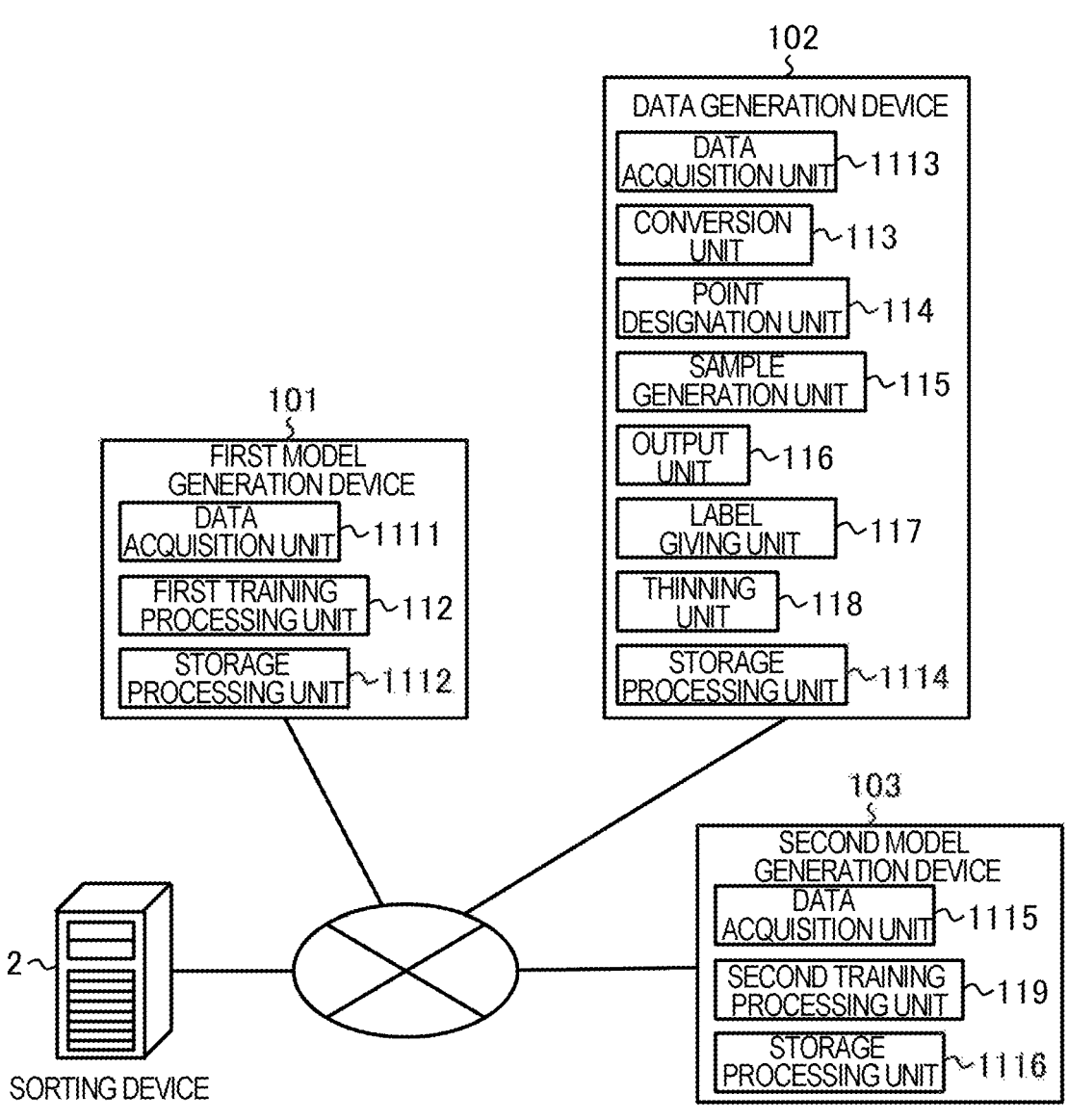
FIG. 12 schematically illustrates an example of a configuration of a model generation device according to another configuration.

FIG. 12 schematically illustrates an example of a configuration of the model generation device 1 according to the present modification example. In the present modification example, the model generation device 1 is constituted by a first model generation device 101, a data generation device 102, and a second model generation device 103. The first model generation device 101 is one or a plurality of computers configured to execute processing related to machine learning of the encoder 5 and the decoder 6. The data generation device 102 is one or a plurality of computers configured to execute processing for generating a new training sample 36. The second model generation device 103 is one or a plurality of computers configured to execute processing related to machine learning of the sorting model 7.

Hardware configurations of the devices (101, 102, 103) may be the same as the hardware configuration of the model generation device 1 described above. The devices (101, 102, 103) may be directly connected to each other. Alternatively, the devices (101, 102, 103) may be connected to each other via a network. In one example, data may be exchanged between the devices (101, 102, 103) via these connections. In another example, data may be exchanged between the devices (101, 102, 103) via a storage medium or the like.

The first model generation device 101 executes parts related to machine learning of the encoder 5 and the decoder 6 of the model generation program 81 to operate as a computer including a data acquisition unit 1111, a first training processing unit 112, and a storage processing unit 1112 as software modules. The data generation device 102 executes parts related to the generation of a new training sample 36 of the model generation program 81 to operate as a computer including a data acquisition unit 1113, a conversion unit 113, a point designation unit 114, a sample generation unit 115, an output unit 116, a label giving unit 117, a thinning unit 118, and a storage processing unit 1114 as software modules. The second model generation device 103 executes parts related to machine learning of the sorting model 7 of the model generation program 81 to operate as a computer including a data acquisition unit 1115, a second training processing unit 119, and a storage processing unit 1116 as software modules. Thereby, in the present modification example, the first model generation device 101 executes the processing of step S102 described above in the processing procedure of the model generation device 1 described above. The data generation device 102 executes the processing of steps S104 to S117 described above. The second model generation device 103 executes the processing of steps S103 and S118 described above.

Specifically, the control unit of the first model generation device 101 operates as the data acquisition unit 1111 and acquires a plurality of training samples 31. The acquisition of the plurality of training samples 31 may be executed in the same manner as in step S101 described above. Subsequently, the control unit of the first model generation device 101 operates as the first training processing unit 112 and executes the processing of step S102. Thereby, a trained encoder 5 and decoder 6 are generated. The control unit of the first model generation device 101 operates as the storage processing unit 1112, generates information on the trained encoder 5 and decoder 6 as learning result data, and stores the generated learning result data in a predetermined storage area. Similarly to step S119 described above, the predetermined storage area may be selected appropriately. The generated learning result data may be provided to the data generation device 102 at any timing. The information on the trained encoder 5 may be provided to the second model generation device 103 at any timing.

The control unit of the second model generation device 103 operates as the data acquisition unit 1115 and acquires a plurality of first data sets 30. The acquisition of the plurality of first data sets 30 may be executed in the same manner as in step S101 described above. Subsequently, the control unit of the second model generation device 103 operates as the second training processing unit 119 and executes the processing of step S103. Thereby, a provisional trained sorting model 7 is generated. Then, the control unit of the second model generation device 103 operates as the storage processing unit 1116, generates information on the provisional trained sorting model 7 as learning result data, and stores the generated learning result data in a predetermined storage. Similarly to step S119 described above, the predetermined storage area may be selected appropriately. The generated learning result data of the provisional trained sorting model 7 may be provided to the data generation device 102 at any timing.

The control unit of the data generation device 102 operates as the data acquisition unit 1113 and acquires two or more training samples 31. The control unit of the data generation device 102 operates as the conversion unit 113 and the thinning unit 118 and executes the processing of steps S104 to S117 on the acquired two or more training samples 31. Thereby, one or more second data sets 35 are generated. The control unit of the data generation device 102 operates as the storage processing unit 1114 and stores the generated one or more second data sets 35 in a predetermined storage area. The processing procedure of the data generation device 102 is an example of a data generation method.

When the processing from step S102 is repeated through the processing of step S114, the data generation device 102 may provide the generated one or more training samples 36 to the first model generation device 101 and may give an instruction for updating the trained encoder 5 and decoder 6. The control unit of the first model generation device 101 operates as the data acquisition unit 1111 and may acquire one or more training samples 36 generated by the data generation device 102. The control unit of the first model generation device 101 operates as the first training processing unit 112 and executes the processing of step S102 by using the generated one or more training samples 36. Thereby, the first model generation device 101 may generate the updated trained encoder 5 and decoder 6. The control unit of the first model generation device 101 operates as the storage processing unit 1112, and may generate information on the updated trained encoder 5 and decoder 6 as learning result data and store the generated learning result data in a predetermined storage area. The updated learning result data regarding the trained encoder 5 and decoder 6 may be provided to the data generation device 102 at any timing. The updated information on the trained encoder 5 may be provided to the second model generation device 103 at any timing.

The data generation device 102 may provide the generated one or more second data sets 35 to the second model generation device 103 and give an instruction for updating the provisional trained sorting model 7. The control unit of the second model generation device 103 operates as the data acquisition unit 1115 and may acquire the generated one or more second data sets 35. The control unit of the second model generation device 103 operates as the second training processing unit 119 and executes the processing of step S103 by using the generated one or more second data sets 35. Thereby, the second model generation device 103 may generate the updated provisional trained sorting model 7. The control unit of the second model generation device 103 operates as the storage processing unit 1116, and may generate information on the updated provisional trained sorting model 7 as learning result data and store the generated learning result data in a predetermined storage area. The learning result data regarding the updated provisional trained sorting model 7 may be provided to the data generation device 102 at any timing. The data generation device 102 may acquire the learning result data updated by any method from the devices (101, 103) and then execute the processing of step S104 and the subsequent processing. Two or more training samples 31 acquired when executing the processing of step S104 may include a new training sample 36 generated up to the previous cycle.

Before the processing of step S118 is executed, the control unit of the second model generation device 103 operates as the data acquisition unit 1115 and acquires one or more second data sets 35 generated by the data generation device 102. The control unit of the second model generation device 103 operates as the second training processing unit 119 and executes the processing of step S118 by using the acquired one or more second data sets 35. Thereby, the second model generation device 103 generates a trained sorting model 7. The control unit of the second model generation device 103 operates as the storage processing unit 1116, and may generate information on the trained sorting model 7 as learning result data and store the generated learning result data in a predetermined storage area. Information on the trained encoder 5 which is generated by the first model generation device 101, and learning result data on the trained sorting model 7 which is generated by the second model generation device 103 may be provided to the sorting device 2 at any timing.

According to the present modification example, a load of each computation processing can be distributed to the devices (101, 102, 103). Processing up to the generation of the new training sample 36 may be executed in the data generation device 102, and the giving of a new correct answer label 37 may be executed in another computer. In this case, the label giving unit 117 may be omitted in the software configuration of the data generation device 102. The processing of step S113 may be omitted from the processing procedure of the data generation device 102.

<4.3>

In the above-described embodiment, the sorting model 7 is configured to receive an input of a feature amount obtained by the encoder 5 and to output a result of sorting a class to which the feature belongs from the input feature amount. However, the configuration of the sorting model 7 may not be limited to such an example. In another example, a sorting task computation process may be configured not to include the computation of the encoder 5.

Figure 13:
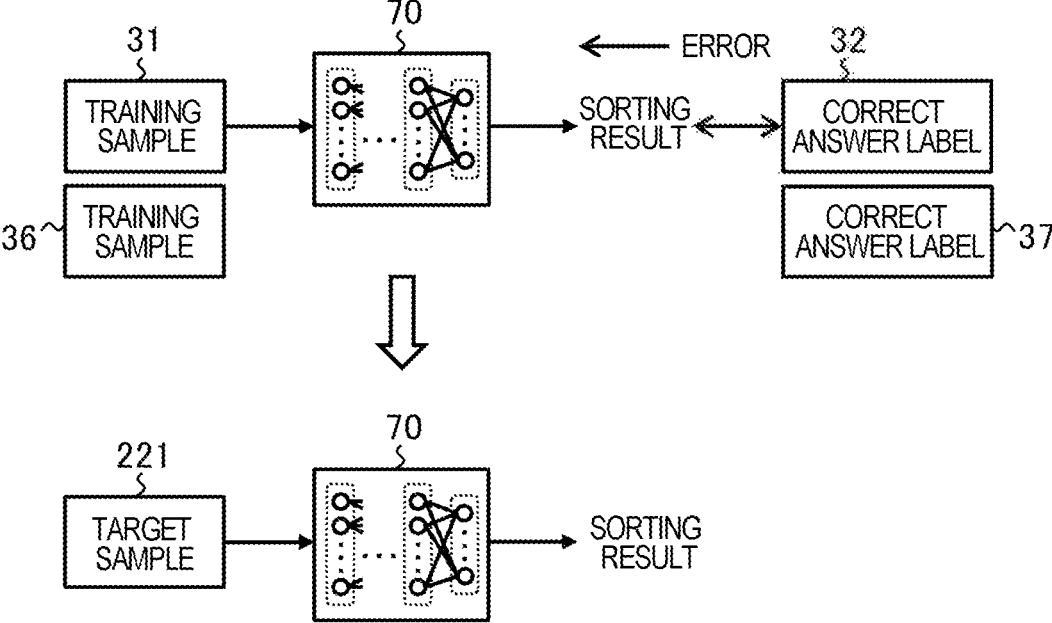
FIG. 13 schematically illustrates an example of a configuration of a sorting model according to another configuration.

FIG. 13 schematically illustrates an example of a configuration of a sorting model 70 according to the present modification example. The sorting model 70 is configured to receive an input of a sample and output a result of sorting a class to which a feature belongs from the input sample. The type and structure of a machine learning model constituting the sorting model 70 may be appropriately determined in accordance with an embodiment. In one example, a neural network may be used for the sorting model 70, similar to the above-described embodiment.

Also in the present modification example, similarly to the above-described embodiment, machine learning of the sorting model 70 may be executed by being divided into first machine learning (step S103) and second machine learning (step S118). In the machine learning, the control unit 11 inputs a training sample (31, 36) included in each data set (30, 35) to the sorting model 70 and executes computation processing of forward propagation of the sorting model 70. Through the computation processing of the forward propagation, the control unit 11 acquires, from the sorting model 70, an output corresponding to a result of sorting the class of a feature included in each training sample 31. The control unit 11 calculates an error (sorting error) between the obtained sorting result and a true value indicated by the corresponding correct answer label (32, 37). Except for these points, the model generation device 1 can perform the machine learning of the sorting model 70 in steps S103 and S118 by using the same method as in the above-described embodiment. In step S119 described above, the control unit 11 generates information on the trained sorting model 70 generated by the machine learning as learning result data 125.

Also in the present modification example, the sorting model 70 may be configured to output, for each class, a posterior probability that a feature included in an input sample belongs to the class, as a result of sorting the feature included in the input sample. In response to this, a linear sum 312 (312_1) based on entropy may be corrected. In this case, in step S106, the control unit 11 decodes a sample from a feature amount of the derived linear sum 312_1 by using the trained decoder 6. That is, the control unit 11 inputs the derived linear sum 312_1 to the trained decoder 6 and executes computation processing of forward propagation of the trained decoder 6. Through the computation processing of the forward propagation of the decoder 6, the control unit 11 generates a decoded sample from the linear sum 312_1. Next, the control unit 11 inputs the obtained decoded sample to a provisional trained sorting model 70 and executes computation processing of forward propagation of the provisional trained sorting model 70. Through the computation processing of the forward propagation of the sorting model 70, the control unit 11 acquires an output corresponding to a result of calculating (that is, a result of sorting), for each class, a posterior probability that a feature included in the sample decoded by the trained decoder 6 belongs to the class from the derived linear sum 312_1, from the provisional trained sorting model 7. Except for these points, the model generation device 1 can calculate the entropy and correct the derived linear sum 312_1 based on the calculated entropy in the same manner as in the above-described embodiment.

In the present modification example, information on the trained encoder 5 may be omitted from the learning result data 125. In the sorting device 2, the control unit 21 sets the trained sorting model 70 with reference to the learning result data 125 in step S202 described above. The control unit 21 inputs the acquired target sample 221 to the trained sorting model 70 and executes computation processing of forward propagation of the trained sorting model 70. As a result of the computation processing, the control unit 21 can acquire, from the sorting model 70, an output corresponding to a result of sorting a class to which a feature included in the target sample 221 belongs.

According to the present modification example, the configuration of the sorting model 70 does not depend on the configuration of the encoder 5. For this reason, the structure of the sorting model 70 can be optimized for a sorting task. Thereby, the efficiency of the amount of calculation of the sorting model 70 can be expected.

<4.4>

In the above-described embodiment, machine learning models of the encoder 5, the decoder 6, the sorting model 7 (70), and the estimator 600 are constituted by a fully-connected neural network. However, the type of neural network that constitutes each machine learning model may not be limited to such an example. In another example, at least one of the machine learning models may be constituted by a convolutional neural network, a recursive neural network, or the like. At least one of the neural networks constituting the machine learning models may include other types of layers such as a convolution layer, a pooling layer, a normalization layer, a dropout layer, and the like.

In the above-described embodiment, the type of machine learning model constituting each of the encoder 5, the decoder 6, the sorting model 7 (70), and the estimator 600 may not be limited to the neural networks. The type of machine learning model is not particularly limited as long as the computation processing described above can be executed, and may be appropriately selected in accordance with an embodiment. As another example, the encoder 5 and the decoder 6 may be constituted by a principal component vector obtained by principal component analysis. The sorting model 7 (70) may be constituted by a support vector machine. A machine learning method may be appropriately determined in accordance with the type of machine learning model to be adopted.

<4.5>

In the above-described embodiment, the correction of the linear sum 312_1 based on entropy may be omitted. In this case, steps S106 to S108 may be omitted from the processing procedure of the model generation device 1 (data generation device 102). In step S109, the control unit 11 may extract two sample points (311_1, 311_2) near the derived linear sum 312_1. Then, in step S110, the control unit 11 may project the derived linear sum 312_1 onto a straight line connecting the extracted two sample points (311_1, 311_2) in a feature space to acquire a projection point 313 corresponding to the derived linear sum 312_1. The machine learning in step S103 may be integrated with the machine learning in step S118. That is, the processing of step S103 is omitted, and in step S118, the control unit 11 may perform machine learning of the sorting model 7 by using the plurality of first data sets 30 and the generated one or more second data sets 35.

<4.6>

In the above-described embodiment, the acquisition of the projection point 313 in steps S109 and S110 may be omitted from the processing procedure of the model generation device 1 (data generation device 102). Accordingly, in the processing of step S111, the control unit 11 may acquire a sample decoded from the corrected linear sum 312_2 (the linear sum 312_1 when the processing of steps S106 to S108 are further omitted) as a new training sample 36 by using the trained decoder 6.

In the above-described embodiment, the estimator 600 is provided corresponding to the encoder 5 and the decoder 6, and adversarial learning is executed between the encoder 5, the decoder 6, and the estimator 600. However, the machine learning configuration of the encoder 5 and the decoder 6 may not be limited to such an example. Adversarial learning may be omitted in the processing of step S102. In this case, the estimator 600 may be omitted.

<4.7>

In the above-described embodiment, the processing of step S113 in which a new correct answer label 37 is given to a new training sample 36 may be executed at any timing after the new training sample 36 is generated. The processing for generating the new correct answer label 37 may be automated by appropriately estimating the class to which a feature included in the new training sample 36 belongs. The class of the new training samples 36 may be estimated from the training sample 31 (31, 36) used to generate the new training sample 36. An estimation method may be selected appropriately. A provisional trained sorting model 7 (70) may be used for class estimation.

After the new correct answer label 37 is given to the new training sample 36 based on a class estimation result, the control unit 11 may receive the correction of the new correct answer label 37 given to the training sample 36 at any timing. In one example, the control unit 11 may output the training sample 36 in step S112 and then receive the correction of the new correct answer label 37 given to the training sample 36. The processing for receiving the correction is an example of processing for receiving the designation of the class in step S113.

In the above-described embodiment, the processing of step S112 may be omitted from the processing procedure of the model generation device 1 (data generation device 102). Accordingly, the output unit 116 may be omitted from the software configuration of the model generation device 1 (data generation device 102).

<4.8>

In the above-described embodiment, through the processing of steps S106 to S108, the derived linear sum 312_1 is corrected based on entropy, and samples are decoded from the corrected linear sum 312_2 (or its projection point 313), thereby attempting to generate a new training sample 36 contributing to improving the performance of the sorting model 7 (70). An index for evaluating whether it contributes to such performance improvement may not be limited to entropy, and may be appropriately designed in accordance with an embodiment.

Another example of the evaluation index may be reliability indicating the degree of belonging to a distribution of the plurality of training samples 31 (that is, the degree of closeness to true data derived from the training samples 31). The model generation device 1 may correct the derived linear sum 312_1 based on the reliability together with the entropy or instead of the entropy. The reliability may be calculated appropriately. Two methods of calculating reliability are exemplified below.

(I) First Method

In a first method, an identifier is used to evaluate reliability. In this case, the first training processing unit 112 may be configured to further perform machine learning of the identifier by using a plurality of training samples 31 included in a plurality of first data sets 30. The machine learning of the identifier may be configured by training the identifier so as to evaluate the degree to which an input sample belongs to a distribution of the plurality of training samples 31. Such identifier training may be appropriately selected in accordance with an embodiment.

Figure 14:
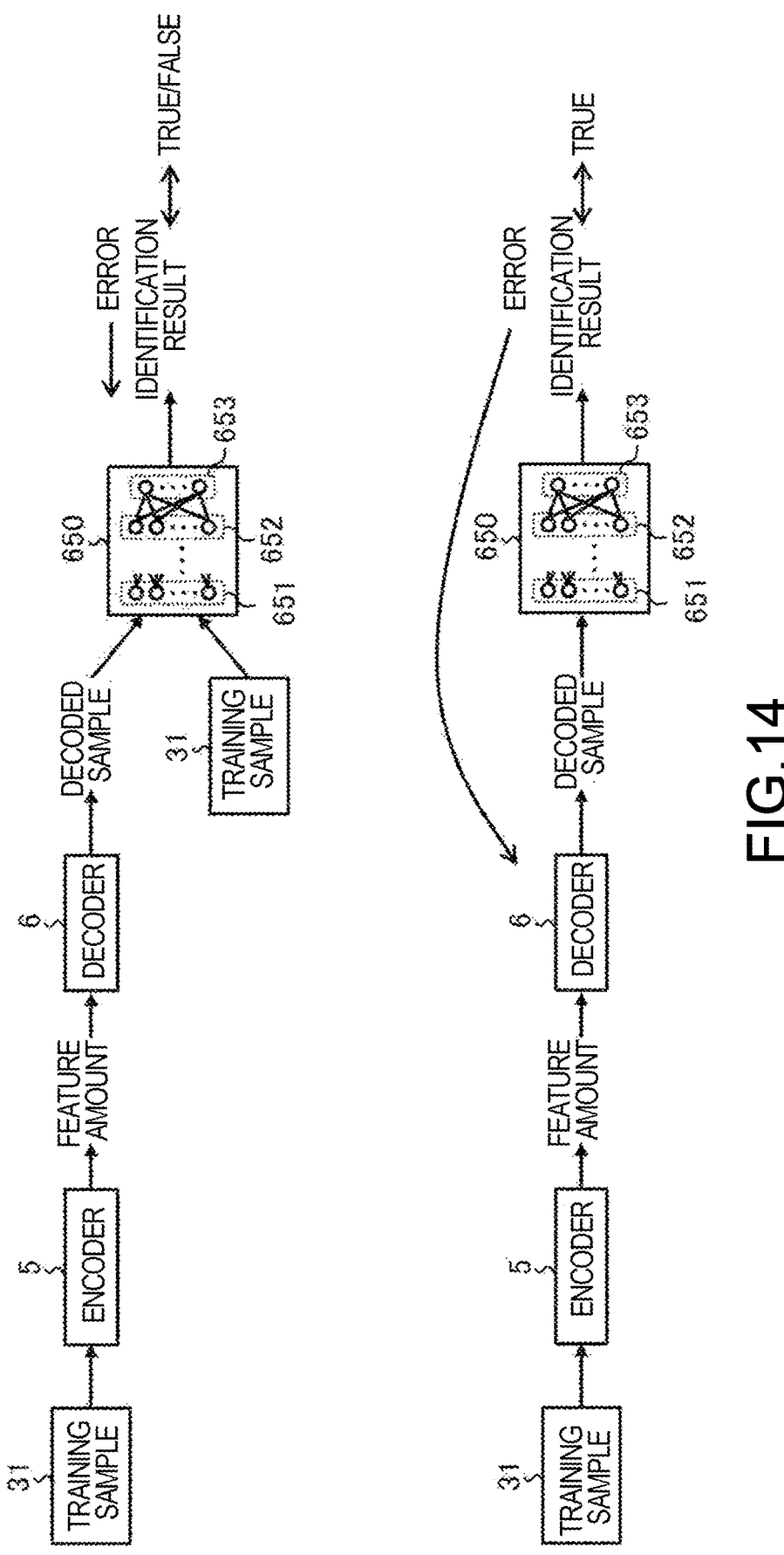
FIG. 14 schematically illustrates an example of a process of machine learning (adversarial learning) of an identifier according to another configuration.

FIG. 14 schematically illustrates an example of machine learning processing of an identifier 650 according to the present modification example. In the example of FIG. 14, training the identifier 650 is configured by performing adversarial learning between the encoder 5, the decoder 6, and the identifier 650. The adversarial learning includes a step of training the identifier 650 to identify the origin of an input sample by using a plurality of samples and a plurality of training samples 31, which are decoded by the decoder 6 and the training samples 31, as input samples, and a step of training the encoder 5 and the decoder 6 so that identification performance of the identifier 650 is reduced when the samples decoded by the decoder 6 are input to the identifier 650. This adversarial learning is an example of training the identifier to acquire an ability to evaluate the degree to which an input sample belongs to a distribution of the plurality of training samples 31. In FIG. 14, for convenience of description, the origin of the training sample 31 is expressed as "true", and the origin of the decoded sample is expressed as "false". A method of expressing the origin of each sample may be changed appropriately.

As an example of training processing, the control unit 11 inputs each training sample 31 to the encoder 5 and executes computation processing of the encoder 5 and the decoder 6. Through the computation processing, the control unit 11 generates a decoded sample corresponding to each training sample 31. The control unit 11 can acquire a result of identifying the origin of each sample from the identifier 650 by inputting each sample (training sample 31/decoded sample) to the identifier 650 and executing the computation of the identifier 650. The control unit 11 adjusts the values of parameters of the identifier 650 so that an error between this identification result and the true value (true/false) of identification becomes small. Thereby, it is possible to train the identifier 650 to acquire an ability to identify the origin of an input sample.

The control unit 11 inputs each training sample 31 to the encoder 5 and executes the computation processing of the encoder 5 and the decoder 6. Through this computation processing, the control unit 11 generates decoded samples corresponding to each training sample 31. The control unit 11 can acquire a result of identifying the origin of each decoded sample from the identifier 650 by inputting the obtained each decoded sample to the identifier 650 and executing the computation of the identifier 650. The control unit 11 calculates an error so that the identification result is incorrect (that is, the error becomes smaller as the origin of the input sample is mistaken for the training sample 31), and adjusts the values of the parameters of the encoder 5 and the decoder 6 so that the calculated error becomes smaller. Thereby, it is possible to train the encoder and the decoder 6 to acquire an ability to generate a decoded sample for degrading the identification performance of the identifier 650.

The type of machine learning model that constitutes the identifier 650 may not be particularly limited as long as computation for identifying the origin of an input sample can be performed, and may be appropriately selected in accordance with an embodiment. In the example of FIG. 14, the identifier 650 is constituted by a fully-connected neural network and includes an input layer 651, one or more intermediate layers 652, and an output layer 653. The layers 651 to 653 may be configured in the same manner as the layers 51 to 53 of the encoder 5, and the like. The number of layers constituting the identifier 650, the number of nodes in each layer, and a structure such as a coupling relationship may be appropriately determined in accordance with an embodiment. In the training of the identifier 650, similarly to the encoder 5 and the like, the control unit 11 can adjust the value of each parameter by backpropagating a gradient of the calculated error by an error backpropagation method.

Similarly to the adversarial learning with the estimator 600 described above, a gradient inversion layer (not illustrated) may be provided between the decoder 6 and the identifier 650. In this case, the training of the identifier 650 and the training of the encoder 5 and the decoder 6 in adversarial learning may be executed at once. Alternatively, the training of the identifier 650 and the training of the encoder 5 and the decoder 6 in adversarial learning may be executed alternately and repeatedly. The values of the parameters of the encoder 5 and the decoder 6 may be fixed in the training of the identifier 650, and the values of the parameters of the identifier 650 may be fixed in the training of the encoder 5 and the decoder 6. Even in this case, at least a portion of each training process (for example, the processing for generating a decoded sample) may be performed in common.

The type of neural network constituting the identifier 650 may not be limited to a fully-connected neural network. Similarly to the encoder 5 and the like, the identifier 650 may be constituted by a neural network other than a fully-connected neural network. The identifier 650 may include other types of layers. The type of machine learning model that constitutes the identifier 650 may not be limited to a neural network. The type of machine learning model that constitutes the identifier 650 may not be particularly limited as long as computation for identifying the origin of an input sample can be executed, and may be appropriately selected in accordance with an embodiment. A machine learning method may be appropriately determined in accordance with the type of machine learning model to be adopted.

The identifier 650 trained by adversarial learning acquires an ability to discriminate between the training sample 31 and a decoded sample (pseudo sample) derived from the decoder 6, depending on the degree of adversarial learning. Thus, according to this trained identifier 650, the reliability of an input sample can be evaluated in accordance with a result of identifying the origin of the input sample. That is, as the identifier 650 mistakes the origin of the input sample for the training sample 31 with respect to a decoded sample, the decoded sample cannot be discriminated as a true sample (training sample 31), and it can be evaluated that the reliability of the decoded sample is high. On the other hand, as the identifier 650 correctly identifies the origin of the input sample as the decoder 6 with respect to the decoded sample, the decoded sample is easily discriminated as a true sample (training sample 31) (that is, deviates from the training sample 31), and it can be evaluated that the reliability of the decoded sample is low. Thus, according to the trained identifier 650 generated by adversarial learning, the reliability of a sample decoded by the trained decoder 6 can be appropriately evaluated.

A method of training the identifier 650 to acquire an ability to evaluate the degree to which an input sample belongs to a distribution of a plurality of training samples 31 may not be limited to the method based on adversarial learning, and may be appropriately selected in accordance with an embodiment. In another example, the trained identifier 650 may be constituted by a principal component vector obtained by principal component analysis. In this case, training the identifier 650 to acquire an ability to evaluate the degree to which an input sample belongs to a distribution of the training samples 31 may be configured by performing principal component analysis of the plurality of training samples 31. In order to evaluate the reliability of a decoded sample, the control unit 11 may project (that is, compress) the decoded sample into a subspace by using the principal component vector, and then restore the decoded sample to the original space. The larger a difference between the original decoded sample before the compression and the decoded sample after the decompression, the more the decoded sample deviate from the distribution of the training samples 31, and it can be evaluated that the reliability of the decoded sample is low. On the other hand, the smaller a difference between the original decoded sample before the compression and the decoded sample after the decompression, the more the decoded sample follows the distribution of the training samples 31, and it can be evaluated that the reliability of the decoded sample is high.

In still another example, the identifier 650 may be constituted by a one-class identifier (for example, a one-class support vector machine). In this case, training the identifier 650 to acquire an ability to evaluate the degree to which an input sample belongs to the distribution of the training samples 31 may be configured, for example, by solving an optimization problem of one-class identification by using the plurality of training samples 31. The control unit 11 may evaluate the reliability of the decoded sample by using a trained one-class identifier. According to the one-class identifier, it is possible to identify whether the decoded samples belong to the distribution of the training samples 31. That is, the more the decoded sample is identified as belonging to the distribution of the training samples 31, the higher the reliability of the decoded sample is, and the more the decoded sample is identified as not belonging to the distribution of the training sample 31, the lower the reliability of the decoded sample is.

The control unit 11 operates as the first training processing unit 112 and may execute machine learning of the identifier 650 at any timing before the linear sum 312_1 is corrected through the processing of step S108. When the machine learning of the identifier 650 is configured by adversarial learning, the control unit 11 may execute the machine learning of the identifier 650 together with other training in step S102. When the processing is repeated from step S102 through the processing of step S114, the control unit 11 may also execute the machine learning of the identifier 650 again. In this case, the control unit 11 may further use one or more new training samples 36, which are obtained up to the previous cycle, for the machine learning of the identifier 650. In the first method of the present modification example, the control unit 11 evaluates the reliability of a sample decoded from the linear sum 312 by using the trained identifier 650 generated in this manner.

Figure 15:
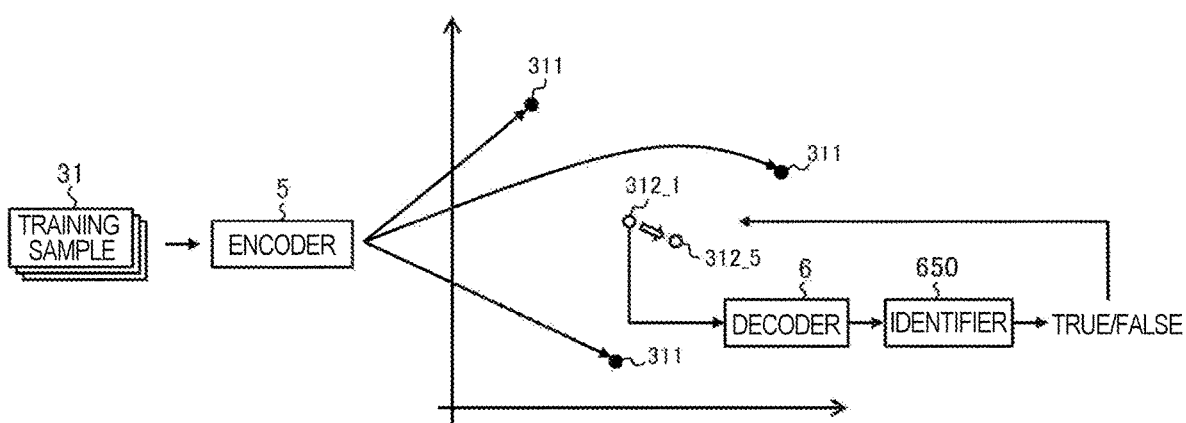
FIG. 15 schematically illustrates an example of a data generation process according to another configuration.

FIG. 15 schematically illustrates an example of a data generation process according to the present modification example. Before the processing of step S108 is executed, the control unit 11 operates as the point designation unit 114 and evaluates the degree to which a sample decoded by the trained decoder 6 from a feature amount of the derived linear sum 312_1 belongs to a distribution of a plurality of training samples 31 by using the trained identifier 650. When the trained identifier 650 has been generated by the above-described adversarial learning, evaluating the degree to which the decoded sample belongs to the distribution of the plurality of training samples 31 is configured by identifying the origin of the decoded sample by using the trained identifier 650. That is, the control unit 11 generates a decoded sample from the derived linear sum 312_1 by using the trained decoder 6. The control unit 11 identifies the origin of the obtained decoded sample by using the trained identifier 650. The control unit 11 evaluates that the reliability of the decoded sample is high as the identifier 650 mistakes the origin of the input sample for the training sample 31 with respect to the decoded sample, and evaluates that the reliability of the decoded sample is low as the identifier 650 correctly identifies the origin of the input sample as the decoder 6 with respect to the decoded sample.

Subsequently, the control unit 11 operates as the point designation unit 114 and calculates the reliability of a sample decoded by the trained decoder 6 based on a result of evaluating the degree to which the decoded sample belongs to a distribution of the training samples 31. A reliability calculation method may be appropriately determined in accordance with an embodiment so that the more the degree to which the decoded sample belongs to the distribution of the training samples 31, the higher the value of reliability is, and the lower the degree to which the decoded sample belongs to the distribution of the training samples 31, the lower the value of reliability is. In one example, the control unit 11 may calculate an evaluation value of a reliability R by Equation 9 below.

[Math. 9]

$$R = \|m - tr\| \qquad \text{(Equation 9)}$$

m indicates an identification result of the trained identifier 650. tr indicates a true value of identification.

Then, in step S108, the control unit 11 operates as the point designation unit 114 and corrects the derived linear sum 312_1 so that the reliability is improved, based on a gradient $(\partial R/\partial \alpha_i)$ of the calculated reliability. Thereby, the control unit 11 acquires the corrected linear sum 312_5. As an example of a correction method, the control unit 11 may calculate a product S of each evaluation value by Equation 10 below.

[Math. 10]

$$S = X \times L \times R \qquad \text{(Equation 10)}$$

The control unit 11 may further calculate a gradient $(\partial S/\partial \alpha_i)$ of the product S and optimizes the amount of correction so as to maximize the product S based on the calculated gradient $(\partial S/\partial \alpha_i)$. Equation 10 assumes that the linear sum 312_1 is corrected based on an entropy L together with the reliability R. When correction based on the entropy L is omitted, the entropy L may be omitted from the product S in Equation 10.

Figure 16:
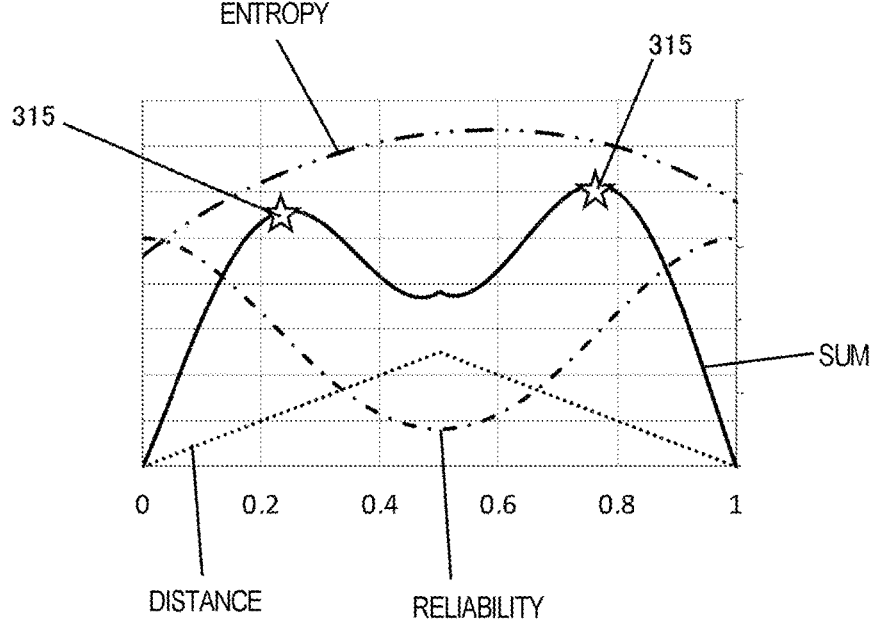
FIG. 16 is a diagram illustrating an example of an optimization method for obtaining a corrected linear sum in another configuration.

FIG. 16 is a diagram illustrating an example of an optimization method for obtaining a corrected linear sum 312_5 in the present modification example. As illustrated in FIG. 16, when the values of the distance (X), the entropy L, and the reliability R have been obtained, the control unit 11 may derive a maximum value 315 of the product S based on the calculated gradient $(\partial S/\partial \alpha_i)$. The control unit 11 may acquire a point corresponding to the maximum value 315 as a corrected linear sum 312_5. As illustrated in FIG. 16, when there are a plurality of maximum values (two in the case of FIG. 16), the control unit 11 may adopt any one maximum value as a corrected linear sum 312_5. When correction based on the entropy L is omitted, the control unit 11 may obtain a corrected linear sum 312_5 based on the distance (X) and the reliability R.

After obtaining the corrected linear sum 312_5, the control unit 11 may obtain a projection point 313 corresponding to the corrected linear sum 312_5 through the processing of steps S109 and S110. Thereby, in the processing of step S111, the control unit 11 may generate a decoded sample corresponding to a feature amount of the projection point 323 of the corrected linear sum 312_5 as a new training sample 36 by using the trained decoder 6. On the other hand, when the processing of steps S109 to S110 is omitted, the control unit 11 may generate a decoded sample corresponding to the feature amount of the corrected linear sum 312_5 as a new training sample 36 by using the trained decoder 6 in the processing of step S111.

(II) Second Method

Figure 17:
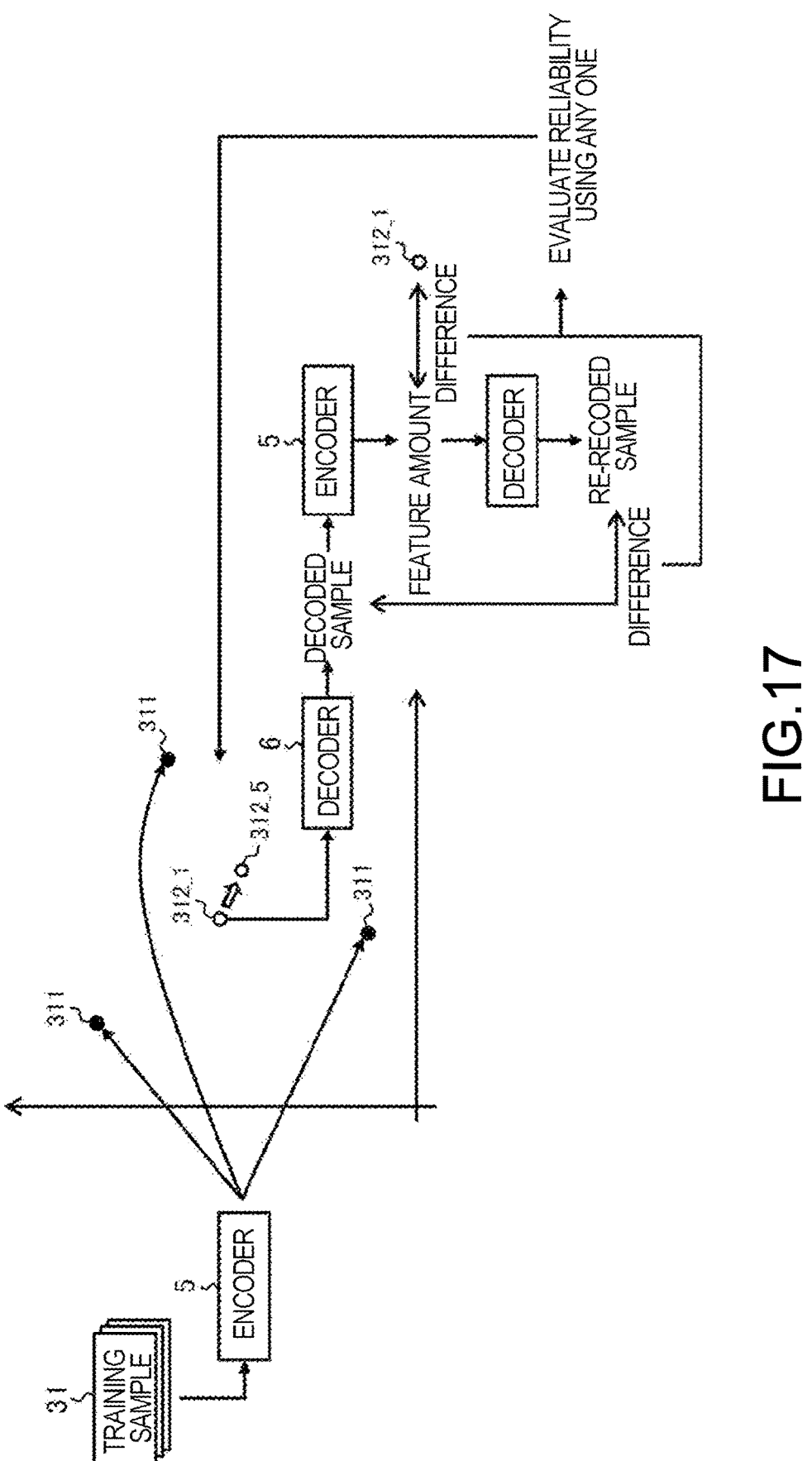
FIG. 17 schematically illustrates an example of a data generation process according to another configuration.

FIG. 17 schematically illustrates an example of a method of evaluating a reliability R and a data generation process based on a second method of the present modification example. In the second method, a trained encoder 5 and decoder 6 are used to evaluate the reliability R. In the second method, before the processing of step S108 is executed, the control unit 11 operates as the point designation unit 114 and evaluates the degree of difference between samples decoded by the trained decoder 6 from a feature amount of a derived linear sum 312_1 and training samples 31 included in a plurality of first data sets 30.

In the present modification example, the control unit 11 decodes a samples from the derived linear sum 312_1 by using the trained decoder 6. Evaluating the degree of difference is configured by converting a decoded sample into a feature amount by the trained encoder 5 and deriving a difference between the feature amount of the obtained decoded sample and a feature amount of the linear sum 312_1. Alternatively, evaluating the degree of difference is configured by generating a re-decoded sample from a feature amount of a decoded sample by further using the trained decoder 6 and calculating a reconfiguration error between the decoded sample and the generated re-decoded sample.

The trained encoder 5 and decoder 6 are generated by machine learning using a training sample 31. For this reason, the more similar a sample decoded from the derived linear sum 312_1 to the training sample 31, the smaller each difference (difference between feature amounts/reconfiguration error), and the more the decoded sample deviates from the training sample 31, the larger each of the above-described differences becomes. For this reason, it is possible to evaluate the degree of a difference between the sample decoded from the linear sum 312_1 and the training sample 31 by the above-described method.

The control unit 11 calculates the reliability R of the sample decoded by the trained decoder 6 based on a result of evaluating the degree of difference. A method of calculating the reliability R may be appropriately determined in accordance with an embodiment so that the larger the degree of difference is evaluated, the lower the value of reliability R is, and the smaller the degree of difference is evaluated, the larger the value of reliability R is. In one example, the control unit 11 may calculate an evaluation value of the reliability R by the Equation 11 below.

[Math. 11]

$$R = \|s - t\|^2 \qquad \text{(Equation 11)}$$

s indicates a decoded sample. t indicates a re-decoded sample obtained by performing encoding and decoding the decoded sample again by the encoder 5 and the decoder 6. When a sample is an image sample, a reliability R in Equation 11 is calculated by summing the squares of differences in a luminance value of each pixel.

Then, in step S108, the control unit 11 operates as the point designation unit 114 and corrects the derived linear sum 312_1 so as to improve reliability, based on a gradient $(\partial R/\partial \alpha_i)$ of the calculated reliability. Thereby, the control unit 11 acquires the corrected linear sum 312_5. A correction method may be the same as the first method described above. Similarly to the first method described above, the control unit 11 may acquire the corrected linear sum 312_5 based on an entropy L and a reliability R. In another example, the entropy L may be omitted, and the control unit 11 may acquire the corrected linear sum 312_5 based on the reliability R.

After the corrected linear sum 312_5 is obtained, the control unit 11 may obtain a projection point 313 corresponding to the corrected linear sum 312_5 through the processing of steps S109 and S110. Thereby, in the processing of step S111, the control unit 11 may generate a decoded sample corresponding to a feature amount of the projection point 323 of the corrected linear sum 312_5 as a new training sample 36 by using the trained decoder 6. On the other hand, when the processing of steps S109 to S110 is omitted, the control unit 11 may generate a decoded sample corresponding to a feature amount of the corrected linear sum 312_5 as a new training sample 36 by using the trained decoder 6 in the processing of step S111. Samples that can be appropriately encoded and decoded by the trained encoder 5 and decoder 6 are basically those included in a distribution of training samples, and according to the reliability R in Equation 11 described above, it is possible to evaluate the degree of inclusion in this distribution. For this reason, a new training sample 36 can be generated within a desired distribution by using the reliability R as an index.

SUMMARY

In a feature space, a sample decoded by the trained decoder 6 from feature amounts of points other than points corresponding to the training samples 31 are pseudo data imitating so-called true data (training samples). In some cases, this pseudo data can significantly deviate from the true data. According to the above-described first method or second method, the reliability of a decoded sample obtained from a derived linear sum 312_1 can be evaluated, and the linear sum 312_1 can be corrected to improve reliability. Thereby, it is possible to suppress the addition of a new training sample 36, which significantly deviates from true data, to the learning data. As a result, the expectation of an improvement in the performance of a trained sorting model 7 (70) to be generated can be increased by using the obtained new training sample 36 for machine learning of the sorting model 7 (70). The model generation device 1 described above may adopt the first method and the second method at the same time. That is, the control unit 11 may calculate a reliability R through evaluation using the identifier 650 and evaluation based on the above-described differences. Thereby, it is possible to further suppress the addition of a new training sample 36, which significantly deviates from true data, to learning data.

<4.9>

In the above-described embodiment, Equations 1 and 2 described above are exemplified as an example of a predetermined index for deriving the linear sum 312_1. However, the predetermined index may not be limited thereto. In another example, when the sorting model 7 is configured to output, for each class, a posterior probability that a feature included in a sample belong to the class, the control unit 11 may derive a point X for maximizing a minimum value of an intersection entropy H, which is calculated by Equation 12 below, as the linear sum 312 (312_1) by using a provisional trained sorting model 7.

[Math. 12]

$$X = \operatorname*{argmax}_{x}\left(\min_{i} H(x, x_i)\right) \qquad \text{(Equation 12)}$$

According to this method, a sample point having information different from any sample point 311 can be derived as the linear sum 312 (312_1).

In the above-described embodiment (modification example), the processing of steps S115 to S117 may be omitted from the processing procedure of the model generation device 1 (data generation device 102). In this case, the thinning unit 118 may be omitted from the software configuration of the model generation device 1 (data generation device 102).

In the above-described embodiment, the model generation device 1 may store the generated second data set 35 in a predetermined storage area. The predetermined storage area may be appropriately selected in accordance with an embodiment.

The invention claimed is:

1. A model generation computer comprising:
a processor;
a memory;
a data acquisition unit configured to acquire a plurality of first data sets each constituted by a combination of a training sample and a correct answer label, the training sample including a feature, and the correct answer label being configured to indicate a class to which the feature included in the training sample belongs;
a first training processing unit configured to perform machine learning of an encoder and a decoder by using a plurality of training samples included in the plurality of first data sets acquired, the encoder being configured to convert a sample into a feature amount, the decoder being configured to decode the sample from the feature amount, and the machine learning of the encoder and the decoder including converting each of the training samples into a feature amount by the encoder, and training the encoder and the decoder so that a sample decoded by the decoder from the obtained each feature amount matches the training samples;
a conversion unit configured to acquire two or more sample points respectively corresponding to the training samples in a feature space by converting each of two or more training samples among the plurality of training samples into a feature amount by using the trained encoder;
a point designation unit configured to derive a linear sum in which the sum of distances calculated from the sample points in accordance with a predetermined index is maximum, the linear sum being a linear sum of the acquired two or more sample points in the feature space;
a sample generation unit configured to generate a decoded sample corresponding to a feature amount of the linear sum as a new training sample by using the trained decoder;
a label giving unit configured to generate a second data set by giving the new training sample a new correct answer label, which is configured to indicate a class to which a feature included in the generated new training sample belongs; and
a second training processing unit configured to perform machine learning of a sorting model by using the plurality of first data sets and the generated one or more second data sets, the machine learning of the sorting model including training the sorting model so that a result of sorting the class to which the feature included in the training sample belongs using the sorting model matches the correct answer label for each data set.

2. The model generation computer according to claim 1, wherein the sorting model is configured to output, for each class, a posterior probability that the feature included in the sample belongs to the class,
the machine learning of the sorting model is performed by being divided first machine learning using the plurality of first data sets and second machine learning using the one or more second data sets,
a provisional trained sorting model is generated by performing the first machine learning,
the point designation unit is further configured to calculate, for each class, a posterior probability that a feature included in a sample decoded by the trained decoder belongs to the class from the feature amount of the derived linear sum by using the provisional trained sorting model, to calculate an entropy of the decoded sample from the calculated posterior probability for each class, and to correct the derived linear sum so that the entropy increases based on a gradient of the calculated entropy, and
the sample generation unit is configured to generate, as the new training sample, a decoded sample corresponding to a feature amount of the corrected linear sum by using the trained decoder.

3. The model generation computer according to claim 1, wherein the first training processing unit is configured to further perform machine learning of an identifier by using a plurality of training samples included in the plurality of first data sets,
the machine learning of the identifier is configured by training the identifier to evaluate the degree to which an input sample belongs to a distribution of the plurality of training samples,
the point designation unit is further configured to evaluate the degree to which a sample decoded by the trained decoder belongs to a distribution of the plurality of training samples from a feature amount of the derived linear sum by using the trained identifier, to calculate a reliability of the sample decoded by the trained decoder based on a result of evaluating the degree, and to correct the derived linear sum to improve the reliability based on a gradient of the calculated reliability, and
the sample generation unit is configured to generate, as the new training sample, a decoded sample corresponding to a feature amount of the corrected linear sum by using the trained decoder.

4. The model generation computer according to claim 3, wherein training the identifier is configured by performing adversarial learning between the encoder, the decoder, and the identifier,
the adversarial learning includes a step of training an identifier to identify origins of input samples by using a plurality of samples decoded by the decoder and the plurality of training samples as the input samples, and a step of training the encoder and the decoder so that identification performance of the identifier is degraded when the samples decoded by the decoder are input to the identifier, and
evaluating the degree to which the decoded samples belong to the distribution of the plurality of training samples is configured by identifying the origins of the decoded samples by using the trained identifier.

5. The model generation computer according to claim 1, wherein the point designation unit is further configured to evaluate the degree of differences between the samples decoded by the trained decoder and the training samples included in the plurality of first data sets from the feature amount of the derived linear sum, to calculate the reliability of the samples decoded by the trained decoder based on a result of evaluating the degree, and to correct the derived linear sum so as to improve the reliability based on a gradient of the calculated reliability, and evaluating the degree of the differences is configured by converting the decoded samples into feature amounts by the trained encoder and calculating differences between the obtained feature amounts of the decoded samples and the feature amounts of the linear sum, or is configured by generating re-decoded samples from the feature amounts of the decoded samples by further using the trained decoder and calculating reconfiguration errors between the decoded samples and the generated re-decoded samples.

6. The model generation computer according to claim 1, wherein the machine learning of the encoder and the decoder further includes acquiring two feature amounts corresponding to two training samples constituting each pair by using the encoder for pairs of training samples obtained from the plurality of first data sets, calculating a synthesized feature amount for each pair by synthesizing the two feature amounts acquired for each pair at a predetermined internal division ratio, generating a decoded sample for each pair from the calculated synthesized feature amount by using the decoder, training an estimator for each pair so that a result of estimating the internal division ratio from the generated decoded sample by the estimator matches the predetermined internal division ratio, and training the encoder and the decoder for each pair to generate a decoded sample for degrading the performance of the estimator that estimates the interior division ratio.

7. The model generation computer according to claim 6, wherein the point designation unit is configured to extract two sample points near the derived linear sum from the acquired two or more sample points, and to acquire a projection point corresponding to the linear sum by projecting the derived linear sum onto a straight line connecting the extracted two sample points in the feature space, and the sample generation unit is configured to generate, as the new training sample, a decoded sample corresponding to a feature amount of the projection point corresponding to the linear sums by using the trained decoder.

8. The model generation computer according to claim 7, wherein extracting the two sample points is configured by extracting two sample points of different classes to which features included in the corresponding training samples belong.

9. The model generation computer according to claim 1, further comprising:

an output unit configured to dispose and output the two or more training samples and the new training sample in accordance with a positional relationship in the feature space after the new training sample is generated.

10. The model generation computer according to claim 9, wherein the label giving unit is configured to output the two or more training samples and the new training sample by the output unit and then receive designation of a class to which a feature included in the new training sample belongs, and is configured to give the new training sample the new correct answer label configured to indicate the designated class.

11. The model generation computer according to claim 1, further comprising:

a thinning unit configured to determine whether a density of sample points corresponding to the training samples exceeds a threshold value in the feature space when the training samples included in the plurality of first data sets and the one or more second data sets are converted into feature amounts by the trained encoder, and to select an object to be thinned out from the one or more second data sets when the density exceeds the threshold value, wherein the second training processing unit is configured to perform machine learning of the sorting model except for the second data set selected as the object to be thinned out.

12. The model generation computer according to claim 1, wherein the sorting model is configured to receive an input of the feature amount and output, from the input feature amount, a result of sorting a class to which the feature belongs.

13. The model generation computer according to claim 1, wherein the sorting model is configured to receive an input of the sample and output, from the input sample, a result of sorting a class to which the feature belongs.

14. The model generation computer according to claim 1, wherein the model generation computer is configured to repeatedly execute updating the trained encoder and decoder by performing the machine learning of the encoder and the decoder again by using the generated one or more second data sets by the first training processing unit, acquiring two or more sample points corresponding to two or more training samples among the plurality of training samples included in the plurality of first data sets and the one or more second data sets by using the updated trained encoder by the conversion unit, deriving a linear sum of the acquired two or more sample points by the point designation unit, generating a decoded sample corresponding to a feature amount of the linear sum as a new training sample by using the updated trained decoder by the sample generation unit, and generating a new second data set by giving a new correct answer label to the generated new training sample by the label giving unit.

15. The model generation computer according to claim 1, wherein the predetermined index is configured by either Equation 1 or Equation 2 below,

[Math. 1]

$$X = \operatorname*{argmin}_{x} \sum \|x - x_i\|^2 \qquad \text{(Equation 1)}$$

[Math. 2]

$$X = \operatorname*{argmax}_{x} \operatorname*{min}_{i} \sum \|x - x_i\| \qquad \text{(Equation 2)}$$

where X indicates the derived linear sum, and xi indicates each sample point.

16. The model generation computer according to claim 1, wherein the training sample is an image sample showing an object, and
the class of the feature relates to the type of object that is shown in the image sample.

17. The model generation computer according to claim 16,
wherein the object is a product, and
the class of the feature relates to the type of defect included in the product.

18. A sorting device comprising:
an acquisition unit configured to acquire a target sample;
a sorting unit including the trained sorting model generated by the model generation computer according to claim 1, the sorting unit being configured to sort a class to which a feature included in the acquired target sample belongs, by using the trained sorting model; and
an output unit configured to output information on a result of sorting the class.

19. A model generation method of causing a computer to execute the following steps comprising:
acquiring a plurality of first data sets each constituted by a combination of a training sample and a correct answer label, the training sample including a feature, and the correct answer label being configured to indicate a class to which the feature included in the training sample belongs;
performing machine learning of an encoder and a decoder by using a plurality of training samples included in the plurality of first data sets acquired, the encoder being configured to convert a sample into a feature amount, the decoder being configured to decode the sample from the feature amount, and the machine learning of the encoder and the decoder including converting each of the training samples into a feature amount by the encoder, and training the encoder and the decoder so that a sample decoded by the decoder from the obtained each feature amount matches the training samples;
acquiring two or more sample points respectively corresponding to the training samples in a feature space by converting each of two or more training samples among the plurality of training samples into a feature amount by using the trained encoder;
deriving a linear sum in which the sum of distances calculated from the sample points in accordance with a predetermined index is maximum, the linear sum being a linear sum of the acquired two or more sample points in the feature space;
generating a decoded sample corresponding to a feature amount of the linear sum as a new training sample by using the trained decoder;
generating a second data set by giving the new training sample a new correct answer label, which is configured to indicate a class to which a feature included in the generated new training sample belongs; and performing machine learning of a sorting model by using the plurality of first data sets and the generated one or more second data sets, the machine learning of the sorting model including training the sorting model so that a result of sorting the class to which the feature included in the training sample belongs using the sorting model matches the correct answer label for each data set.

20. A non-transitory computer storage media that stores a model generation program causing a computer to execute the following steps comprising:
acquiring a plurality of first data sets each constituted by a combination of a training sample and a correct answer label, the training sample including a feature, and the correct answer label being configured to indicate a class to which the feature included in the training sample belongs;
performing machine learning of an encoder and a decoder by using a plurality of training samples included in the plurality of first data sets acquired, the encoder being configured to convert a sample into a feature amount, the decoder being configured to decode the sample from the feature amount, and the machine learning of the encoder and the decoder including converting each of the training samples into a feature amount by the encoder, and training the encoder and the decoder so that a sample decoded by the decoder from the obtained each feature amount matches the training samples;
acquiring two or more sample points respectively corresponding to the training samples in a feature space by converting each of two or more training samples among the plurality of training samples into a feature amount by using the trained encoder;
deriving a linear sum in which the sum of distances calculated from the sample points in accordance with a predetermined index is maximum, the linear sum being a linear sum of the acquired two or more sample points in the feature space;
generating a decoded sample corresponding to a feature amount of the linear sum as a new training sample by using the trained decoder;
generating a second data set by giving the new training sample a new correct answer label, which is configured to indicate a class to which a feature included in the generated new training sample belongs; and
performing machine learning of a sorting model by using the plurality of first data sets and the generated one or more second data sets, the machine learning of the sorting model including training the sorting model so that a result of sorting the class to which the feature included in the training sample belongs using the sorting model matches the correct answer label for each data set.

* * * * *